(12) United States Patent
Sollier et al.

(10) Patent No.: US 12,128,407 B2
(45) Date of Patent: Oct. 29, 2024

(54) MICROFLUIDIC CHIPS AND CARTRIDGES AND SYSTEMS UTILIZING MICROFLUIDIC CHIPS AND CARTRIDGES

(71) Applicant: Vortex Biosciences, Inc., Menlo Park, CA (US)

(72) Inventors: Elodie Sollier, Gagny (FR); Michael Lee Kochersperger, Princeton, NJ (US); Robert F. Englert, Pleasanton, CA (US); James Che, San Ramon, CA (US); Kuo-Wei Huang, Fremont, CA (US); Michael Boyce-Jacino, Titusville, NJ (US); Anatasia Neddersen, San Jose, CA (US); Anna Passernig, Campbell, CA (US); Bruce Richardson, Los Gatos, CA (US); Insang Choi, Anyang-si (KR)

(73) Assignee: Vortex Biosciences, Inc., Sunnyvale, CA (US)

( * ) Notice: Subject to any disclaimer, the term of this patent is extended or adjusted under 35 U.S.C. 154(b) by 563 days.

(21) Appl. No.: 16/093,468

(22) PCT Filed: Apr. 17, 2017

(86) PCT No.: PCT/US2017/027959
§ 371 (c)(1),
(2) Date: Oct. 12, 2018

(87) PCT Pub. No.: WO2017/181186
PCT Pub. Date: Oct. 19, 2017

(65) Prior Publication Data
US 2019/0168221 A1    Jun. 6, 2019

Related U.S. Application Data

(60) Provisional application No. 62/323,377, filed on Apr. 15, 2016, provisional application No. 62/323,387, (Continued)

(51) Int. Cl.
*B01L 3/00* (2006.01)
*G01N 1/10* (2006.01)
(Continued)

(52) U.S. Cl.
CPC ... *B01L 3/502761* (2013.01); *B01L 3/502738* (2013.01); *G01N 1/10* (2013.01);
(Continued)

(58) Field of Classification Search
None
See application file for complete search history.

(56) References Cited

U.S. PATENT DOCUMENTS 8,807,879 B2   8/2014 Toner et al.
9,086,371 B2   7/2015 Clemens et al.
(Continued)

FOREIGN PATENT DOCUMENTS

WO    2015200179 A1    12/2015
WO    2015200857 A1    12/2015

OTHER PUBLICATIONS

Sollier et al., Size-selective collection of circulating tumor cells using Vortex technology, 2013, The Royal Society of Chemistry, 14, p. 63-77. (Year: 2013).*

(Continued)

*Primary Examiner* — Lore R Jarrett
(74) *Attorney, Agent, or Firm* — THOMAS | HORSTEMEYER, LLP

(57) ABSTRACT

Microfluidic chips and cartridges and systems that include such chips are disclosed. In some embodiments, the chips
(Continued)

include a microfluidic channel disposed in a substrate with the channel comprising at least one expansion region. The channel is configured to generate a vortex within the at least one expansion region in response to fluid through the microfluidic channel to trap cells or particles. The substrate in which the channel is formed may be relatively rigid to resist deformation.

9 Claims, 43 Drawing Sheets

Related U.S. Application Data filed on Apr. 15, 2016, provisional application No. 62/323,397, filed on Apr. 15, 2016.

(51) Int. Cl.
  *G01N 15/10* (2024.01)
  *G01N 15/14* (2024.01)
  *G01N 35/10* (2006.01)

(52) U.S. Cl.
  CPC .... *G01N 15/1484* (2013.01); *B01L 2200/027* (2013.01); *B01L 2200/0668* (2013.01); *B01L 2200/0689* (2013.01); *B01L 2200/10* (2013.01); *B01L 2300/0816* (2013.01); *B01L 2300/0864* (2013.01); *B01L 2300/0867* (2013.01); *B01L 2300/087* (2013.01); *B01L 2400/0403* (2013.01); *B01L 2400/0487* (2013.01); *B01L 2400/0633* (2013.01); *B01L 2400/084* (2013.01); *G01N 2015/1006* (2013.01); *G01N 35/1097* (2013.01)

(56) References Cited

U.S. PATENT DOCUMENTS

| | | | |
|---|---|---|---|
| 2009/0257920 A1* | 10/2009 | Facer | B01L 3/502738 422/400 |
| 2009/0283474 A1* | 11/2009 | Achard | B01D 21/0087 210/195.3 |
| 2010/0112300 A1 | 5/2010 | Velev et al. | |
| 2011/0294187 A1* | 12/2011 | Toner | G01N 1/405 435/177 |
| 2011/0303586 A1* | 12/2011 | Sim | B01L 3/502761 209/268 |
| 2012/0003725 A1* | 1/2012 | Lim | G01N 33/5304 435/283.1 |
| 2012/0256354 A1 | 10/2012 | Desimone et al. | |
| 2013/0171628 A1 | 7/2013 | Di Carlo et al. | |
| 2014/0224710 A1* | 8/2014 | Di Carlo | G01N 1/4077 209/132 |
| 2016/0059234 A1* | 3/2016 | Chang | B01L 3/502753 435/309.1 |

OTHER PUBLICATIONS

Sollier et al., Fast and continuous plasma extraction from whole human blood based on expanding cell-free layer devices, Biomed Microdevices, 12, p. 485-497. (Year: 2010).*

International Search Report and Written Opinion issued in PCT/US2017/027959 mailed Aug. 29, 2017, 12 pages.

* cited by examiner

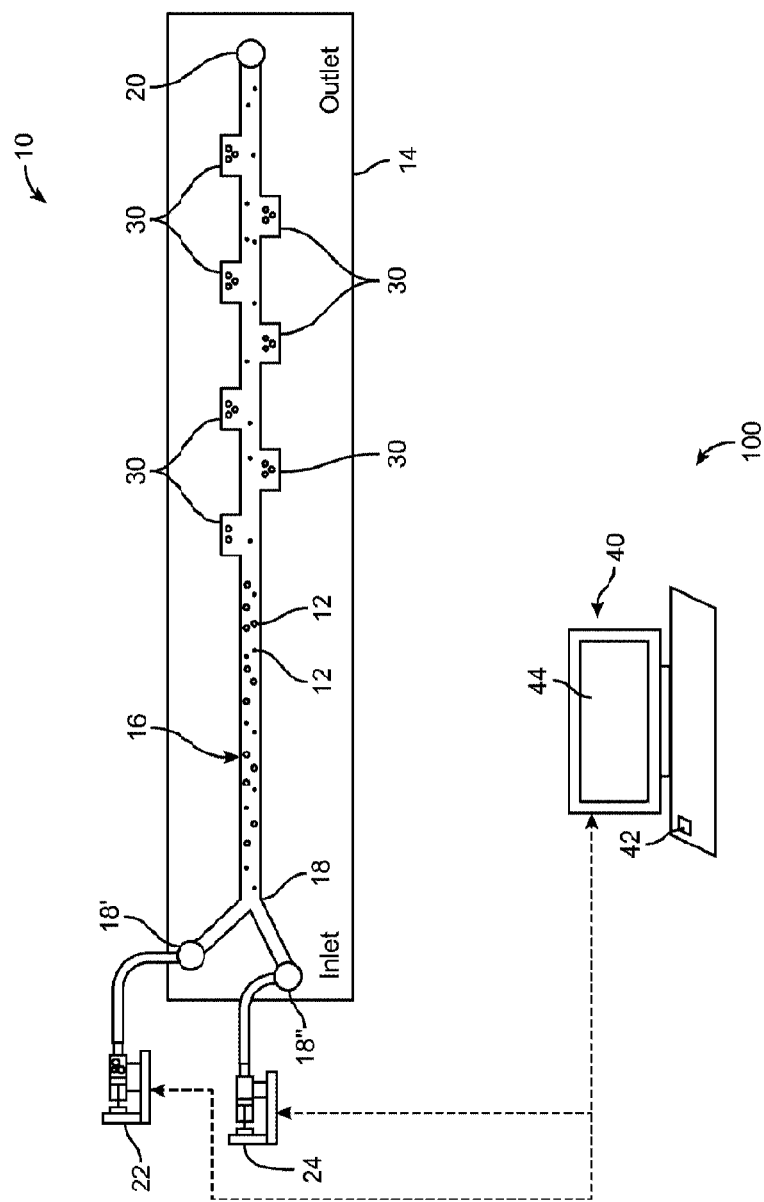

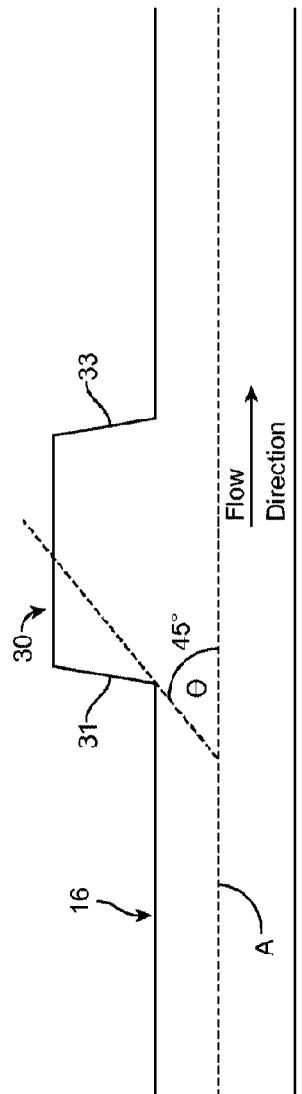
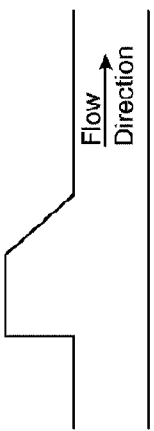

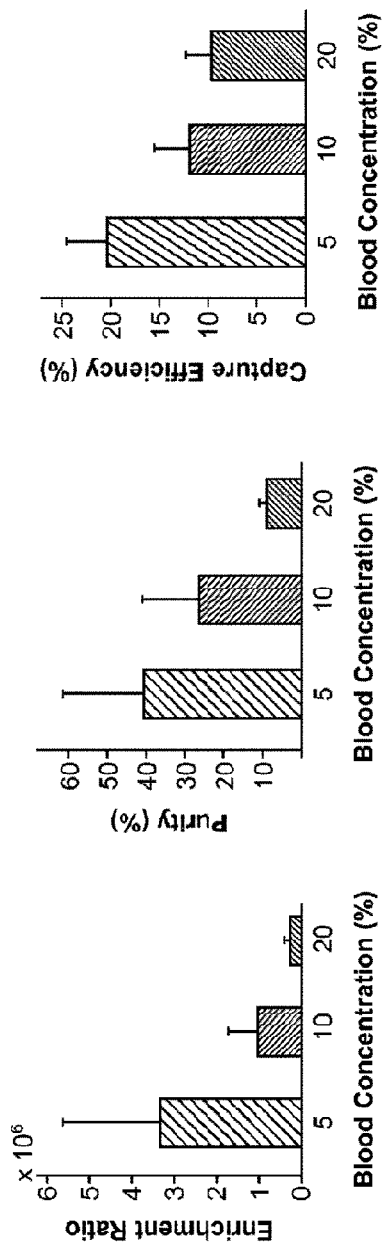

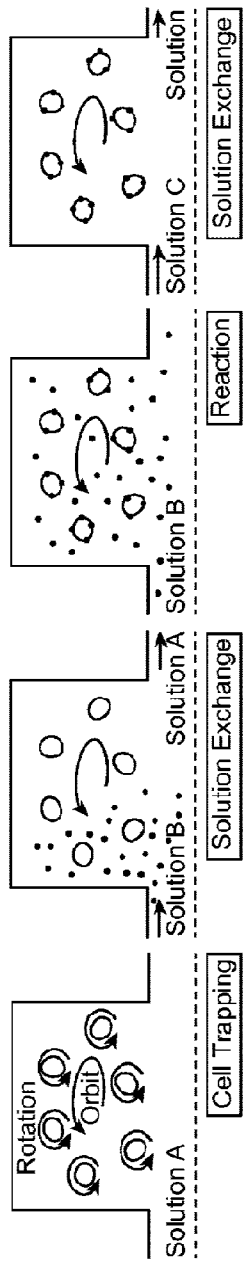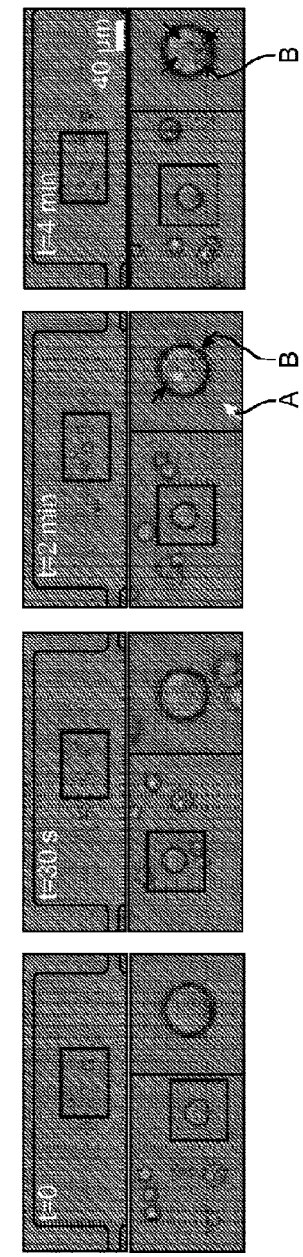
FIG. 6A FIG. 6B FIG. 6C FIG. 6D
FIG. 6E FIG. 6F FIG. 6G FIG. 6H

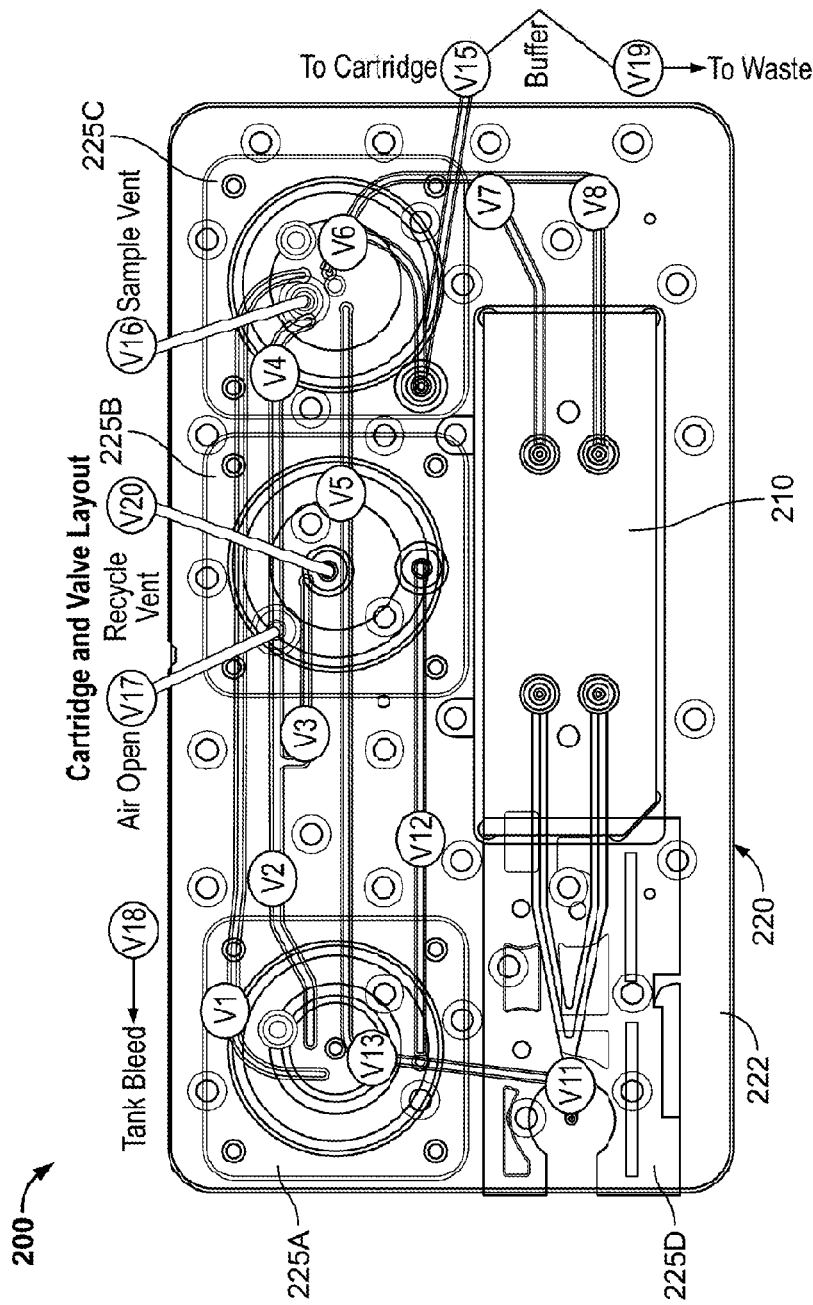

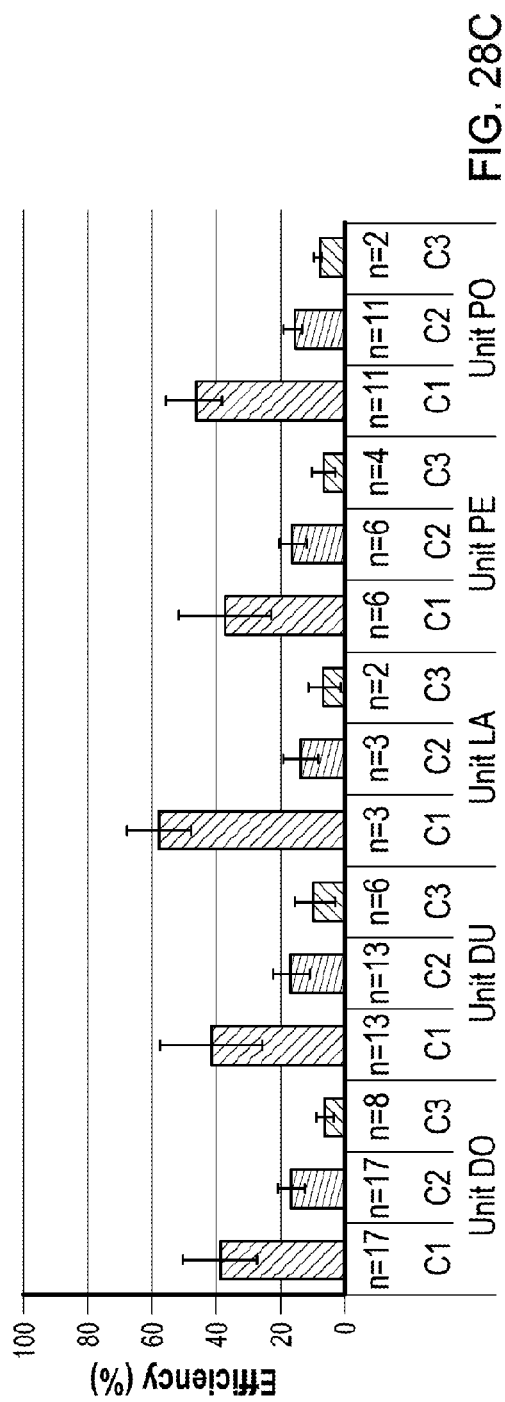
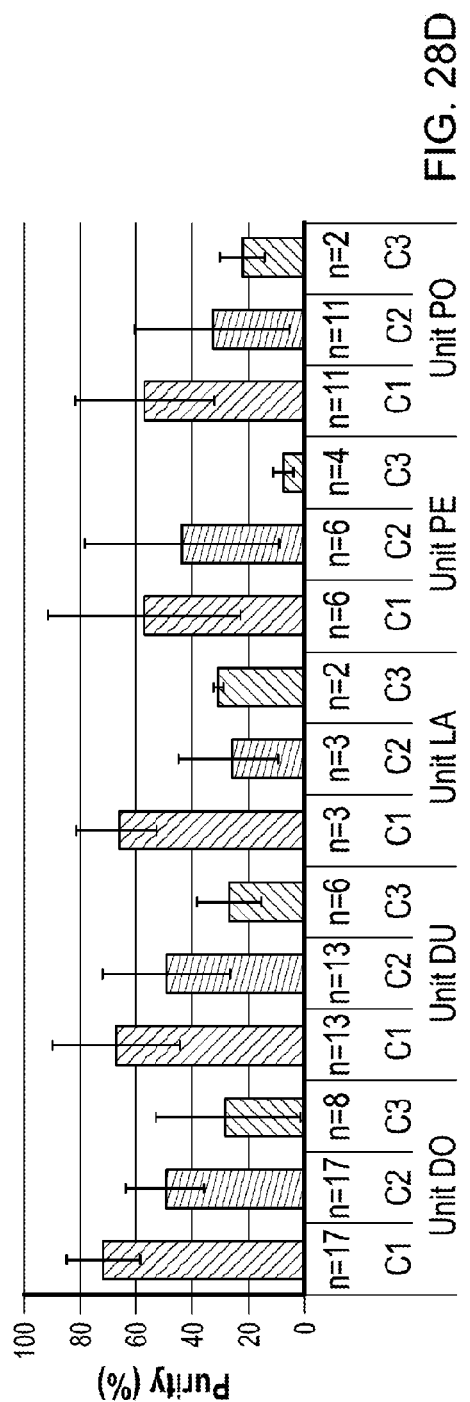

| Step # | Step Name | Valve Settings ||||||||||||||||||||
| --- | --- | --- | --- | --- | --- | --- | --- | --- | --- | --- | --- | --- | --- | --- | --- | --- | --- | --- | --- | --- |
| | | V1 | V2 | V3 | V4 | V5 | V6 | V7 | V8 | V9 | V10 | V11 | V12 | V13 | V15 | V16 | V17 | V18 | V19 | V20 |
| 1 | Dilute | x | x | x | x | x | o | x | x | x | o | x | o | o | o | o | x | x | x | x |
| 2 | VOLUMEBASELINE | x | x | x | x | x | x | x | x | x | x | x | x | x | x | x | x | x | x | x |
| 3 | DeviceSelector | | | | | | | | | | | | | | | | | | | |
| 4 | CHIPPRIME | x | x | x | x | x | x | o | x | x | o | x | o | x | o | x | x | x | x | x |
| 5 | DeviceSelector | | | | | | | | | | | | | | | | | | | |
| 6 | CHIPPRIME | x | x | x | x | x | o | o | o | x | o | x | o | x | o | x | x | x | x | x |
| 7 | CAPTURECALIBRATE | x | x | x | o | x | o | o | o | o | x | x | x | o | x | x | x | x | x | o |
| 8 | CAPTUREVENT | x | x | x | x | x | x | x | x | o | x | x | x | x | x | x | x | x | x | x |
| 9 | RECYCLEAUTO_NOVOLUME | x | o | x | o | x | x | x | x | x | x | x | x | x | x | o | x | x | x | x |
| 10 | RECYCLEVENT | x | x | x | x | x | x | x | x | x | x | x | x | x | x | x | x | x | x | o |
| 11 | CAPTURETOWASTE | x | x | x | o | x | o | o | o | o | o | x | o | x | x | x | x | x | x | o |
| 12 | CAPTUREVENT | x | x | x | x | x | x | x | x | x | x | x | x | x | x | x | x | x | x | x |
| 13 | TRANSFER_AUTO | o | o | x | x | x | x | x | x | x | x | x | x | x | x | o | x | x | x | x |
| 14 | TRANSFERVENT | o | x | x | x | x | x | x | x | o | x | x | x | x | x | x | x | x | x | x |
| 15 | RECYCLEVENT | x | x | x | x | x | x | x | x | x | x | x | x | x | x | x | x | x | x | o |
| 16 | CycleStart | | | | | | | | | | | | | | | | | | | |
| 17 | BothPumpsRefill | | | | | | | | | | | | | | | | | | | |
| 18 | DeviceSelector | | | | | | | | | | | | | | | | | | | |
| 19 | CHIPPRIME | x | x | x | x | x | o | o | x | x | o | x | o | x | o | x | x | x | x | x |

| | | | | | | | | | | | |
|---|---|---|---|---|---|---|---|---|---|---|---|
| 20 DeviceSelector | | | | | | | | | | | |
| 21 CHIPPRIME | x | x | x | x | x | O | O | x | x | x | x |
| 22 CAPTUREAUTOFULL | x | x | x | O | x | O | O | x | O | x | O |
| 23 WASH_AUTOPRESSURE | x | x | x | x | x | O | O | x | x | x | x |
| 24 Wash | x | x | x | x | x | O | O | x | O | x | x |
| 25 RELEASE_AUTO | x | x | x | x | x | O | O | x | O | x | x |
| 26 CAPTUREVENT | x | x | x | x | O | O | x | x | x | x | x |
| 27 RECYCLEAUTO_NOVOLUME | x | O | x | O | x | x | x | x | O | x | x |
| 28 RECYCLEVENT | x | x | x | x | x | x | x | x | x | x | O |
| 29 CycleEnd | | | | | | | | | | | |
| 30 WashToRecycle | x | x | x | x | x | O | x | O | x | x | x |
| 31 Wash | x | x | x | x | x | O | O | x | O | x | x |
| 32 RECYCLEVENT | x | x | x | x | x | x | x | x | x | x | O |

X=Closed, O=Open

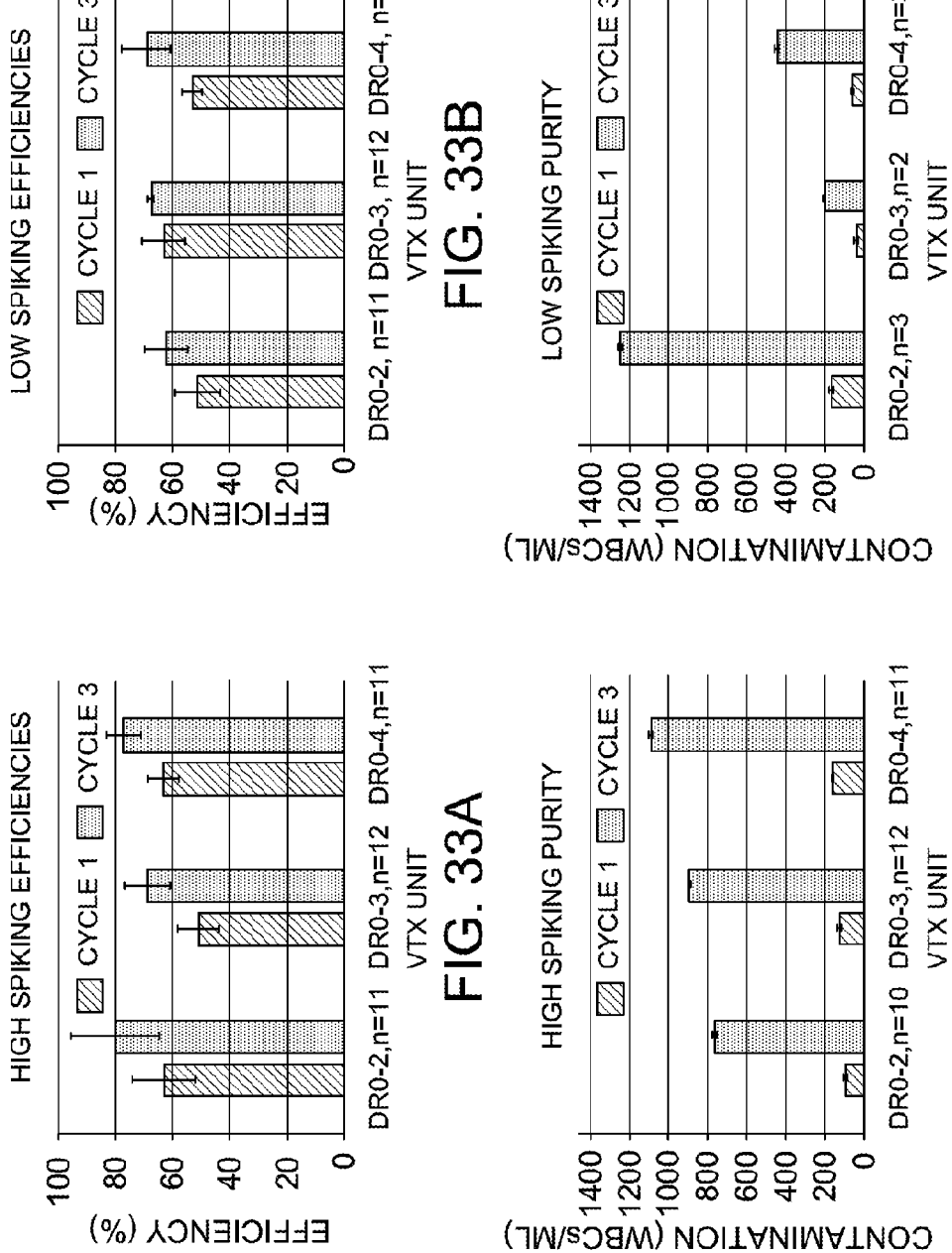

MICROFLUIDIC CHIPS AND CARTRIDGES AND SYSTEMS UTILIZING MICROFLUIDIC CHIPS AND CARTRIDGES

CROSS-REFERENCE TO RELATED APPLICATIONS

The present application is the 35 U.S.C. § 371 national stage application of PCT/US2017/027959, filed Apr. 17, 2017, which claims the benefit of U.S. Provisional Patent Application Ser. No. 62/323,377, filed 15 Apr. 2016; U.S. Provisional Patent Application Ser. No. 62/323,387, filed 15 Apr. 2016; and U.S. Provisional Patent Application Ser. No. 62/323,397, filed 15 Apr. 2016, each of which is incorporated herein by reference in its entirety.

FIELD OF THE DISCLOSURE

The field of the disclosure relates to microfluidic chips and cartridges and systems including the chips and cartridges.

BACKGROUND

Life science applications often involve capturing and concentrating cells or particles from a heterogeneous mixture for analytical purposes. Cells may be captured and concentrated by a variety of methods including centrifugation or by a microfluidic system that involves a mechanical trap to separate or isolate the cells.

A need exists for processing systems that accomplish these capturing and concentrating events automatically while at the same time not negatively impinging on the morphology and physiology of the captured and concentrated cells or particles. A need exists for processing systems which include removable cartridge assemblies that include microfluidic chips to process a sample by separating particles or cells in a heterogeneous mixture. There is a need for cartridges that are disposable and/or adaptable to modify the processing protocol. A need exists for microfluidic chips with improved performance or efficiency in separating particles or cells for heterogeneous mixtures.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a microfluidic chip for isolating cells or particles from a fluid. The chip includes a rigid substrate made of a material selected from poly(methyl methacrylate) (PMMA), cyclic olefin polymer (COP), cyclic olefin copolymer (COC), and ultra-violet curable resins. The chip also includes at least one microfluidic channel disposed in the substrate between an inlet and an outlet. The microfluidic channel has a length and includes at least one expansion region disposed along the length of the channel. The microfluidic channel is configured to generate a vortex within the at least one expansion region in response to fluid through the microfluidic channel.

Another aspect of the present disclosure is directed to a multilayer cartridge assembly for use in a system for isolating cells or particles from a fluid. The assembly includes at least one microfluidic chip. The chip includes a rigid substrate and a microfluidic channel disposed in the substrate between an inlet and an outlet. The channel has a length and includes at least one expansion region disposed along the length of the channel. The microfluidic channel is configured to generate a vortex within the at least one expansion region in response to fluid through the microfluidic channel. The assembly includes a first or top layer comprising a pocket. The microfluidic chip is received in the pocket. The assembly includes a second or bottom layer comprising an adaptor for removably connecting a vessel for housing a fluid. The second layer further includes microfluidic channels wherein at least a portion of the microfluidic channel are sealed and bonded to at least a portion of the first layer to form controllable valve mechanisms in the channels. The cartridge assembly is adapted to be removably coupled to a system for isolation of cells or particles. The assembly includes one or more gasket components forming a seal between a portion of the first layer and a portion of the second layers.

Yet another aspect of the present disclosure is directed to a system for isolating cells or particles from a fluid. The system includes a processing station comprising a liquid pump and/or a gas pump. The system also includes a cartridge assembly removably coupled to the processing station. The cartridge assembly includes a microfluidic chip having a substrate and a microfluidic channel disposed in the substrate between an inlet and an outlet. The microfluidic channel has a length and includes at least one expansion region disposed along the length of the channel. The microfluidic channel is configured to generate a vortex within the at least one expansion region in response to fluid through the microfluidic channel.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 1A illustrates a microfluidic system for isolating cells according to one embodiment.

FIG. 1C illustrates a schematic representation of a microfluidic channel with a single expansion region.

FIG. 1D-1G illustrate various geometries of the expansion region.

FIG. 4C illustrates an image taken at t=0 seconds. FIG. 4D illustrates an image taken at t=9 seconds. FIG. 4E illustrates an image taken at t=17 seconds. FIG. 4F illustrates an image taken at t=18 seconds. HeLa cells are seen trapped within the vortex created within the expansion region.

FIG. 5A illustrates a graph of the enrichment ratio (%) achieved with the microfluidic chip at various blood concentrations.

FIG. 5B illustrates a graph of the purity (%) achieved with the microfluidic chip at various blood concentrations.

FIG. 5C illustrates a graph of the capture efficiency (%) achieved with the microfluidic chip at various blood concentrations.

FIG. 6A illustrates a schematic representation of solution containing MCF7 cells (Solution A) wherein the cells are trapped within a vortex created within an expansion region.

FIG. 6B illustrates a schematic representation of a first solution exchange occurring with Solution B that includes streptavidin-coated microspheres.

FIG. 6C illustrates a schematic representation of the reaction of the MCF7 cells with the streptavidin-coated microspheres.

FIG. 6D illustrates a schematic representation of a second solution exchange conducted with Solution C (i.e., PBS) that acts as a wash.

FIG. 6E illustrates a microscopic image of MCF7 cells corresponding to FIG. 6A wherein cells orbit within a vortex created within an expansion region of the microfluidic chip. Below left is a magnified view of the rectangular region. Below right is a magnified view of the square region.

FIG. 6F illustrates a microscopic image corresponding to FIG. 6B. Below left is a magnified view of the rectangular region. Below right is a magnified view of the square region.

FIG. 6G illustrates a microscopic image corresponding to FIG. 6C. Below left is a magnified view of the rectangular region. Below right is a magnified view of the square region.

FIG. 6H illustrates a microscopic image corresponding to FIG. 6D. Below left is a magnified view of the rectangular region. Below right is a magnified view of the square region.

FIG. 15 is a schematic illustration of a top view of the multi-layer cartridge assembly, according to an embodiment.

FIG. 20B also shows ultrasonic or adhesive channel sealing and bonding.

FIGS. 28C-28D illustrate capture efficiency (FIG. 28C) and percent purity (FIG. 28D) of collection of tumor cells from a blood sample using the setup of FIG. 16 with five different units/systems, over three cycles.

FIG. 29 illustrates an overview of the timing and valve operation of the various steps of the example setup of FIG. 16 for purposes of vortex-based isolation and trapping of cells or particles.

FIG. 33 illustrates the use of a high recovery mode and a high purity mode of the system.

Corresponding reference characters indicate corresponding parts throughout the drawings.

DETAILED DESCRIPTION

Figure 1B:
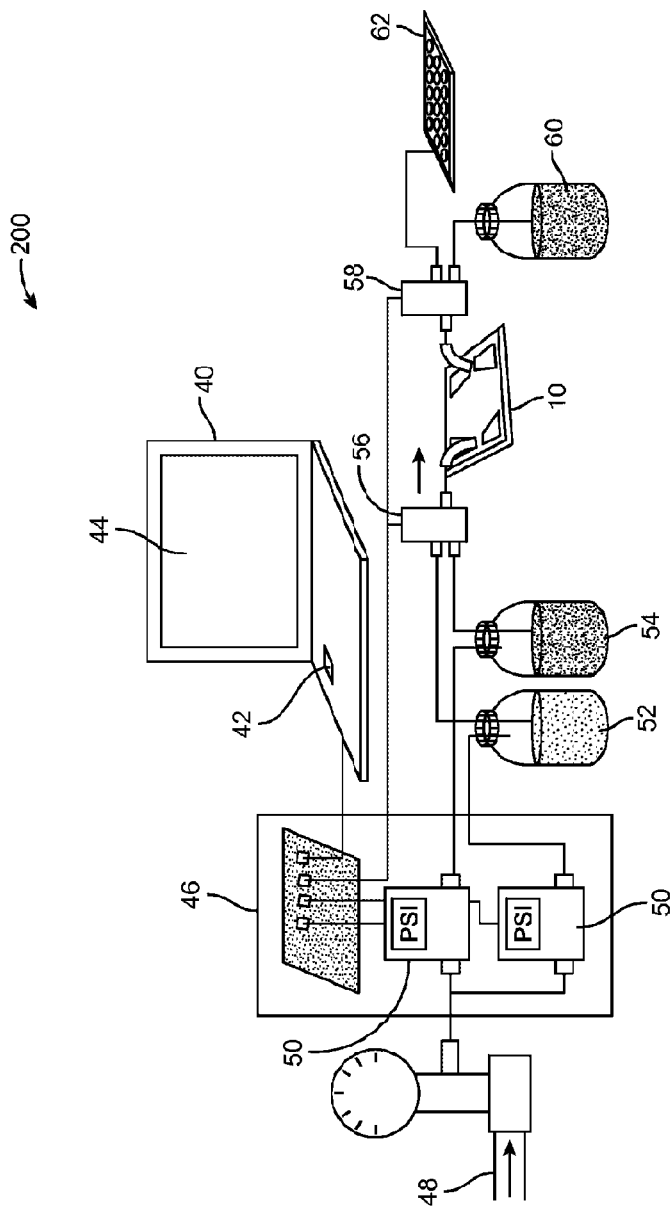
FIG. 1B illustrates a micro system for isolating cells according to another embodiment.

Provisions of the present disclosure relate to microfluidic chips and, in particular, microfluidic chips that include a channel and at least one expansion region. A vortex may be created within the expansion region to trap a subpopulation of cells within the expansion region. In some embodiments, the channel and expansion region(s) are formed in a relatively rigid substrate. Other provisions of the present disclosure relate to multilayer cartridge assemblies that include a microfluidic chip and systems that include a processing station to which a cartridge assembly may be coupled for processing a sample.

Microfluidic Chips

An example microfluidic chip 10 for isolating cells from a heterogeneous solution containing cells of different sizes is shown in FIG. 1. While the microfluidic chip 10 is illustrated in FIG. 1 as being used for isolating cells 12 it should be understood that the microfluidic chip 10 may also be used in connection with the isolation of particles (not shown). Thus, use of the term "cell" or "cells" herein should be interchangeable with particle or particles. In some embodiments, the particles or cells have a diameter from about 8 micron to about 80 micron (e.g., less than about 70 micron, less than about 50 micron, less than about 25 micron or form about 8 micron to about 50 micron). As seen in FIG. 1, the microfluidic chip 10 includes a substrate 14 that contains a microfluidic channel 16 coupled to an inlet 18 and an outlet 20.

The dimensions of the microfluidic channel 16 may vary. As an example, the microfluidic channel may have a width ranging from about 20 μm to about 200 μm, from about 30 μm to about 100 μm, from about 40 μm to about 60 μm, or a width of about 50 μm, including all values and sub ranges in between, and the channel may have a height ranging from about 20 μm to about 500 μm, from about 30 μm to about 250 μm, from about 40 μm to about 100 μm, or a height of about 70 μm, including all values and sub ranges in between. The length may also vary. For example, in some embodiments, the microfluidic channel 16 may have a length ranging from about 2 cm to about 10 cm, from about 3 cm to about 7 cm, from about 4 cm to about 5 cm, or a length of about 4.5 cm, including all values and sub ranges in between. In some embodiments, the runway distance (L in FIG. 3, for example) from an inlet (or inlets) of the microfluidic chip 10 to the first expansion region 30 may also vary. For example, this runway distance may have length ranging from about 0.1 mm to about 10 mm, from about 0.5 mm to about 10 mm, from about 1 mm to about 10 mm, from about 2 mm cm to about 6 mm, or a length of about 4 mm.

In some embodiments, the dimensions of the microfluidic channel 16 may be chosen based on operational variables and/or the properties of the microfluidic chip 10 so as to enhance the capturing efficiency of the operation of the chip 10, miniaturize the chip 10, etc. For instance, the length of the microfluidic channel 16 and/or the runway distance may be selected based on the flow rate of fluids in the channel 16 and/or the properties of the substrate materials used to fabricate the microfluidic chip 10, such as but not limited to rigidity, porosity, etc. As an illustration, the runway distance may be made relatively shorter for a more rigid microfluidic chip 10 (i.e., fabricated out of stiffer materials) than one that is less rigid or deformable. For example, the runway distance may be entirely eliminated or shortened (e.g., 20% shorter, 40% shorter, 60% shorter, 80% shorter, 90% shorter, including all values and sub ranges in between), allowing for a microfluidic chip 10 that is miniaturized and/or contains additional expansion regions. In some embodiments, such microfluidic chips 10 may have similar or improved capturing efficiency or performance compared to ones fabricated out of deformable materials, such as polydimethylsiloxane (PDMS).

In some embodiments, the term "rigid" as used herein may be understood to generally refer to materials that deform or have a structural response at or below a certain amount when exposed to some level of stress or pressure. In some embodiments, a structural response may mean a deformation of the material, with deformation understood to include compression, stretching, bending, flexing, or otherwise changing shape or size. The amount of deformation may be at most about 10%, about 5%, about 1%, about 0%, etc., including all values and sub ranges in between. For instance, when the amount of deformation is 0%, the phrase "rigid material" may be understood to refer to a material that, when exposed to stress or pressure, maintains same linear dimensions as when the material is not under the stress or pressure. Linear dimensions include parameters such as length, width, height, radius, and/or the like. For example, the phrase "rigid microfluidic chip" may refer to a microfluidic chip where, when exposed to some amount of stress or pressure (for example, fluid pressure), one or more of the linear dimensions including the length, width and depth of the channels and/or the expansion regions deform by at most about 10%, about 5%, about 1%, etc., including all values and sub ranges in between.

In some embodiments, rigidity can be measured or represented in terms of Young's modulus. For example, the substrate may have a Young's modulus of at least about 50 MPa, at least about 100 MPa, at least about 500 MPa, at least about 1 GPa, at least about 50 GPa, from about 50 MPa to about 750 GPa, from about 500 MPa to about 50 GP, or from about 500 MPa to about 10 GPa.

In some embodiments, the chip substrate is made of a material selected from poly(methyl methacrylate) (PMMA), cyclic olefin polymer (COP), cyclic olefin copolymer (COC), and UV curable resins. Poly(methyl methacrylate) (PMMA) may have a Young's modulus of about 3 GPa and UV curable resins a Young's modulus of about 1-1000 MPa. Polydimethylsiloxane (PDMS), on the other hand, has Young's Modulus below 1 MPa, and as such may be considered as not rigid (i.e., deformable).

UV curable resins may include thermoset polyester (TPE), polyurethane methacrylate (PUMA), norland adhesive (NOA) and the like.

In some embodiments, the substrate may be made of a material other than PMMA, COP, COC or UV curable resins, such as glass (e.g., Pyrex), semiconductor materials such as but not limited to silicon and polymers (e.g., polydimethylsiloxane (PDMS), polystyrene (PS), polycarbonate (PC) or polyvinyl chloride (PVC)). For PDMS, soft lithography techniques may be used to create the microfluidic chip 10. In the PDMS embodiment, for mold fabrication, a 4 inch silicon wafer is spin-coated with a 70 μm thick layer of a negative photoresist (KMPR 1050, Microchem), and exposed to UV-light through a designed Cr-photomask and developed. PDMS (Sylgard 184, Dow Corning) was cast on to the prepared mold and degassed. Cured PDMS cast was separated from the mold and the inlet 18 and outlet 20 were punched with a pin vise (Pin vise set A, Syneo). The now-punched PDMS layer was bonded to a slide glass by exposing both PDMS and a slide glass surfaces to air plasma (Plasma Cleaner, Harrick Plasma) to enclose the device.

Microfluidic chips fabricated from deformable materials such as PDMS may have structures that deform under conditions of high fluid pressure, such structures including channels and expansion regions. The deformation may occur in the form of expanded channels and/or deformed expansion regions, in particular those expansion regions that are closer to the inlets that receive the fluids. For example, when used to isolate and trap circulating tumor cell (CTC) with PDMS based devices, over 60% deformation in the first few expansion regions may occur (FIG. 13), and the isolation and the trapping of the CTC may take place at the expansion regions closer to the outlet(s) of the microfluidic chips where the fluid pressure is reduced.

The relatively higher rigidity of PMMA, COP, COC, and UV curable resins substantially reduces or eliminates the deformation of microfluidic chips relative to more deformable materials. In addition, fabrication of PDMS microfluidic chips can be difficult and not readily reproducible, besides having limited bonding strength (e.g., chip delamination at high fluid flow rates) which is why rigid materials such as PMMA overall facilitates the manufacturing process.

The use of materials with properties favorable to the trapping of cells in the expansion regions of microfluidic chips and/or an advantageous design choice for the components of the microfluidic chip (e.g., channel and expansion region dimensions and shapes, etc.) in forming the microfluidic chip 10 may facilitate the isolation and trapping of cells in the expansion regions 30 of the chip 10. In some embodiments, such materials, examples of which include PMMA, PUMA, TPE, NOA, COP, COC, etc., and/or design choices can decrease or eliminate device deformation. For example, in some embodiments, rigid microfluidic chips may be constructed so as to reduce the amount of air bubbles that accumulate in the expansion regions.

An example of a design choice for fabricating a rigid microfluidic chip 10 (e.g., formed from a rigid plastic material) includes a channel 16 width ranging from about 20 μm to about 100 μm, from about 30 μm to about 60 μm, a width of about 40 μm, including all values and sub ranges in between, a channel 16 depth or height ranging from about 20 μm to about 200 μm, from about 50 μm to about 100 μm, from about 80 μm to about 85 μm, including all values and sub ranges in between, a channel 16 length ranging from about 500 μm to about 6 mm, from about 700 μm to about 2 mm, a length of about 1 mm, a length of about 4 mm, including all values and sub ranges in between.

Further, the expansion regions 30 may have same or similar depths as that of the channel. The expansion region 30 total width, however, may be in the range from about from about 150 μm to about 2000 μm, from about 250 μm to about 750 μm, a width of about 100 μm, including all values and sub ranges in between (total width of the expansion region may include the width of the channel traversing through it), and the length may be in the range from about from about 200 μm to about 2 mm, from about 500 μm to about 1 mm, from about 700 μm to about 750 μm, a length of about 720 μm, including all values and sub ranges in between. The expansion regions 30 may also be shaped in cross-section (e.g., square, rectangular, etc. in X-Y, Y-Z or X-Z planes including distorted channel or triangular cross-section) so as to improve the capturing and retention of cells in the regions 30.

The use of the above-described materials to form the microfluidic chip and the design choice for the structure of the device may enhance the performance of the device and/or reduce its size. For example, with the deformability of the first few expansion regions (from the fluid inlets) that occur in less rigid or deformable devices reduced or eliminated, the runway distance may be reduced. For example, the runway distance may be reduced which allows the number of expansion regions to be increased (with same sized or even shorter microfluidic chip 10), leading to an improved efficiency and performance. In some embodiments, the average separation between consecutive expansion regions may also decrease.

In the embodiment of FIG. 1A, the inlet 18 of a rigid microfluidic chip 10 may include two inlets—inlet 18' and inlet 18". The first inlet 18' is used to introduce the solution containing the heterogeneous population of cells 12. The second inlet 18" is used to introduce a second, different solution. As explained in more detail below, the second inlet 18" may be used to introduce a wash solution, label (e.g., fluorescent label, antibody, nucleic acid dye, fluorogenic substrate), or other chemical agent (e.g., fixation agent or permeabilization agent) into the microfluidic channel 16. In some embodiments, there may be a single inlet 18 that can be used to introduce the solution as well as the washing solution, and a single outlet 20 for discharging fluids that traversed the channel 16. In some embodiments, there may be a plurality of channels 16, and these channels 16 may share one or more inlets and one or more outlets 20, each inlet 18 configured to be used for introducing the cell solution and/or the washing solution or fluid into any number of channels 16 and each outlet configured to be used for discharging fluids that traversed any one of the channel 16s. For example, the rigid microfluidic chip 10 may have about 8 channels 16, and these channels 16 may share a single inlet 18 and a single outlet 20.

As seen in FIG. 1A, the inlets 18', 18" are coupled to respective pumps 22, 24. Each pump 22, 24 can be used to deliver a set flow rate of the respective solution to the microfluidic chip 10. Generally, any type of pump known to those skilled in the art may be used. These include, without limitation, syringe pumps, pumps operating on pressurized air to pump fluid, peristaltic or positive displacement pumps.

FIG. 1A illustrates syringe pumps 22, 24 used with the microfluidic chip 10. For example, a Harvard Apparatus, PHD 2000 syringe pump or #70300 syringe pump may be used to sustain a desired overall flow rate. In some embodiments, pumps 22, 24 can be used to generate and sustain a flow rate ranging from about 100 µl/min to about 30 ml/min, from about 500 µl/min to about 20 ml/min, from about 1 ml/min to about 15 ml/min, from about 2 ml/min to about 12 ml/min, including all values and sub ranges in between.

FIG. 1A illustrates a computer 40 that can be used as part of a system 100 to control the rigid microfluidic chip 10. The computer 40 typically contains at least one processor 42 therein that executes software residing in or stored on the computer 40. The computer 40 also may include a monitor 44 that can be used to input and/or display various parameters of the microfluidic chip 10, such as a touchscreen. These may include, for example, flow rates of pumps 22, 24, volume of fluid contained in pumps 22, 24, and other operational data (air pressure, statuses such as progress, errors, instructions, and the like). The computer 40 may interface with the pumps 22, 24 such that the computer 40 is able to adjust the individual flow rates or operational states of the pumps 22, 24. The interface between the computer 40 and the pumps 22, 24 or the microfluidic chip 10 may be wired and/or wireless. The computer 40 may control the pumps 22, 24 automatically using a preset algorithm or set of instructions stored in the computer 40. Alternatively, control of the pumps 22, 24 may be manually adjusted using an interface device commonly used with computers (e.g., keyboard, mouse, touchscreen, etc.). The computer 40 may be a portable device such as a smartphone, a tablet, a PDA, etc.

During solution exchange operations, the computer 40 can ensure that the desired flow of solution is maintained in the microfluidic chip 10. For instance, when one pump 22 is slowed or even turned off, the flow rate of the second pump 24 may be increased so as to maintain the desired flow rate.

FIG. 1B illustrates a system 200 that uses a pressure driven pumping system 46. The pumping system 46 uses a source of pressurized gas 48 along with regulators 50 to pump a first fluid 52 (e.g., wash) and second fluid 54 (e.g. blood) into the chip 10. In this system 200, liquid valves 56, 58 are provided on the input and output, respectively, of the chip 10. A computer 40 is configured to control the pressure driven pumping system 46 and the liquid valves 56, 58. For example, valve 56 may be used to open or close flow of either the first fluid 52 or the second fluid 54 to the chip 10. Valve 58 can be used to switch outlet flows between a waste receptacle 60 and a collection device 62 which may include, as an example, a 96 well plate.

As seen in FIG. 1A, the microfluidic channel 16 includes a plurality of expansion regions 30 located at selected points along the length of the micro fluidic channel 16. The expansion regions 30 provide an abrupt increase in the width of the microfluidic channel 16 that, at or above certain threshold flow rates, create a detached boundary layer that causes the formation of vortices within each expansion region 30. In some embodiments, the vortices created within the expansion regions 30 may trap a subpopulation of cells 12 from a solution of heterogeneous cells 12 traveling through the micro fluidic chip 10. In some embodiments, these vortices, however, can be different from the vortices created in the streamwise direction such as Dean vortices created in curved channel flows with inertia (See J. Wang et al., Vortex-assisted DNA Delivery, Lab Chip, 2010, 10, 2057-2061 (2010)) or vortices created due to asymmetrically structured microchannels (See Stott et al., Isolation of Circulating Tumor Cells Using a Microvortex-Generating Herringbone-Chip, Proc Natl. Acad. Sci. 107(43): 18392-7 (2010)). The size of the vortices created within the expansion region 30 may be increased by increasing the Reynolds number of the flow, which may be defined by the expression $R_C = \rho UW/\mu$, where U is the maximum fluid velocity, W is the channel dimension (prior to expansion if the channel expands during operation), $\mu$ is the fluid viscosity and $\rho$ is the fluid density.

As explained in more detail below, cells 12 above a certain threshold or cutoff size (which depends on the flow rate and geometry of the micro fluidic chip 10) enter the expansion regions 30 and get caught or trapped within the re-circulating vortices. Cells 12 that are below the threshold size may not get caught and continue to flow downstream in the microfluidic chip 10. The efficiency and performance of the rigid microfluidic chip 10 in trapping the cells 12 can depend on a variety of factors, including, but not limited to, the size of the cells, the number and geometry (e.g., size, shape, etc.) of the expansion regions 30, the types of materials used to fabricate the rigid microfluidic chip 10 (e.g., the device's rigidity, porosity, etc.), the flow rate through each channel, and/or the like. Example 4 below provides several experimental results demonstrating the effects of at least some of these factors on the performance of the microfluidic chip 10. For example, the expansion region 30 can be rectangular as illustrated in FIG. 1A but it may also include a square, triangle, polygonal, or semi-circular profile as illustrated in FIGS. 1C-1G. For rectangular-shaped expansion regions 30 the trapping ability is better with the long side of the expansion region 30 being oriented parallel to the main microfluidic channel 16. Generally, the expansion regions 30 could be shaped and sized so as to facilitate enhanced capturing and trapping of the cells 12. For example, the leading wall 31 (illustrated in FIG. 1C) of the expansion region 30 may be angled at or above about 45° with respect to the flow direction of the upstream microfluidic channel 16. In some embodiments, the angle may be above about 45° but less than about 90°, less than about 75°, less than about 60°, etc. In some embodiments, the angle may even above 90° (e.g., diamond-like shapes).

FIG. 1C illustrates a single expansion region 30 along with the upstream micro fluidic channel 16. As stated above, the leading wall 31 may be angled at or above 45° with respect to the axis of flow illustrated as dashed line A in FIG. 1C. In this regard, the expansion region 30 is an abrupt expansion in cross-sectional dimension (e.g., width or height) compared to the cross-sectional dimension in the immediately upstream portion of micro fluidic channel 16. In the embodiment of FIG. 1C, the leading wall 31 is angled just less than 90°. The expansion region 30 also has a trailing wall 33. The trailing wall 33 may be angled with respect to the flow direction A so as to facilitate enhanced capturing and trapping of the cells 12. In some embodiments, the angle of the trailing wall 33 can have any value. For example, in one embodiment, the trailing wall 33 may be angled a small amount which causes the trailing wall 33 to gradually taper back to the width of the microfluidic channel 16. In yet another alternative, there is no trailing wall 33 and the expansion does not return to the original dimension of the microfluidic channel 16.

Figure 1H:
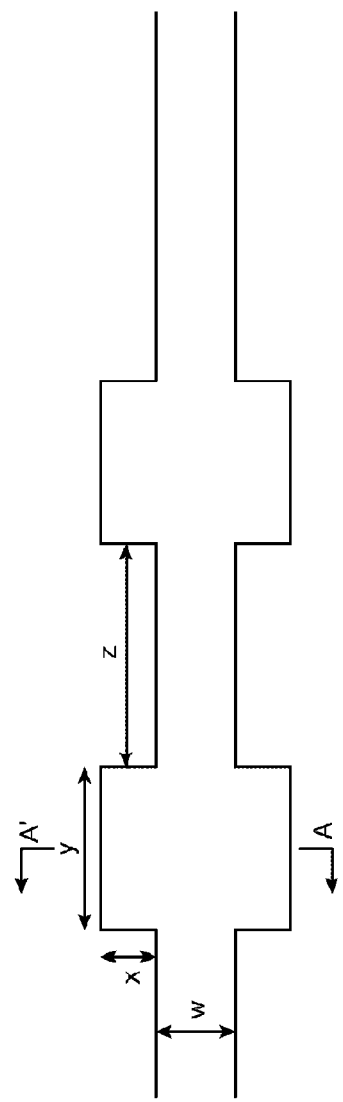
FIG. 1H illustrates a plan view of a microfluidic channel with multiple expansion regions.
Figure 1I:
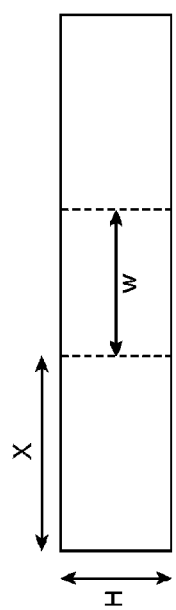
FIG. 1I illustrates a cross-sectional view taken along the line A-A' of FIG. 1H.
Figure 1J:
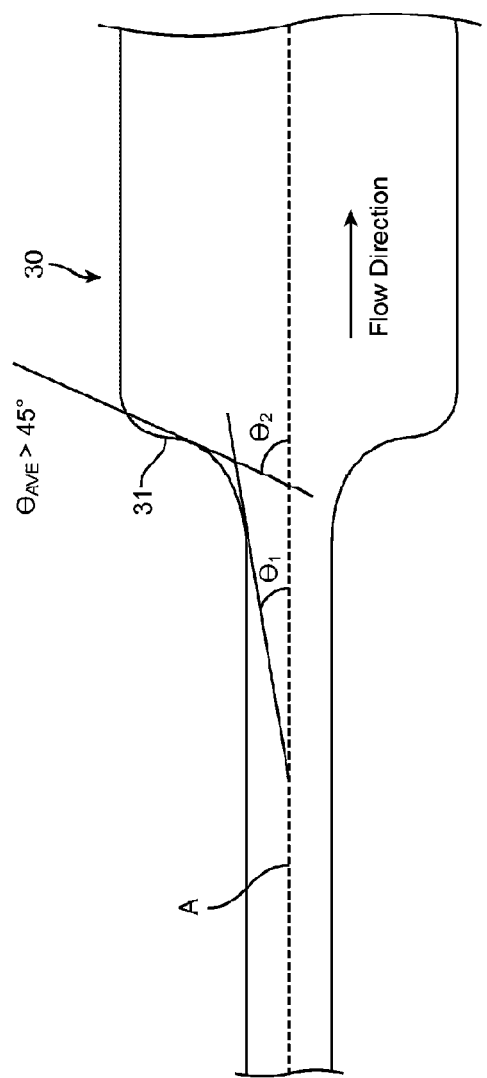
FIG. 1J illustrates a schematic representation of a microfluidic channel with an expansion region according to another aspect of the application.

In another embodiment as illustrated in FIG. 1J, the expansion region 30 includes a leading wall 31 that is curved. In this regard, the leading wall 31 initially starts a gradual divergence away from the upstream microfluidic channel 16 that increasingly diverges along the length of the leading wall 31. In this embodiment, various tangents taken along different points of the leading wall 31 may have significantly different angles compared to the axis of flow A. For example, near the start of the leading wall 31, the angle $\theta_1$ is low and less than 45°. However, near the end of the leading wall 31, the angle $\theta_2$ may be steep and more than 45°. In the case of curved or discontinuous expansion regions 30 like what is illustrated in FIG. 1J, an average angle $\theta_{AVE}$ which represents the average angle with respect to the axis of flow A along the entire length of the leading wall 31 can be greater than 45 ($\theta_{AVE} > 45°$).

FIG. 1H illustrates a plan view of several expansion regions 30 located along a length of a microfluidic channel 16. FIG. 1I illustrates a cross-sectional view taken along the line A-A' of FIG. 1H. Both FIGS. 1H and 1I illustrate various dimensions of the microfluidic channel 16 and expansion regions 30. As stated previously, dimensions for the width (w) of microfluidic channel 16 can be in the range of from about from about 10 µm to about 100 µm, from about 20 µm to about 60 µm, about 40 µm, including all values and sub ranges in between. Dimensions for the height (H) of the microfluidic channel 16 can be in the range from about 20 µm to about 200 µm, from about 50 µm to about 100 µm, from about 80 µm to about 85 µm, including all values and sub ranges in between. The expansion region 30 may extend a distance (x) that is in the range from about 80 µm to about 1000 µm, from about 200 µm to about 800 µm, from about 400 µm to about 600 µm, about 480 µm, including all values and sub ranges in between. The expansion region 30 may extend a distance (y) that is in the range from about 200 µm to about 2 mm, from about 500 µm to about 1 mm, from about 700 µm to about 750 µm, a length of about 720 µm, including all values and sub ranges in between. Adjacent expansion regions 30 may be separated by distances (z) in the range from about 20 µm to about 2 mm, from about 200 µm to about 1.5 mm, 0.75 mm to about 1.25 mm, including all values and sub ranges in between. In some embodiments, there may be a single expansion region 30 such that there is no opposite expansion region 30. The cross-sectional profile of the microfluidic channel 16 may be substantially rectangular, trapezoidal, square, etc. The microfabrication process can lead to slightly trapezoidal cross-sections or corners that are slightly rounded. The channels 16 may also have cross-sections shaped in any one of circular, semi-circular, rectangular, square, (e.g., distorted cross-sections) etc., shapes. These variations are intended to be covered by the methods and devices described herein.

Figure 3:
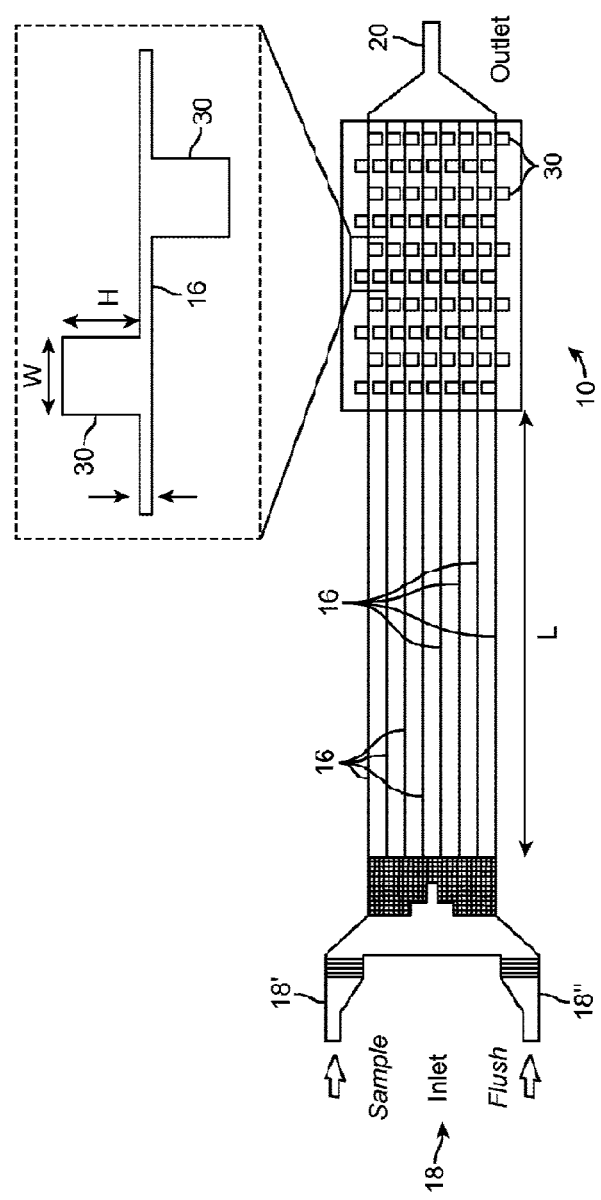
FIG. 3 illustrates another microfluidic chip for isolating cells having a parallel configuration.

Referring back to FIG. 1A, the expansion regions 30 may be disposed on opposing sides of the microfluidic channel 16. This may allow a single microfluidic channel 16 to have greater capturing capabilities. Moreover, as explained in more detail below, this configuration may allow a staggered arrangement of expansion regions 30 when multiple channels 16 are aligned in a parallel configuration. That is to say, adjacent microfluidic channels 16 can be closely packed together because expansion regions 30 are offset from one another and interleave with expansion regions 30 on adjacent microfluidic channels 16 as seen in FIG. 3. Still referring to FIG. 1A, the larger-sized cells 12 may be trapped within the expansion regions 30 while the smaller-sized cells 12 may not be trapped and continue to flow down the microfluidic channel 16 where they exit via outlet 20, where the larger-sized cells 12 (those illustrated in the expansion regions 30) are trapped within vortices created within the expansion regions 30, while the smaller-sized cells 12, due to their size they may not be trapped within the vortex flow and pass out of the expansion regions 30. The cutoff for being trapped or not may depend on a variety of factors, including cell size, channel 16 and expansion region 30 dimensions, fluid flow rate, fluid viscosity, and/or the like.

Figure 2:
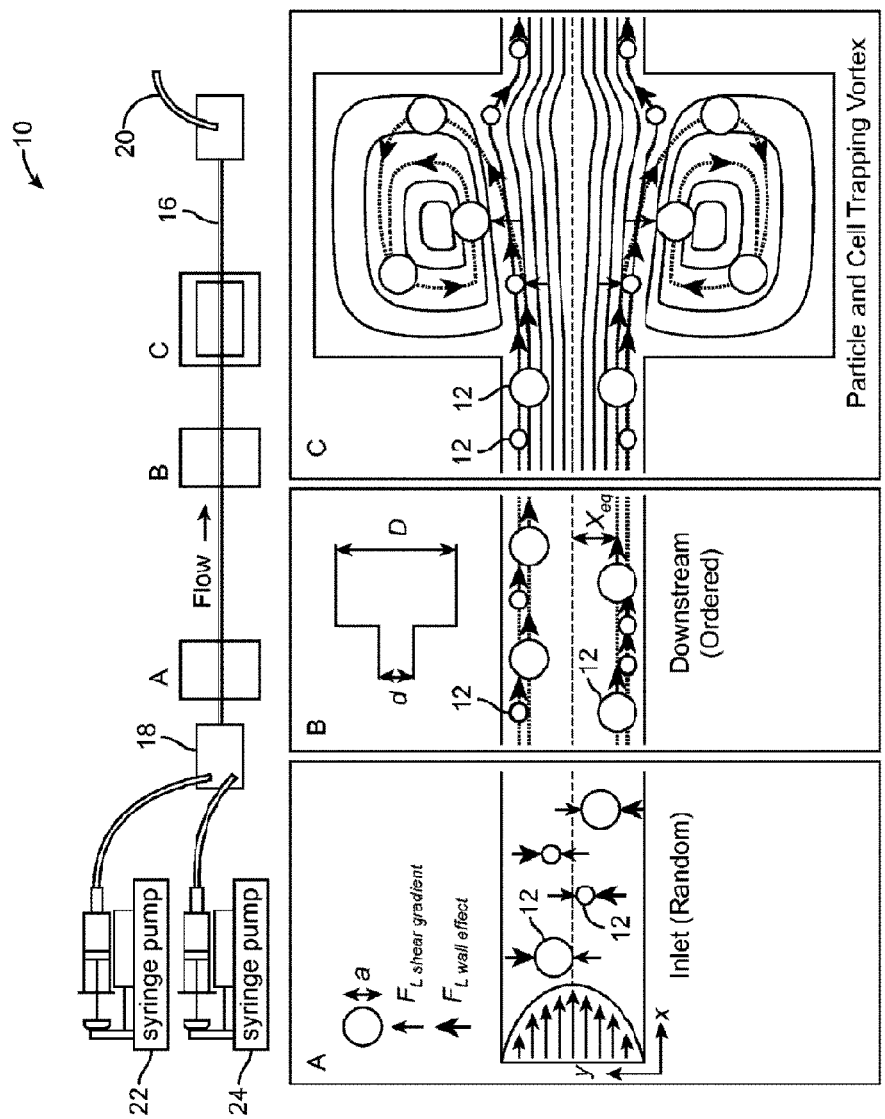
FIG. 2 illustrates a schematic view of a microfluidic chip for isolating cells. Also included are graphical representations of forces acting on differing cell sizes at different points along the microfluidic chip.

FIG. 2 illustrates a rigid microfluidic chip 10 for isolating cells 12 from a heterogeneous solution containing cells 12 of different sizes as well as corresponding flows within the microfluidic channel 16 and expansion regions 30. FIG. 2 illustrates magnified views of three regions of the rigid microfluidic channel 16 and expansion regions 30 as identified by views A, B, and C. As seen in view A, a heterogeneous population of different sized cells 12 is pumped into the device via one of the syringe pumps 22, 24. The other syringe pump may contain a wash or other solution such as PBS. As discussed earlier, a single pump may be used to pump both the solution containing the cell population as well as the washing solution. Initially, as seen in view A, the cells 12 are randomly dispersed is the y-direction. The cells 12 experience two counteracting forces—a shear gradient lift force (FL shear gradient) that acts on the cells 12 to move the same toward the walls of the microfluidic channel 16 and a wall effect lift force (FL wall effect) that repels cells 12 away from the walls of the microfluidic channel 16.

By using a straight microfluidic channel 16, the dynamic equilibrium positions of the flowing cells 12 results in a dynamic lateral equilibrium position $X_{eq}$ and uniform cell velocities as illustrated in view B of FIG. 2. Here, $X_{eq}$ is defined as the distance between the center of cells 12 and the wall of the microfluidic channel 16. As the cells 12 progress to the expansion regions 30 (in FIG. 2 there are two (2) opposing expansion regions 30), the larger cells 12 experiencing a larger $F_L$ shear gradient are pushed toward the vortex center and trapped, whereas the smaller cells 12 are flushed out of the expansion regions 30 and into the channel where they continue the downstream flow to the outlet 20. Generally the FL shear gradient force scales with the cube of the cell diameter (a), causing larger cells 12 to experience a larger FL shear gradient force. Size-dependent lateral migration drives cells 12 across streamlines past the detached boundary (separatrix) toward the vortex core where the cells 12 remain isolated and orbiting in the vortex. This enables size-selective trapping, as below a size cutoff, cells do not migrate at a sufficient rate to pass the separatrix and remain in focused streams, flowing out of the outlet 20.

FIG. 3 illustrates another embodiment of a rigid microfluidic chip 10 for isolating cells 12 that includes a plurality of channels 16 coupled to an inlet 18 and an outlet 20. FIG. 3 illustrates eight (8) separate channels 16 that arranged generally parallel to one another. Each microfluidic channel 16 has ten (10) separate expansion regions 30. Of course, it should be understood that any number of channels 16 may be used (e.g., with the total system flow rate being adjusted such that each functional channel has the desired Reynolds number). The same applies with respect to the number of separate expansion regions 30 along a single microfluidic channel 16, i.e., any number of expansion regions 30 separated by some distance downstream along the channel length may be used. For example, the separation distance between consecutive expansion regions 30 may be about 1 mm. Additional channels 16 may be added to create a massively parallel chip 10. The channels 16 can be straight with expansion regions 30 on adjacent channels 16 being staggered with respect to one other. This design allows for adjacent channels 16 to be placed close to one another, thereby reducing the overall footprint of the microfluidic chip 10. In some embodiments, expansion regions 30 may be located opposite from each other across the channel 16 (as illustrated in FIGS. 1H and 2C). While FIG. 3 illustrates an array of channels 16 in a two-dimensional layout it should be understood that the array of channels 16 could also be configured in a three-dimensional layout. The three-dimensional configuration would allow even more throughput.

In the device of FIG. 3, the microfluidic channel 16 is a rectangular high-aspect ratio channel with a width of about 50 μm and a height of about 70 μm. The inlet 18 includes a first inlet 18' for the sample containing the cells 12 and a second inlet 18" that contains PBS or other wash solution. The duel inlet 18', 18" arrangement allows for a rapid solution exchange within the microfluidic chip 10, providing, for example, a means to flush unmapped cells 12 and to enhance the final enrichment ratio and the purity of the collected samples. The length of the microfluidic chip 10 was several centimeters long. The expansion regions 30 were placed in an alternating pattern in order to place the maximum number of expansion regions 30 in a given compact footprint. In the device of FIG. 3, the expansion regions were squares having dimensions of about 400 μm×about 400 μm.

Once the cells 12 are trapped within the expansion regions 30, the cells 12 may be released from the expansion regions 30 by allowing the vortices to reduce in size and ultimately dissipate. This can be accomplished by lowering the input flow rate (e.g., reduce flow rate(s) of pumps 22, 24). The reduced flow rate reduced the vortex size allowing the cells 12 trapped therein to be released into the flow of the microfluidic channel 16 and carried out the outlet 20 of the device. In some embodiments, a flow rate of around 4 ml/minute has been found to work well with the device embodiment discussed in the preceding paragraph. Alternatively, the flow rate may be rapidly decreased to substantially zero to stop the flow of fluid through the microfluidic chip 10. In this alternative, the cells 12 can be collected on-chip rather than off-chip. In other embodiments, the flow rate may be rapidly decreased to substantially zero to stop the flow of fluid through the microfluidic chip to allow the vortices to dissipate, followed by a flush at a relatively low flow rate.

To prevent large irregular debris (owing to dust or particulates in blood, or platelets/cell clots) from entering and obstructing the microchannels leading to the reservoirs, the chip may include a filtration mechanism upstream from the functional device region. The filter may be located within the microfluidic chip (e.g., patterned micropillar array features) or along a fluid path before the chip (e.g., an external porous membrane filter). The filter features include gaps ranging between about 30 microns to about 100 microns, about 40 microns to about 100 microns or even about 50 microns to about 100 microns and spaced across the cross-sectional diameter of the flow path to ensure proper filtration of the fluids before entering the vortex regions. The filter features may be designed with sufficient working area, arrangement, and geometry as to not become entirely colluded during the processing of a sample. The features may also be designed to avoid a collapse of the fluidic features during the manufacturing of the chips.

With PDMS microfluidic chips, which are deformable, more cells may be captured at the expansion regions that are located closer to the outlets (i.e., towards the end of the channel) than those located closer to the inlets, partly because those expansion regions may be less deformed than the ones in the vicinity of the inlets. In some embodiments, absence or near absence of deformation in rigid microfluidic chips may allow for better control of important operational parameters that may be aid in maintaining optimal vortex functional characteristics such as velocity throughout the micro-fluidic device. The majority of the cells may in fact be captured towards the inlet of the fabricated devices, i.e. an inversion occurs in the capture pattern compared to that of a PDMS micro-fluidic device, for example. This can facilitate the miniaturization of rigid microfluidic chip 10, since the runway distance and/or the number of expansion regions 30 can be decreased with little or no negative impact on performance of the microfluidic chip 10. By spreading and increasing the capture all along the channel length (e.g., for rigid plastic chips) compared to only at the exit of the device or chip (e.g., for deformable PDMS chips), the overall efficiency and performance of the chip or microfluidic chip 10 (e.g., capture capacity as measured by the total number of cells that can be captured by a given device) can also be significantly increased. The shortening of the microfluidic chip may also aid in lowering the pressure drop. Further, the straight channel upstream that one may use to align cells or particles in deformed regions could then be removed, thereby further reducing the size of the microfluidic chip 10, or optionally replaced with extra expansion regions 30.

In some embodiments, the rigidity of the materials used for fabricating microfluidic chips may facilitate the reproducibility of important dimensions of the device, yielding an improved control of important flow parameters throughout the device and leading to an improved efficiency and performance by the microfluidic chip (e.g., in terms of increased cell capture efficiency). Further, the reproducibility of the fabrication of microfluidic chips can contribute to high volume production processes, which in turn may result in higher fabrication reproducibility, quality, and higher yield devices that can maintain important dimensional requirements relative to optimal performance. In addition, in some embodiments, bonding strength may be robust and reproducible, reducing or eliminating delamination effects that may occur with PDMS based microfluidic chips under high flow rate.

The reproducibility of the fabrication of rigid microfluidic chips is in contrast to PDMS devices where the deformability can hinder the reproducibility of important dimensions during fabrication of PDMS microfluidic chips, leading to less control and less efficiency in device performance. The improved efficiency that obtains from rigid microfluidic chips can be seen from comparison of rigid and PDMS microfluidic chips. For example, relatively fewer circulating tumor cells (CTCs) are lost when isolated and trapped by a rigid microfluidic chip compared to that of PDMS based devices. Examples of rigid materials that allow for reproducibility of dimensions in during fabrication of rigid microfluidic chips include TPE, PUMA, NOA, and/or the like.

Further, in some embodiments, the fabrication of rigid microfluidic chips can be accomplished by a variety of processes, including (i) conventional methods of photolithography used for semiconductor microfabrication, with photoresist deposition and deep etching, (ii) Plastic embossing methods, i.e. hot or soft embossing, using materials such as copolymers (COC), cyclic olefin polymers (COP), polycarbonate (PC), and the like, (iii) conventional photolithography but using poly(methyl methacrylate) (PMMA), photoresist deposition and etching, (iv) Injection molding methods, with a combination of thin film lithography, etching and molding, (v) Micromachining, (vi) direct chemical etching, (vii) laminating methods to build/construct layers, and/or the like.

Multilayer Cartridge Assembly

FIG. 15 is a schematic illustration of a multi-layer cartridge assembly 200. The multi-layer cartridge assembly 200 is adapted to be removably coupled to a system for isolation of cells or particles and includes a microfluidic chip 210

(also referred to as a "microfluidic chip") and a carrier 220. The carrier 220 can be a machined cartridge. The carrier 220 (also referred to as a "cartridge") can be shaped and sized to couple to and/or house the microfluidic chip 210. In some embodiments, the microfluidic chip 210 is rigid such that the microfluidic chip 210 is resistant to deformation under the pressure of fluid flow through the microfluidic chip 210. As shown in FIG. 15, in some embodiments, the cartridge assembly includes a pocket to retain the microfluidic chip 210. The microfluidic chip 210 can be easily replaced with another microfluidic chip 210 (or additional chips added to the cartridge) designed to accommodate different analytical requirements (e.g., including a different micro-fluidic device flow path layout, a different microfluidic channel geometry, and/or different optical and/or electrical/electronic interfacing elements). Although only one microfluidic chip 210 is shown, any suitable number of microfluidic chips 210 can be coupled to and/or housed within the carrier 220 to expand the functionality, performance and analysis capability of the multi-layer cartridge assembly 200. For example, several microfluidic chips 210 can be inserted in parallel or series, each microfluidic chip 210 having similar or different layouts in comparison with the other microfluidic chip 210 to support various analytical methods.

The multi-layer cartridge assembly 200 can be similar in structure and function to the molded multi-layer cartridge assembly 100 described below with reference to FIGS. 17-23. For example, in some embodiments, as shown in FIG. 15, a bottom layer of the multi-layer cartridge assembly 200 can include adapters, such as a first adapter 225A, a second adapter 225B, and a third adapter 225C (collectively "adapters 225"), for attachment of various vessels for housing a fluid, such as various size Falcon tubes, 8-well strips, microscope chamber slides, small and petri dishes, Eppendorf tubes, custom collection containers, and the like, to the carrier 220. In some embodiments, the container adapters 225 can be an integral part of the cartridge (i.e., the adapters 225 and the bottom layer are formed as a unitary structure), lowering part count, costs and assembly complexity. In some embodiments, as shown in FIG. 15, the bottom layer can include a universal adapter 225D for attaching various collection containers. The universal adapter 225D can be engaged on the underside of the carrier 220 (i.e., coupled to the bottom surface of the bottom layer). A variety of holders can be engaged with the universal adapter 225D such that a variety of collection containers, such as, for example, microscope chamber slides, 8-well strips, small petri dishes, various size Eppendorf tubes, various size Falcon tubes, custom collection containers, and the like, can be fluidically coupled to and disengaged from the universal adapter 225D. In some embodiments, the holders can be custom-designed for particular collection containers. The collection containers can be selected by the user depending upon the needs of the user, such as, for example, the assay downstream.

Similarly to the molded multi-layer cartridge assembly 100 described below, the multi-layer cartridge assembly 200 can include a top layer 222 that includes ingress and egress fluidic pathways. The fluidic pathways can be formed as a shaped features (e.g., circular or rectangular) and can be made from compliant materials such that the fluidic pathways can form a leak tight seal. In some embodiments, the top layer 222 can include apertures for receiving actuating elements (also referred to herein as "actuators") such that the actuating elements with gaskets form valves to manipulate fluid flow in microfluidic channels, as represented by actuator valves V1-V8 and V11-V13. Ingress and egress of fluids through the multi-layer cartridge assembly 200 can be controlled via solenoid valves.

Figure 17:
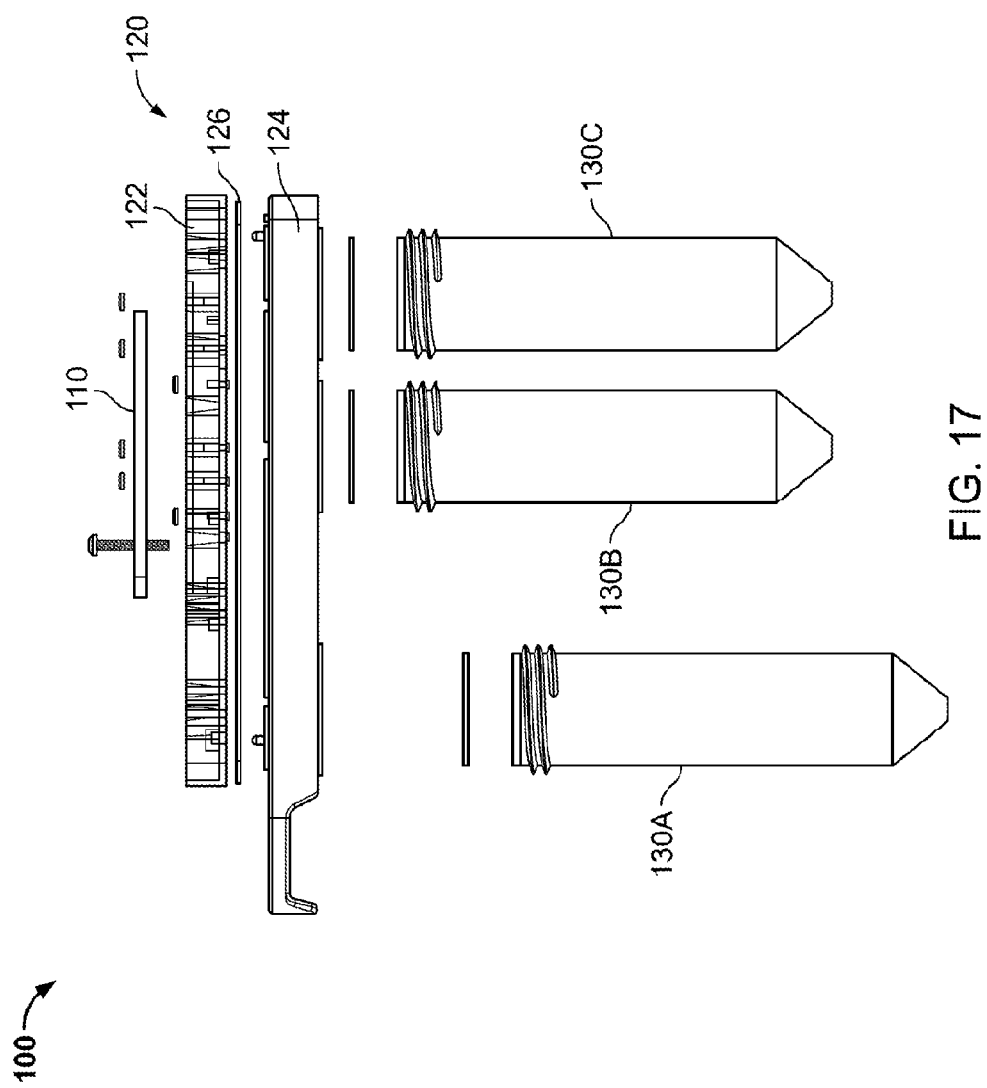
FIG. 17 is an exploded side view of a multi-layer cartridge assembly for vortex-based isolation and trapping of particles, according to an embodiment.
Figure 18:
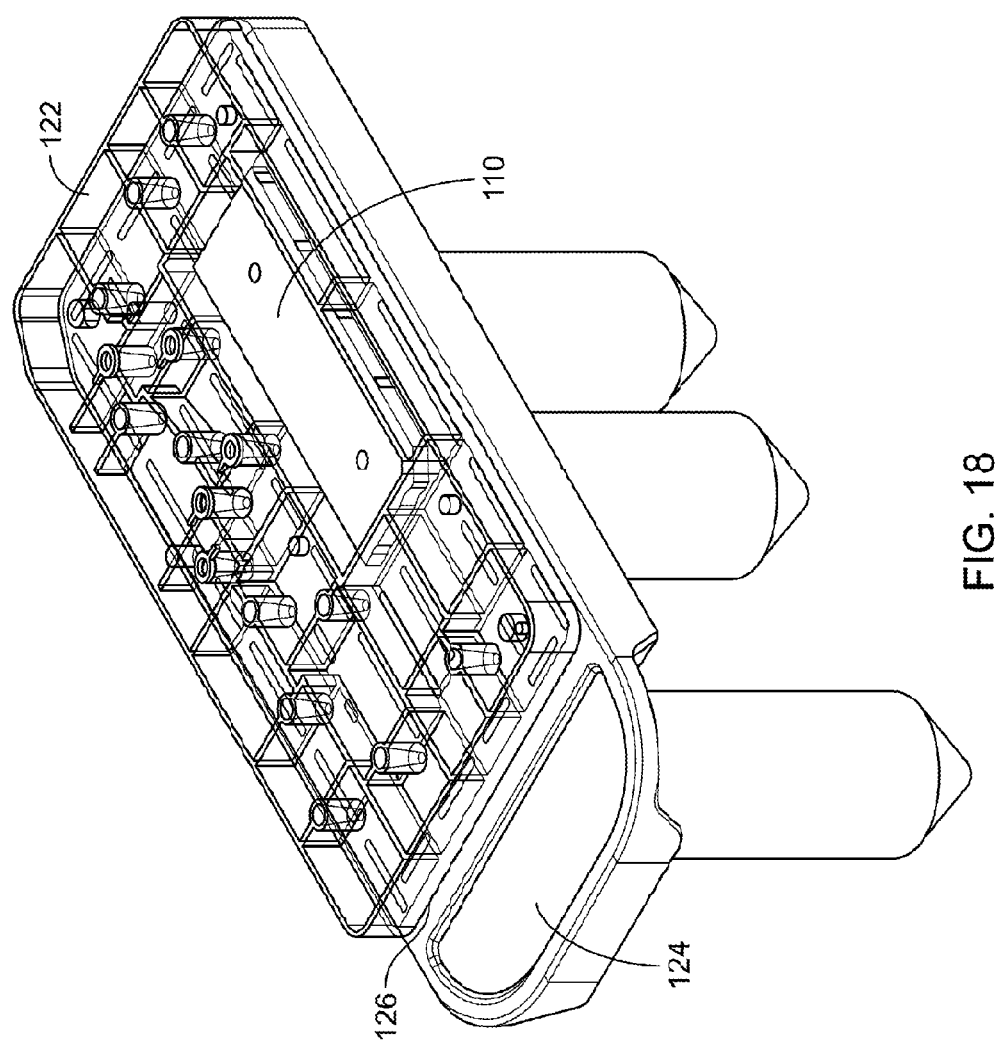
FIG. 18 is a perspective view of the multi-layer cartridge assembly of FIG. 17 in a first configuration.

FIGS. 17-23 illustrate an example multi-layer cartridge assembly and views of various components of the assembly, according to an embodiment. The multi-layer cartridge assembly 100 includes a microfluidic chip 110 and a carrier 120 (i.e., cartridge) shaped and sized to couple to and/or house the microfluidic chip 110. In some embodiments, the microfluidic chip 110 can be rigid such that the microfluidic chip 110 is resistant to deformation under the pressure of fluid flow through the microfluidic chip 110. As shown in FIG. 18, in some embodiments, the cartridge assembly includes a pocket to retain the microfluidic chip 110. The pocket may include a pocket corner cutout to provide a directional locator for placement of the chip.

Figure 19:
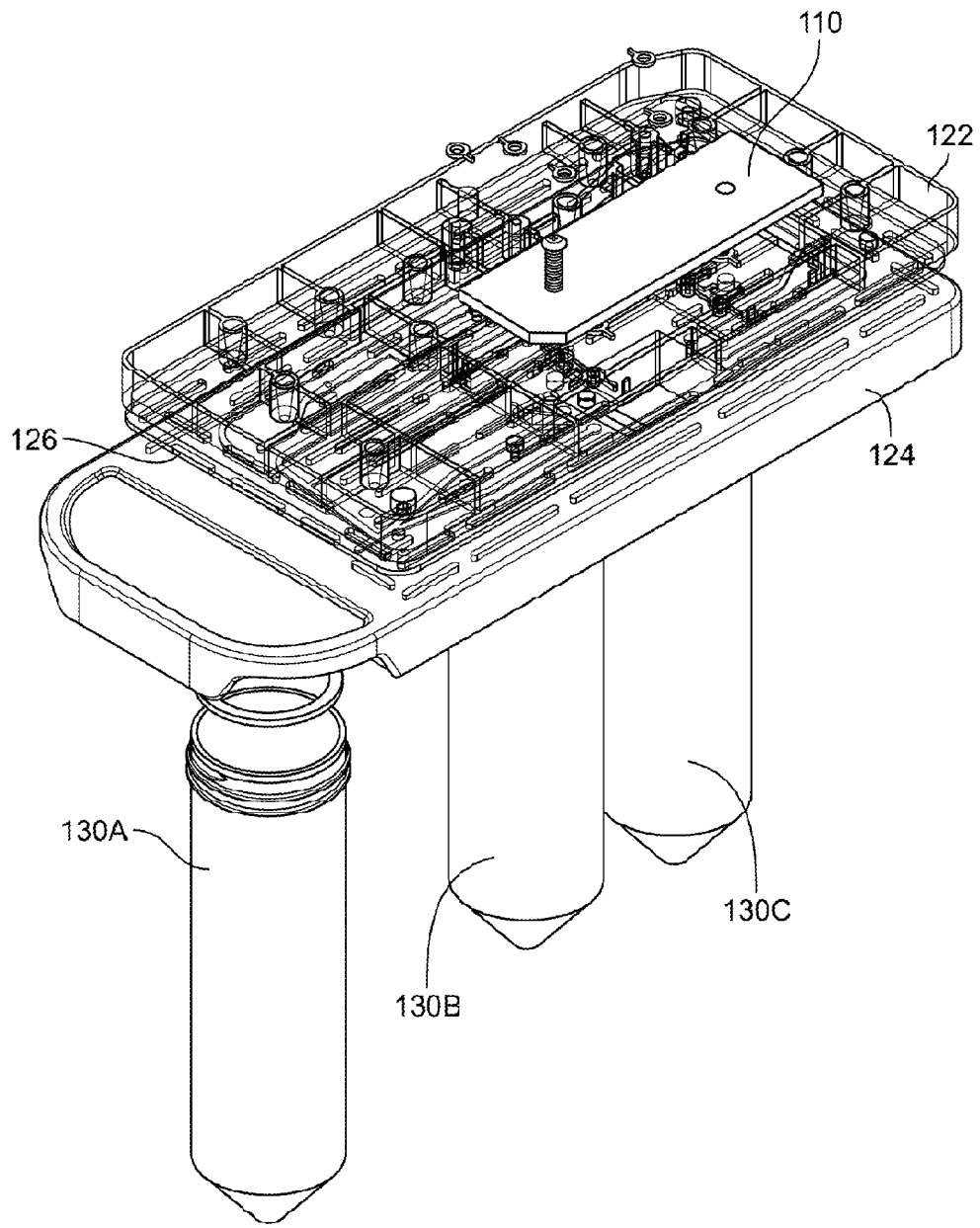
FIG. 19 is a perspective view of the multi-layer cartridge assembly of FIG. 17 in the second configuration, with a gasket shown as being transparent, revealing microfluidic channels on a bottom layer of the multi-layer cartridge assembly.
Figure 20A:
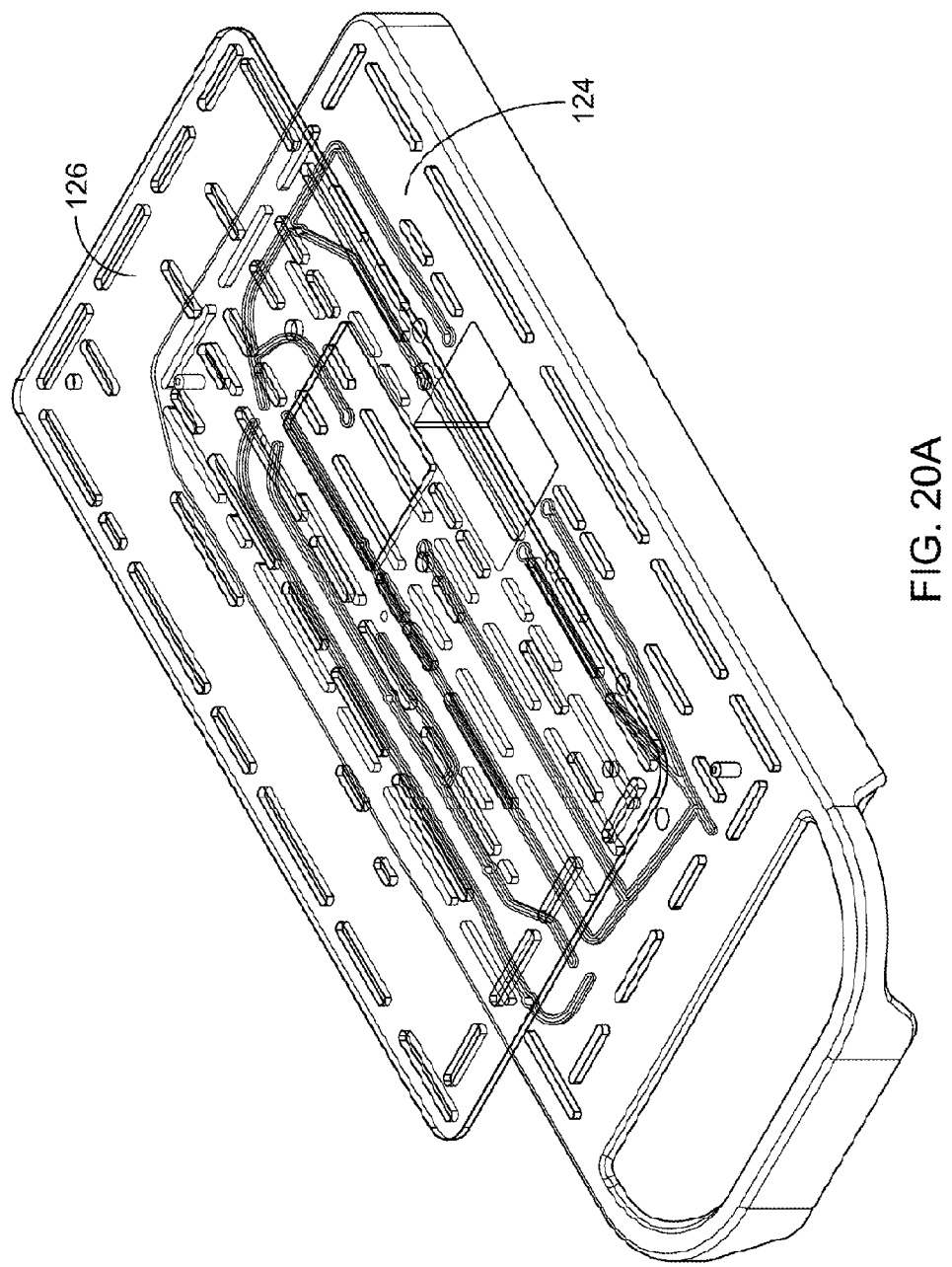
FIG. 20A is an exploded perspective view of the gasket and a bottom layer of a carrier of the multi-layer cartridge assembly of FIG. 17. The bottom layer defines microfluidic channels providing means for fluid flow.
Figure 20B:
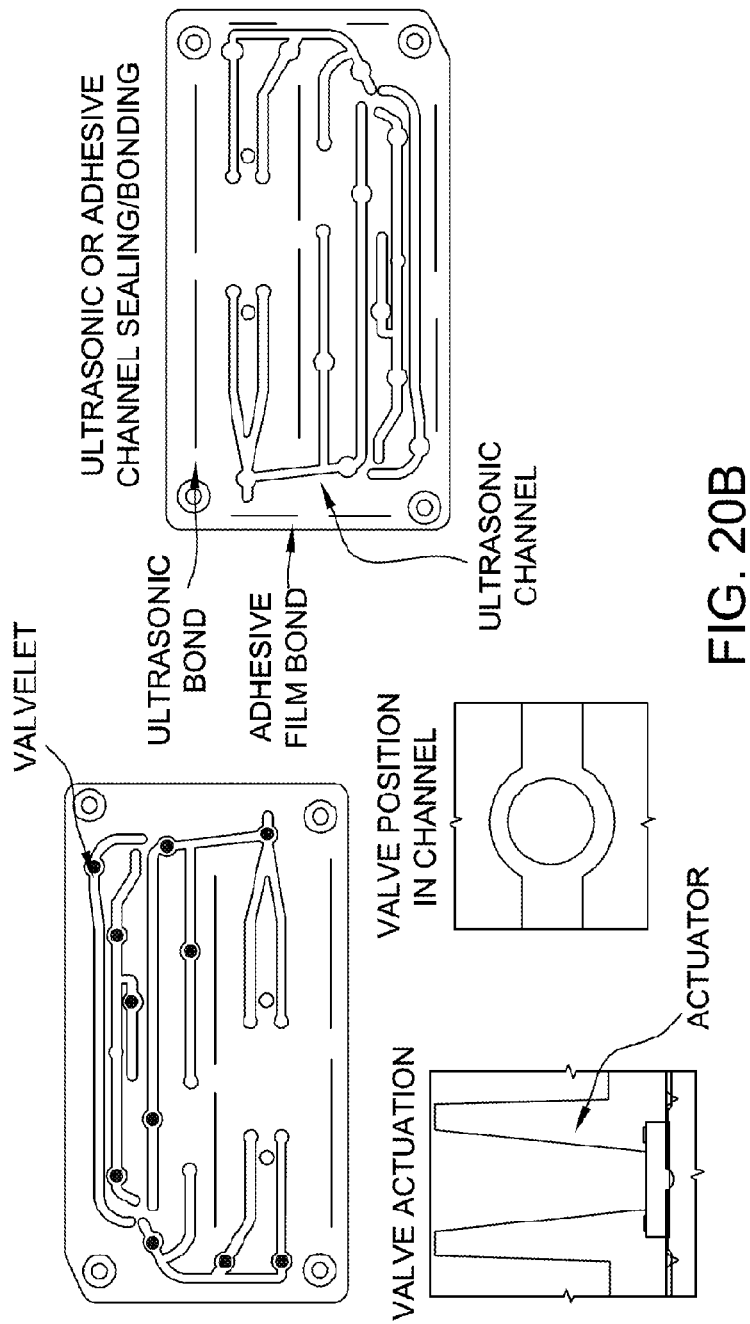
FIG. 20B is a top view of a cartridge showing valvelet positions and actuators.

As shown in FIG. 17, the carrier 120 can include a top layer 122, a bottom layer 124, and a gasket 126. As shown in FIG. 20, the gasket 126 can be disposed on the top surface of the bottom layer 124. As shown in FIGS. 18-19, the top layer 122 can be disposed on the top surface of the gasket 126 (i.e., on the opposite side of the gasket than the bottom layer 124). In other embodiments, the planar or sheet gasket is eliminated by bonding the top and bottom cartridge layers together. The sheet gasket may be replaced with gasket material (i.e., valvelets) (FIG. 20B) that is isolated to areas specifically aligned to the apertures of the instrument valve actuators. The isolated gasket valves seal the area of the channel only in the vicinity of the actuators and occlude the channel when impinged upon by the actuators.

These valve gaskets are held in place by compressing them between the top and bottom layers via ultrasonic welding, adhesive bonding, mechanical methods or other methods (e.g. laser welding). The surface area dimensions, thickness and material properties are designed to achieve occlusion of the cartridge fluidic channels when the actuator pins supply adequate force to impinge on and cause the gasket material to come in contact with the valve pads which are formed in the channels. Releasing the force of the actuator on the gasket material, opens the channel, allowing flow to occur.

Figure 23B:
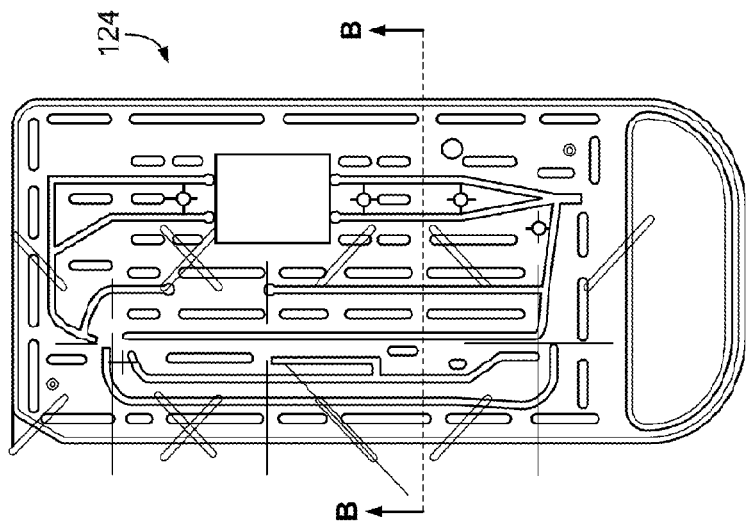
FIG. 23B is a top view of the bottom layer of the carrier of the multi-layer cartridge assembly of FIG. 17.
Figure 23A:
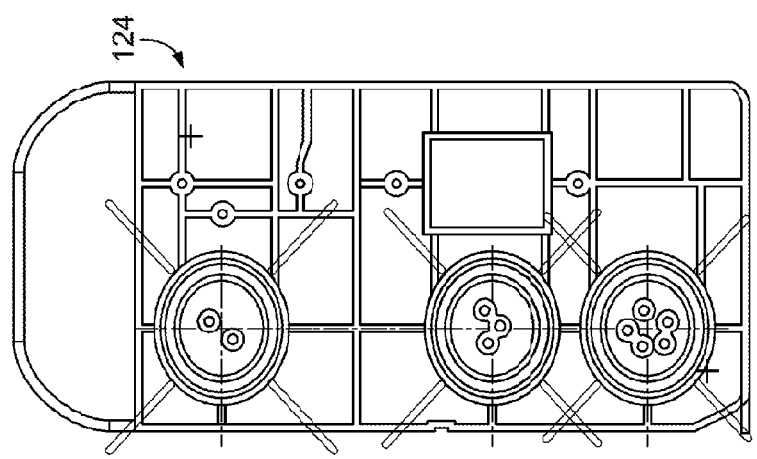
FIG. 23A is a bottom view of the bottom layer of the carrier of the multi-layer cartridge assembly of FIG. 17.

As best illustrated in FIG. 23A, the bottom layer 124 can include one or more reservoir attachment mechanisms (e.g., adapters as shown). The bottom layer may include one or more sample processing features, and means for recycling a sample and/or cells to minimize loss and improve overall performance. In some embodiments, the carrier 120 can include any suitable number of reservoir attachment mechanisms for fluid coupling with reservoirs to support additional functionality, performance, and analysis capabilities as cell analysis techniques evolve. The carrier 120 can include means for facilitating automated rare cell analysis. The carrier 120 can also include a means to automate sample dilution such that consistent fluid viscosity can be achieved for optimal performance and manual sample transfer can be eliminated. The carrier 120 can be compatible with various types of collection vessels, such as, for example, microscope slides, 8-well strips, small petri dishes, and tubes of various sizes.

In some embodiments, the container adapters 125 are integral part of the cartridge (i.e., the adapters 125 and the bottom layer 124 are formed as a unitary structure), lowering part count, costs and assembly complexity. In some embodiments, similarly as shown in FIG. 15 with respect to universal adapter 225D, the bottom layer 124 can include a universal adapter (not shown) for attaching various collection containers. The universal adapter can be engaged on the underside of the carrier 120 (i.e., coupled to the bottom surface of the bottom layer 124). A variety of holders can be engaged with the universal adapter such that a variety of collection containers, such as, for example, microscope chamber slides, 8-well strips, small petri dishes, various size Eppendorf tubes, various size Falcon tubes, custom collection containers, and the like, can be fluidically coupled to and disengaged from the universal adapter. In some embodiments, the holders can be custom-designed for particular collection containers. The collection containers can be selected by the user depending upon the needs of the user, such as, for example, the assay downstream. For example, as shown in FIGS. 17-19, a first tube 130A, a second tube 130B, and a third tube 130C (collectively "tubes 130") can be mechanically and fluidically coupled to the bottom layer 124. The first tube 130A can be a sample tube/reservoir, the second tube 130B can be a recycle tube/reservoir, and the third tube 130C can be a dilution tube/reservoir. In some embodiments, the adapters 125 can include grooves to securely receive corresponding threads of a collection container (e.g. tubes 130). In some embodiments, additional reservoirs and/or microfluidic chips 110 can be accommodated by modifying the cartridge design, fluidic layout and valve requirements such that the additional reservoirs and/or microfluidic chips 110 can be fluidically coupled to the fluidic flow path of the multi-layer cartridge assembly 100.

The vessels are tubes that are removably coupled to the carrier may be arranged for processing blood samples. For example, a first vessel may be configured such that, upon removal from the cartridge, the vessel may accept a standard blood draw sample tube wherein the sample tube is physically fixed in the vessel. The sample tube may be fluidically connected by tubing that extends to the bottom layer of the cartridge via a through hole to a microfluidic channel in the cartridge. Upon pressurization the instrument can deliver blood sample to a second vessel.

A second vessel accepts the blood sample from the first vessel and accepts dilution buffer from a buffer reservoir. Upon receiving pressurization from an instrument, the second vessel delivers a diluted sample to a microfluidic channel in the bottom layer of the cartridge via tubing fluidically connected to the cartridge and further delivered to the chip for cell collection and concentration.

A third vessel receives diluted blood sample that has been processed through the chip. The sample is depleted of the cells captured and concentrated by the chip. The sample may be recycled via a microfluidic channel from this third vessel to the second vessel for processing through the chip for additional capture and concentration of the cells of interest.

Figure 21:
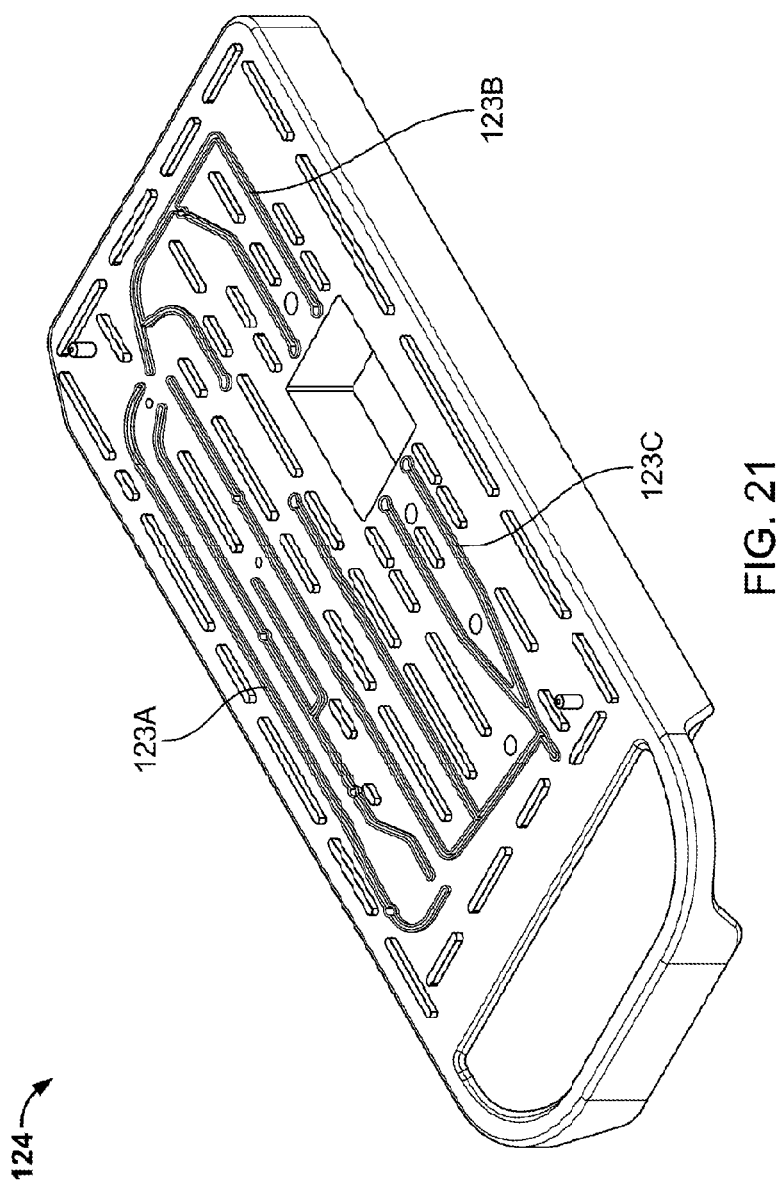
FIG. 21 is a perspective view of the top side of the bottom layer of the carrier of the multi-layer cartridge assembly of FIG. 17.

As shown in FIG. 21, the bottom layer 124 can define open microfluidic channels (also referred to herein as "microchannels"), such as first microchannel 123A, second microchannel 123B, and third microchannel 123C (collectively referred herein to as "microfluidic channels 123" or "microchannels 123"). The open microfluidic channels can be integrated into the top surface of the bottom layer 124. The microchannels 123 may include various design features including reduction or elimination of relatively sharp angles within the microchannel and/or minimization of dead volume within the microchannel and/or minimization of the volume that target cells have to pass through from their capture into microscale vortices to their release into their specific container.

Figure 22:
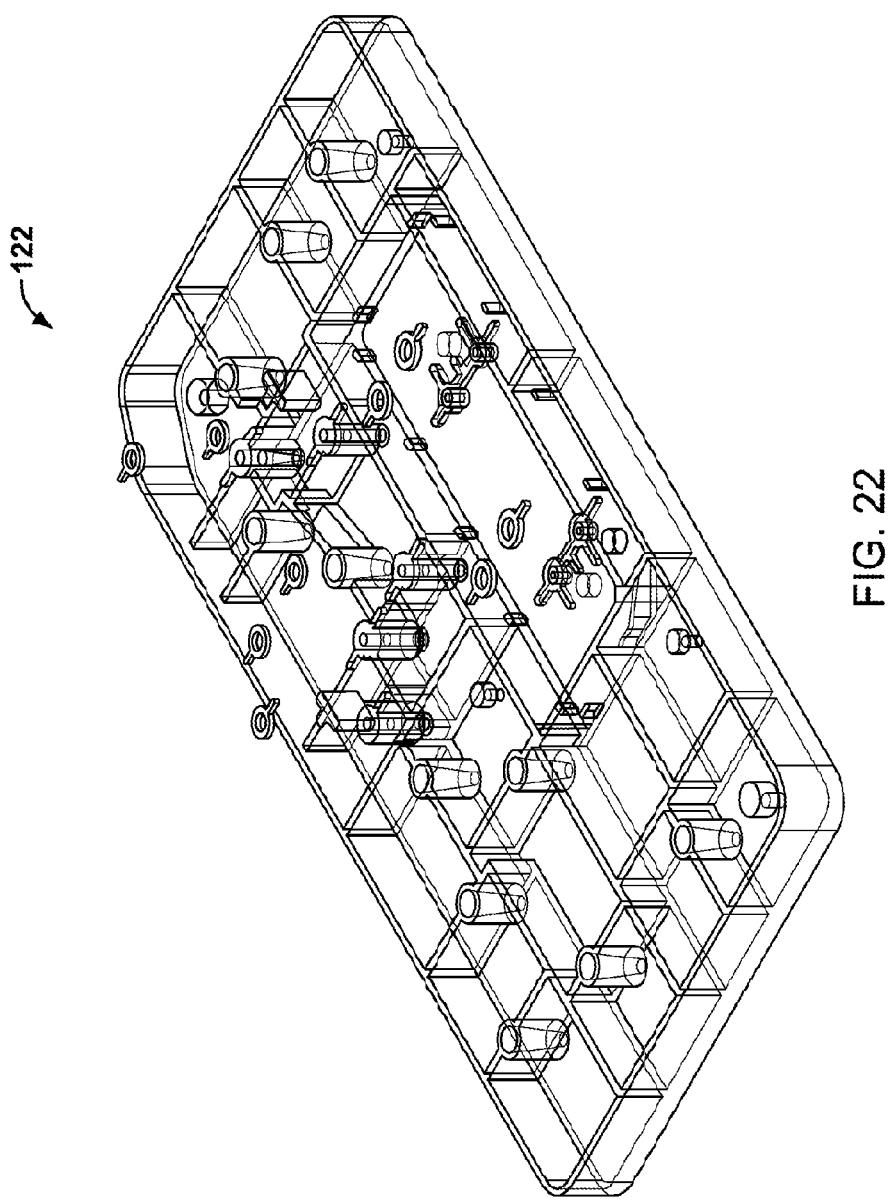
FIG. 22 is a perspective view of a top layer of the carrier of the multi-layer cartridge assembly of FIG. 17.

As shown in FIG. 22, the top layer 122 can include ingress and egress fluidic pathways. The fluidic pathways can be formed as circular features/rings as illustrated or in a rectangular arrangement and can be made from compliant materials such that the fluidic pathways can form a leak tight seal. In some embodiments, the top layer 122 can include apertures for receiving actuating elements (also referred to herein as "actuators") such that the actuating elements can form valves to manipulate fluid flow in the microfluidic channels 123. The top layer 122 can also include means for housing a rigid microfluidic chip(s) 110, such as, for example, a microfluidic chip pocket. Ingress and egress of fluids through the multi-layer cartridge assembly 100 can be controlled via solenoid valves.

The top layer 122, optional gasket 126, and the bottom layer 124 can be compressed under a controlled load when assembled to yield a single cartridge (i.e., carrier 120). The controlled load can apply enough pressure to the multi-layer cartridge assembly 100 such that a seal between the gasket 126 and the top layer 122 and between the sheet gasket 126 and the bottom layer 122 is leak-tight, but not so much pressure as to occlude the microfluidic channels 123. Sealing may be formed by use of gaskets and fasteners, ultrasonic/laser welding, film bonding or any other suitable method of sealing. In the case of ultrasonic welding and adhesive bonding, gasket material in the actuator apertures may be compressed between the top and bottom layer. In the case of ultrasonic welding, sealing of the microfluidics channels may be accomplished via ultrasonic welding of additional molded lines of plastic (energy directors) which form a lateral containment of the microfluidic channel and also seal the channel to the bottom surface of the top layer of the cartridge. In the case of adhesive bonding, the adhesive forms a seal between the bottom and top cartridge components creating the sealing of the channel.

The carrier 120 can be an easy-to-use disposable cartridge assembly designed to maintain operating pressures of, for example, about 70 pounds per square inch (psi), about 80 psi, about 90 psi, about 100 psi, about 110 psi, about 120 psi, about 130 psi, about 140 psi, and about 150 psi, including all values and subranges in between, and flow rates of, for example, about 6.5 milliliters per minute (ml/min), about 7 ml/min, about 7.5 ml/min, about 8 ml/min, and about 8.5 ml/min, including all values and subranges in between, as needed for the vortex-based isolation and trapping of particles described herein.

Although the carrier 120 is described as including actuator valves to control fluid flow through the carrier 120 and microfluidic chip 110, the carrier 120 can include any suitable fluid control mechanisms. For example, the carrier 120 can include manifold schemes, pneumatic actuated diaphragms, pinch valves, MEMS, and/or the like.

In some embodiments, some or all internal and external microfluidic interfaces of the carrier 120 can include a hermetic seal to prevent fluid or air leaks under normal operating conditions which could adversely affect performance. The carrier 120 can include interface sealing elements disposed at the interfaces with the microfluidic chip(s) 110 and external fluidic pathways such as, for example, polymeric gaskets or O-rings. The interface sealing elements can be chemically and biologically compatible with liquid biopsy samples, cleaning agents such as bleach, isopropyl alcohol or ethanol and phosphate buffered saline (PBS) running buffer, and other relevant fluidic agents necessary to support analytical methods.

The gasket 126 can be disposed between the top layer 122 and the bottom layer 124 such that an actuator can move through an aperture in the top layer 122 and deflect a portion of the gasket 126 into a microchannel 123 of the bottom layer 124 to form a seal that occludes (i.e., stops or prevents) fluid flow. The gasket 126 can be formed from any suitable compliant material. The gasket material can be biocompatible and have a long service and shelf life. For example, the gasket material can have a service and shelf life greater than 6 months from the date of manufacture. The gasket material can have good sealing properties such that the gasket 126 can form a substantially airtight and/or fluidtight seal with the bottom layer 124 and/or the top layer 122. The elasticity of the gasket material can be such that an actuator can deflect the gasket into the microchannels 123 as described. In some embodiments, the gasket material can be sufficiently resilient such that the gasket material can return to the initial, undeflected position when the actuator no longer applies force to the gasket 126. For example, after an actuator deforms a portion of the gasket 126 into a microchannel 123 to prevent fluid flow, the actuator can be relaxed and the gasket 126 can return to its initial position to allow fluid flow. In some embodiments, the gasket material can be polymeric. For example, the gasket material can include elastomers such as silicones, neoprenes, polybutadienes, polyurethanes, natural rubbers, and/or the like. Fluid flow through the carrier 120 can be manipulated by occluding the microchannels 123 selectively (e.g., actuator valves can be actuated independently to control fluid flow through the microchannels 123). The combination of valves and microchannel shapes defined by the carrier 120 facilitate various onboard capabilities, such as, for example, passive or active analyses typically done externally by manual sample manipulations. Valve mechanisms may be controlled by an instrument to variously open and close valves according to instrument-defined protocols.

FIGS. 23A-23B are various illustrations of the bottom layer 124 of the carrier 120. As shown in FIGS. 23A-23B, the microchannels 123 (i.e., air and flow paths) can each be shaped, for example, as a 762 µm×762 µm channel with a square cross-section. The microchannels 123, however, can have any suitable size and/or shape capable of sealing with the gasket 126. In some embodiments, the bottom layer 124 can include raised portions that form a seat for the gasket when the gasket is moved into a sealing position by an actuator. The raised portions can be shaped as, for example, a half-circle and can have dimensions of, for example, 460 µm×460 µm. The raised portions, however, can have any suitable size and shape that can achieve occlusion of a microchannel 123 in combination with the gasket 126 when deflected by an actuator. In use, actuators can selectively deflect the gasket such that the gasket 126 forms a seal with at least one of the raised portions and occludes the flow path, i.e. preventing fluid flow. The actuator(s) can then retract to an initial Z-position in which the actuator no longer seals the gasket 126 against the raised portions such that the gasket 126 no longer occludes the microchannel 123 and fluid flow can begin or resume.

The cartridge may include through holes that fluidly connect the chip to the underlying microfluidic channels 123 in the cartridge bottom layer 124. O-rings may be used to seal the through hole connectors to the chip. The cartridge includes a cartridge-processing system interface having various ports to connect the cartridge to the processing system referenced below. Inlet or outlet ports may be used to introduce or vent air to and from the cartridge. The inlet and/or outlet ports may be sealed with an elastomeric ring to form a seal between the cartridge ports and an instrument. The cartridge assembly may include inlet and outlet ports to introduce or eliminate liquid from the cartridge. The liquid ports may also be sealed with an elastomeric ring to create a seal between the cartridge and the instrument. Cartridge apertures allow introduction of the instrument actuator pins to the valve locations in the cartridge.

As shown in FIGS. 23A-23B, the microchannels 123 of the bottom layer 124 can include additional features. In some embodiments, sharp junctions can be minimized where flowing blood cells can be sheared, altered and/or generate aggregates. In some embodiments, dead volumes of the cartridge can be minimized to avoid rare cell loss and avoid contaminating blood cells being trapped at a high flow rate during blood processing and released with the target cells once the flow rate is decreased during the collection step. In some embodiments, the volume from microfluidic reservoirs to the collection container can be minimized. Said another way, the volume that target cells have to pass through from their capture into microscale vortices to their release into their specific container can be minimized. This volume can correspond to the CTC collection volume and should be targeted to be as small as possible to minimize cell loss. Thus, the carrier or cartridge 120 can reduce complexity, minimize the need for manual sample transfer, and deliver rare cells, such as CTCs, in collection containers compatible with well-characterized downstream assays performed by researchers and clinicians after use of the multi-layer cartridge assembly 100.

In some embodiments, the carrier/cartridge 120 as disclosed herein is usable as a single use disposable consumable, and be compatible with high volume fabrication methodologies, e.g. injection molding. In some embodiments, the carrier/cartridge 120 can provide a robust means for sample, reagent and buffer ingress and egress needed for automated liquid biopsy sample processing. In some embodiments, the carrier/cartridge 120 can be designed as a single use disposable and key component of an automated rare cell analysis platform. Design requirements for the carrier/cartridge 120 can ensure ease-of-use even by an operator/user with gloved hands.

In some embodiments, the multi-layer cartridge assembly 100 can be manufactured via high volume fabrication methodologies, such as, for example, injection molding. In some embodiments, the multi-layer cartridge assembly 100 can be manufactured such that it is disposable and intended for a single use. In other embodiments, the multi-layer cartridge assembly 100 can be manufactured such that it is capable of reuse.

The top layer 122, the bottom layer 124, and the other components of the multi-layer cartridge assembly 100 can be formed from any suitable material. For example, the top layer 122 and the bottom layer 124 can be formed from a rigid plastic material such as PC, COC, COP, polystyrene or other materials compatible with high volume production methods. In some embodiments, the material can be selected based on (i) its biocompatibility with blood and other bodily fluids, (ii) its chemical compatibility with a cleaning solution if needed (ethanol, bleach, isopropanol) and running buffer (phosphate buffered saline), (iii) bonding techniques to guarantee sealing under moderate to high pressure loads, such as, for example, laser welding, ultrasonic welding, heat staking, UV cured adhesives, or solvent bonding. In some embodiments, the multi-layer cartridge assembly 100 can be formed as a monolithic assembly integrating a microfluidic chip 110 (e.g., microfluidic chip) with a macrofluidic cartridge and manifold structures including valves. Other parameters to consider for the selection of the material(s) can include, but are not limited to, (iv) the functional assay expected into the cartridge. For example, a material with optical transparency can be selected for in-flow visualization and a material with non- or low-auto-fluorescence can be selected if fluorescence detection is needed. Additionally, compatibility with chemical functionalization to enhance/ reduce chemical or biochemical interaction or enable hybridization with a specific probe or reagent can be considered.

Processing System

Figure 31:
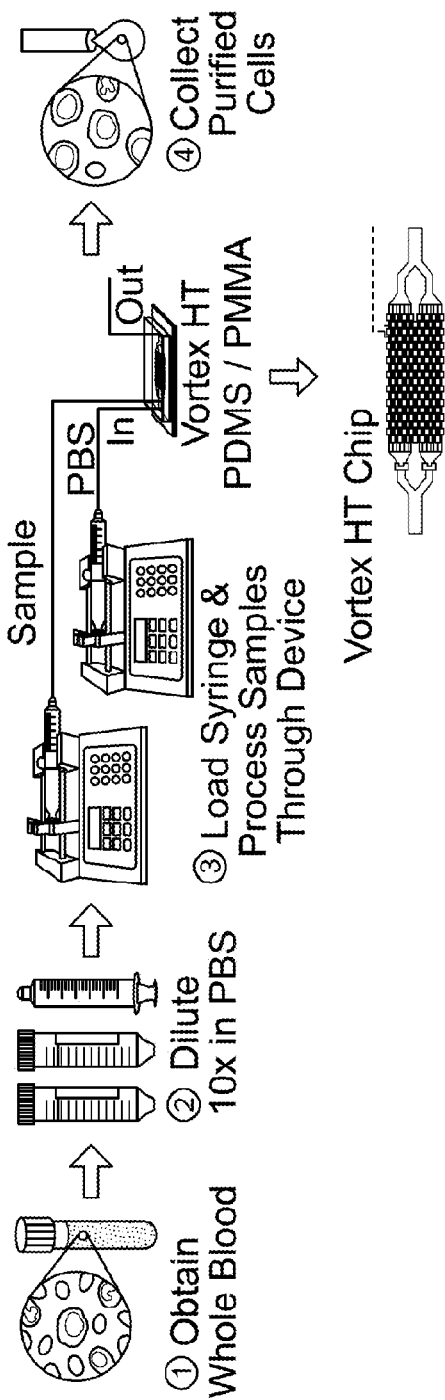
FIG. 31 illustrates manual processing of a blood sample with a vortex chip, either made of deformable PDMS or rigid plastic.

The processing system may be operated in a manual mode (see FIG. 31) in which whole blood is diluted, loaded onto a syringe and processed through the microfluidic chip to collect purified cells.

Figure 32:
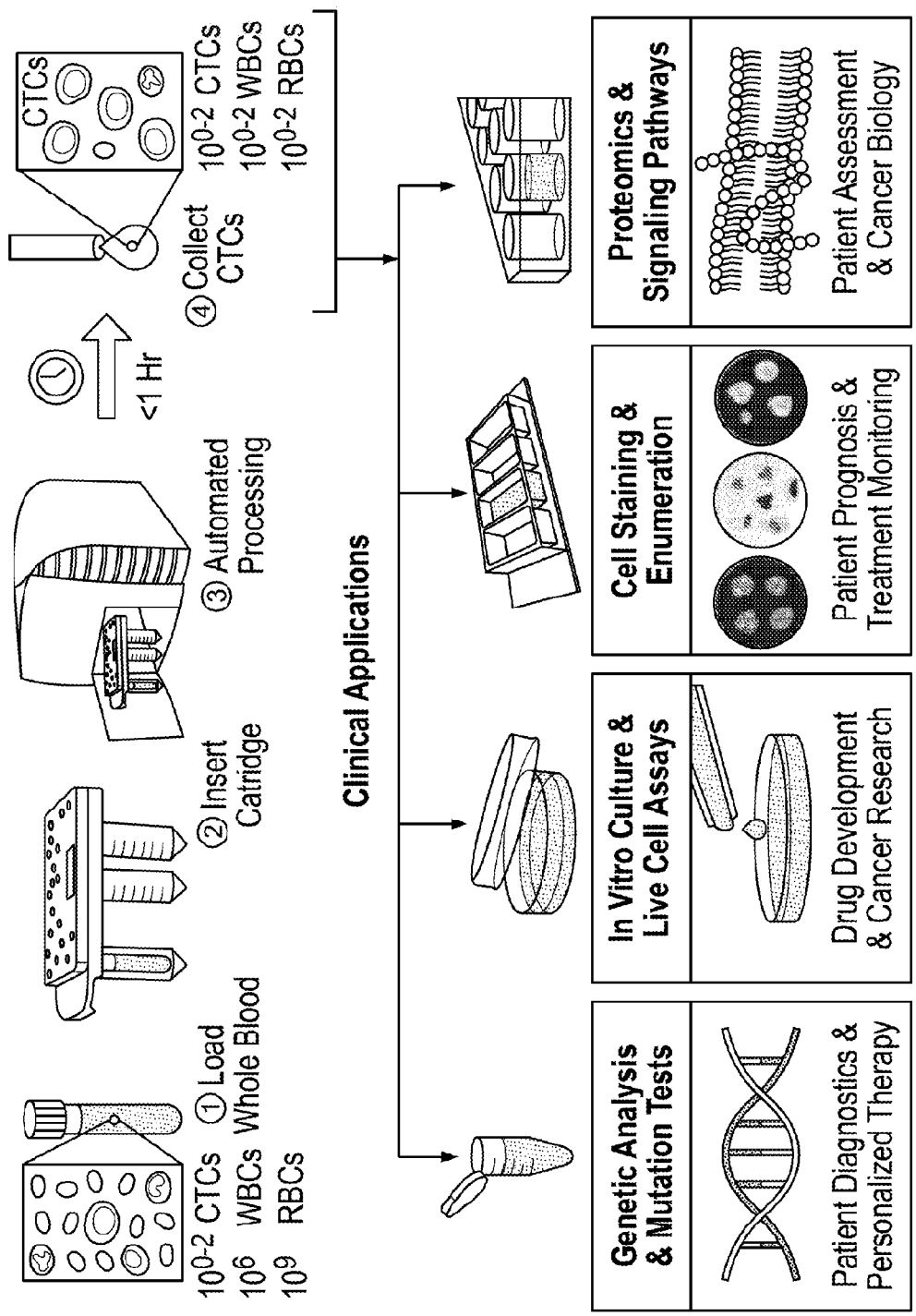
FIG. 32 illustrates the overall workflow to prepare a sample of CTC from whole blood for downstream assays using the liquid biopsy system.

FIGS. 24-25 and 27A-C illustrate an example processing system, according to some embodiments of the present disclosure. The processing system may be used as an automated liquid biopsy processing system to perform, for example, a workflow (see FIG. 32) in which a user connects a tube to a cartridge, loads the cartridge into a processing station to collect circulating tumor cell (CTC) into different containers (e.g., containers connected to the cartridge) to perform a downstream assay. In exemplary workflows, a blood collection tube is connected to the consumable cartridge. No manual sample preparation, such as blood cell lysis or dilution or mixing with beads, is needed. The user selects the container of choice to collect the CTCs in, depending on the assay performed downstream on the CTCs. The user connects this container to the container holder in the cartridge. Then the user brings the cartridge into the system, add the patient information on the user interface, selects the protocol to run, selects the container, and the number of cycles. Once these parameters have been set up on the user interface, the blood processing can start. The user comes back after 1H to 3H (depending on the system mode) and collects the container where the CTCs have been released. This container can be removed from the cartridge to bring the CTCs to the next assay. Different containers can be used, such as but not limited to Eppendorf tubes, petri dish, chamber glass slide, well strip, falcon tube. The user can decide to flow again the efflux from the first blood run. Optionally, workflow may be performed in one of two operating modes (FIG. 33)—a first mode for high recovery (3 cycles) and second mode for high purity (1 cycle).

Figure 24:
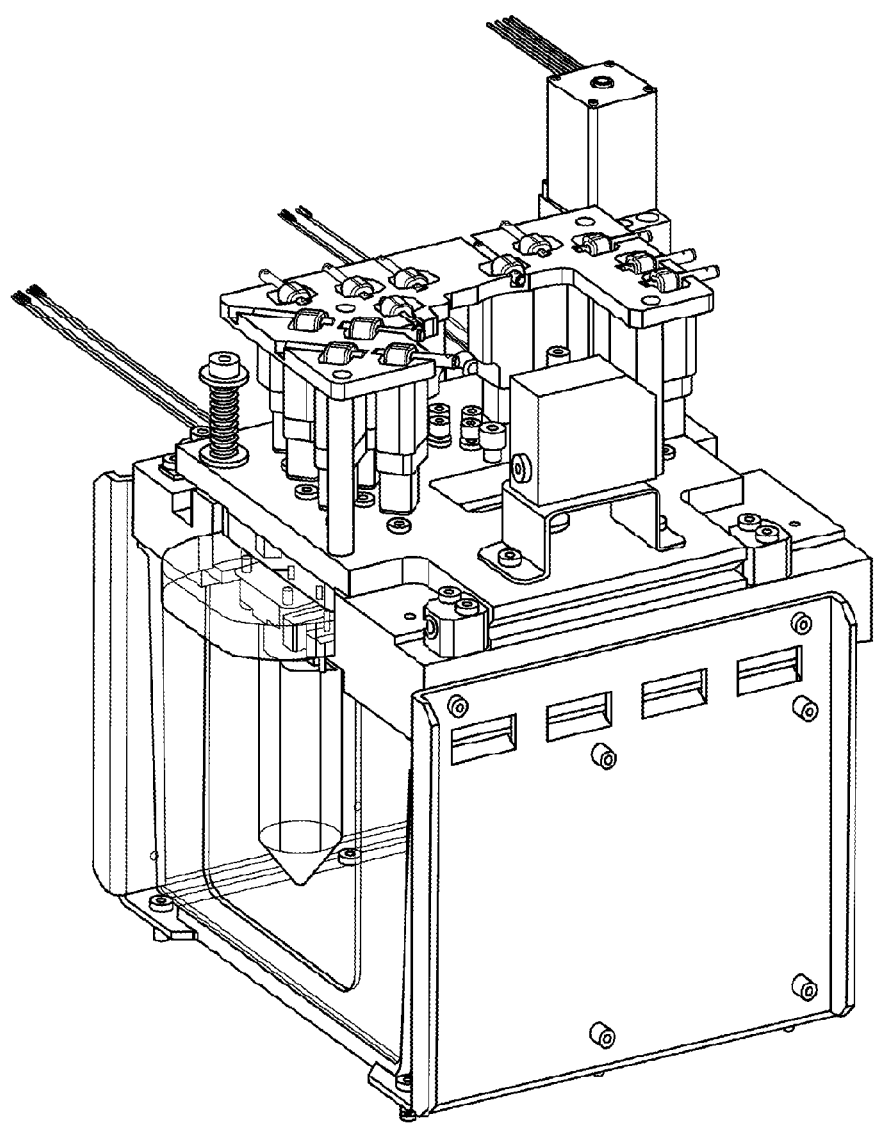
FIG. 24 is a perspective view of an automated liquid biopsy processing system, according to an embodiment.
Figure 25:
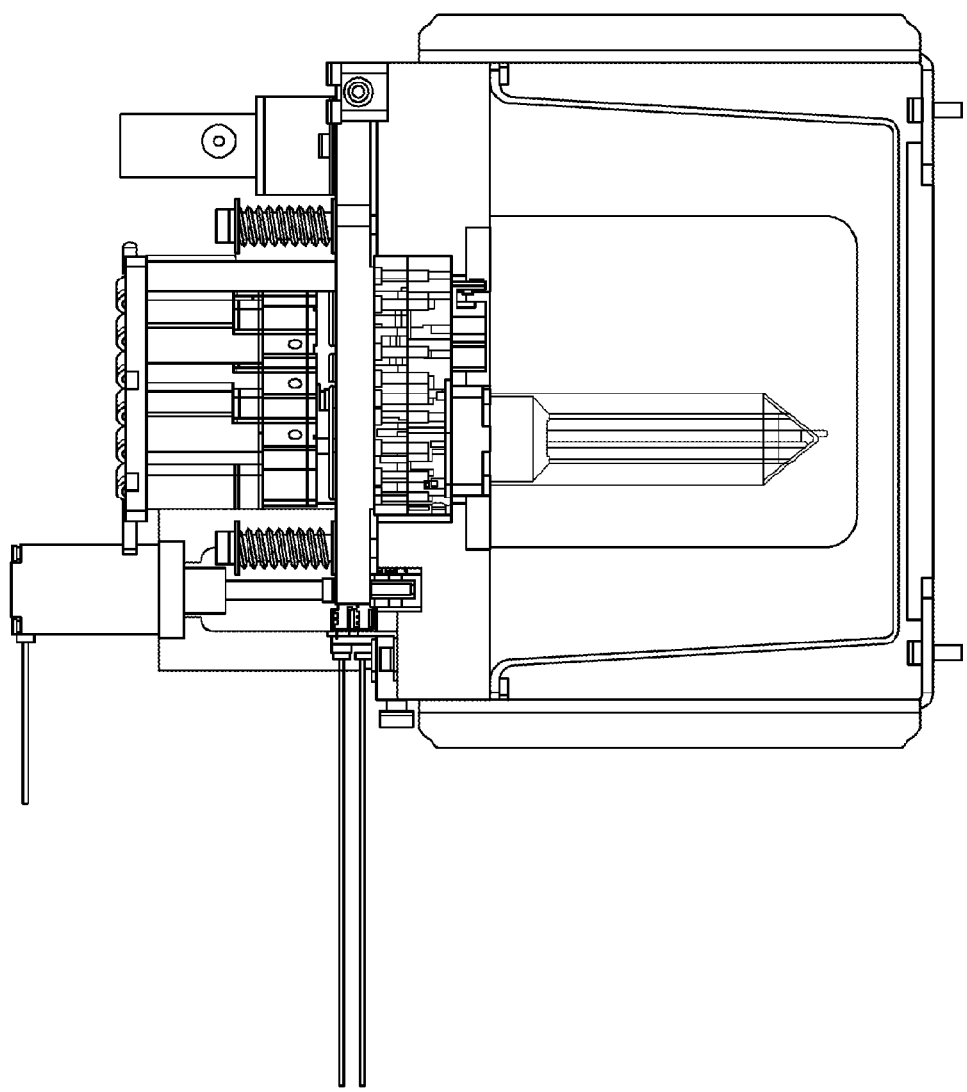
FIG. 25 is a front view of the automated liquid biopsy processing system of FIG. 24.
Figure 26:
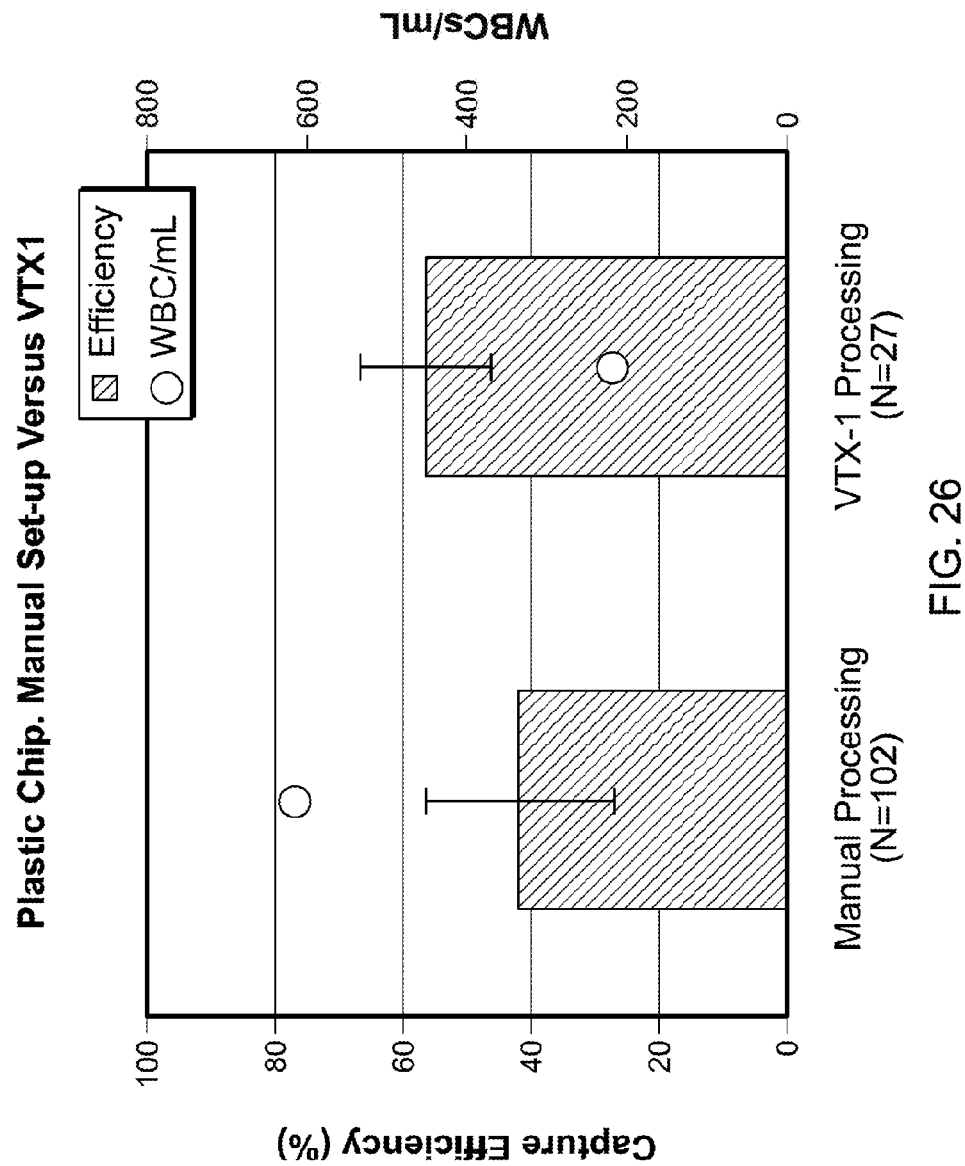
FIG. 26 is a graph illustrating the efficiency of cell capture of various microfluidic chips.
Figure 27A:
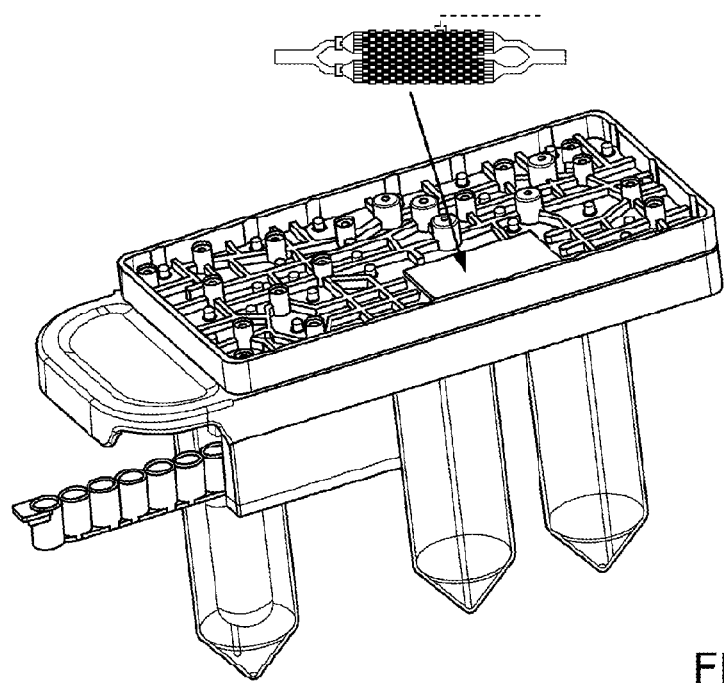
FIG. 27A illustrates a microfluidic chip within a cartridge, and coupled to containers for sample processing.
Figure 27B:
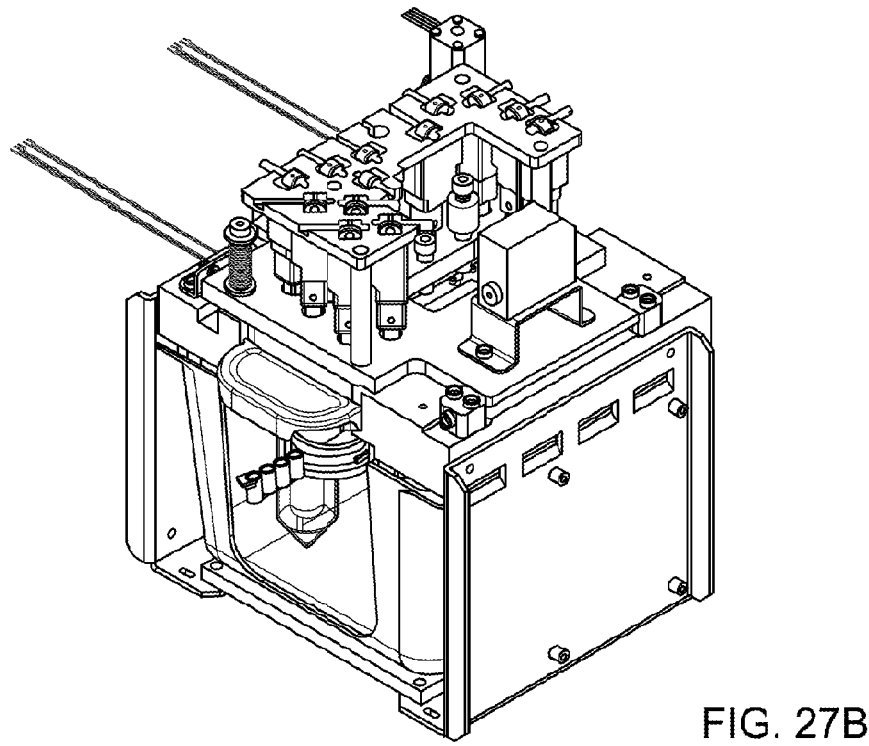
FIG. 27B illustrates a setup that includes pumping and control components coupled to the cartridge of FIG. 27A.

As shown in FIGS. 24-25, 27B, a cartridge having microfluidic chip is received in the processing system. The system is configured to perform unattended processing of multiple liquid biopsy samples per day by utilizing a single use disposable cartridge assembly. In various embodiments, the system may include a sample vessel, a blood/sample pump, a buffer vessel, a PBS/buffer pump, a microfluidic cartridge and chip (such as the cartridge assembly described above) and/or a waste vessel.

The fully automated system can employ a microfluidic chip (e.g., rigid microfluidic chip) in a fixture. FIG. 27A illustrates the microfluidic chip as coupled to a cartridge such as a cartridge described above and shown in FIGS. 15 and 17, which in turn is coupled to a sample vessel, a recycling vessel, and a dilution vessel.

Returning to FIG. 27B, various pumping and control components can be attached to the assembly of FIG. 27A to affect vortex-based isolation and analysis of particles/cells. The system may include a housing (not shown) that encloses the other components of the system.

Figure 16:
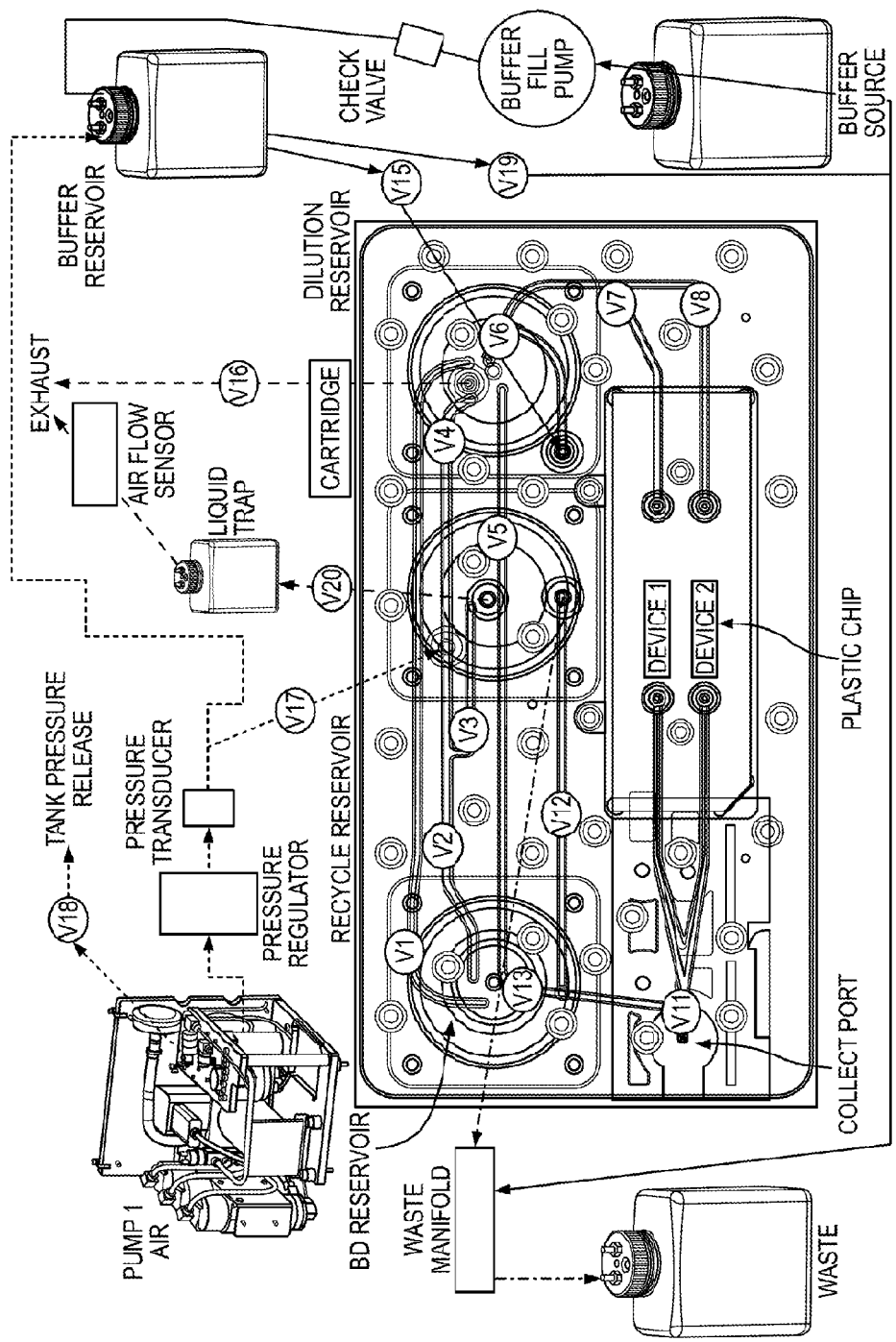
FIG. 16 is a schematic top view of the multi-layer cartridge assembly with control and fluidic interconnections for the instrument multi-layer cartridge assembly and microfluidic chip.

The micro-fluidic chip is housed in a cartridge (see FIGS. 15 and 17) which has been designed to easily interface internal micro-fluidic pathways to external driving forces; fluid pumping systems, positive displacement and pneumatic. The cartridge can be clamped within a processing station (FIG. 27B) comprising a liquid (i.e., buffer) pump and a gas pump (FIG. 16). The processing station is a component of automated system to engage interconnections to couple fluids, pumping and/or electrical/electronic, optical or mechanical elements to process heterogeneous fluids such as liquid biopsy samples containing said rare cells of interest.

The processing station (FIG. 24-25, 27) allows the operator/user to insert a cartridge assembly, such as carrier 120, when in the open position. Once inserted, the cartridge assembly is clamped within the processing station by a clamping assembly. In some embodiments, the clamping assembly includes a clamping plate and a stepper motor. The processing station includes an interface that allows ingress and egress of liquid biopsy sample, specific probes or reagents, running buffer and venting/exhausting of pressurized cartridge reservoirs. Additionally, the processing station can interface and connect all external fluidic pathways needed to process a liquid biopsy sample. In some embodiments, the carrier 120 and the processing station can be adjusted to accommodate additional reservoirs and fluidic pathways if needed to expand functionality, performance, or analysis capability. In some embodiments, the processing station can be an integral subassembly of an automated liquid biopsy processing system. The processing station can allow for automated processing of liquid biopsy samples with minimal operator/user preparation, sample handling, and biohazard exposure. The operator/user can place the sample liquid biopsy collection tube (e.g., a BD tube) in the sample position (e.g., into engagement with adapter 125A) of the carrier 120, insert the carrier 120 into the procession station, and begin the automated sample processing sequence. The automated sample processing clamps the cartridge and the sequence can close the processing station, process the sample, and deliver, for example, rare cells and/or CTCs into a collection container.

Figure 27C:
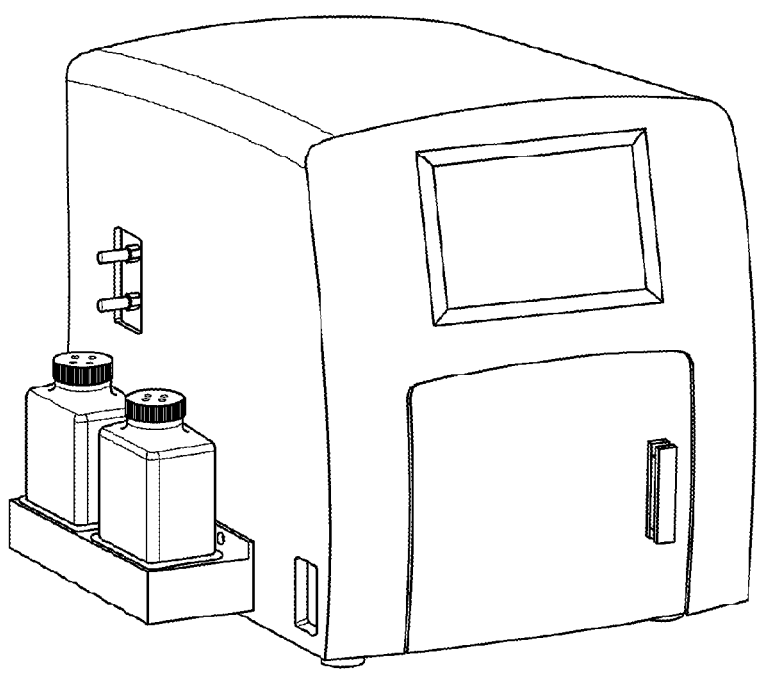
FIG. 27C illustrates a perspective view of a housing/system that encloses the setup of 27B that includes, among other things, a user interface for controlling operation of the system, and ports for connecting to containers (e.g., a waste container, and a buffer container, see FIG. 16) held within the system.

As shown in FIG. 27C, the processing station includes an access door through which the cartridge assembly is removably coupled to the processing station. The access door is movable between an open and a closed position and the system may be configured to not operate when the access door is in the open position.

In some embodiments, the carrier 110 and processing station may be configured to accommodate additional rare cell characterization methods as research needs and applications evolve (e.g., optical, electrical/electronic or biochemical/chemical applications). Thus, off-system cell analysis can be brought onboard, increasing processing throughput and analysis and minimizing user/operator involvement. The carrier 110 and processing station can support integration of optical (e.g., fluorescent imaging, bright and dark field imaging), electrical/electronic (e.g., connections for cell analysis by electrical fields) and biochemical/chemical (e.g., immunoassays by labeling methods) analysis methods. The carrier 110 and processing station can ensure backward compatibility of future onboard cell analysis methods with earlier versions of the systems as they evolve.

Automatic control can be performed via microcomputer or personal computer coupled to electromechanical, electrical/electronic elements such as pumps, motors, valves, actuators, solenoids, fans, transducers, pressure sensors, flow sensors, load cells, LED indicators, imaging light sources, optical positioning sensors, optical subsystems to view, image or video rare cells flowing through said rigid micro-fluidic/cartridge assembly while liquid biopsy sample containing rare cells is being processed controlling all critical system parameters automatically to ensure optimal performance.

The automated platform/system has wireless connectivity capability such as WiFi and Bluetooth which provides wireless remote service diagnostics and support capability. The system also has Ethernet connectivity which can be hooked up to intra or internet services for data archival; run logs, sample processing logs, images and videos.

All system elements, components, assemblies, subassemblies, subcomponents are housed within an aesthetically pleasing product shell/enclosure (See FIG. 27C) which provides a robust means to support the microfluidic chip and cartridge and other components described herein. The enclosure can include components such as, but not limited to, sensors, electromechanical components, pumping systems etc for automated sample processing as described herein. The enclosure also provides a high level of safety which prevents the operator/user from being exposed to potentially biohazardous liquid biopsy samples being processed by the mechanical, electrical, optical components incorporated inside. The system is configured with internal fluidic tubing that arranged such that leakage of fluid does not cause the system to short circuit and may include various circuit breakers and/or fuses for this purpose.

The system software application utilizes an intuitive graphical user interface which allows the operator/user to easily navigate, setup, record and process rare cells automatically. These software features are designed to prevent the operator/user from being inadvertently exposed to mechanical, electrical, optical subcomponents while a sample is being processed. The system and software work in unison to prevent operator/user exposer to biohazards; sample, aerosols and/or fluid leaks that may occur. The system and software may be configured to stop processing if system pressure exceeds a threshold, to depressurize the system before unclamping of the cartridge, to depressurize if a sudden change in pressure or flow rate is detected and/or to notify the user of the fill level of various vessels (e.g., an empty buffer bottle or a full waste bottle). The system may also provide for automated calibration of pressure and/or flow rate. The system can include at least a processor and a memory.

External features of the automated platform/system have provisions to interface/connect fluids, electrical accessories and provide control signals to outside devices; i.e. external keyboard, mouse, monitors, bar code readers, Ethernet connections, fraction collectors, plate handlers, pumps etc. This platform/system has been designed to be an integral part of an overall workflow within a research or clinical environment.

Operator/user interaction is via a touchscreen interface that can be activated with a finger touch from a gloved hand to navigate all throughout all features and capabilities of the platform.

The micro-fluidic cartridge assembly is inserted by the operator/user through door located on the front panel. The door has a safety interlock which is inactive while the system is idle and active while processing a liquid biopsy sample to prevent inadvertent operator/user exposure to the inter-workings of the system or potentially biohazardous sample being processed.

The system software application provides real-time control and monitoring of all systems, components, subsystems and subcomponents automatically during processing ensuring critical fluidic flow parameters are maintained to properly form and maintained the vortex for rare cell isolation, capture, release and collection. The software application also provides a means for operator/user level security features required to comply with research, clinical and medical use requirements mandated by local, state and governmental regulatory agencies; e.g. 21 CFR 11, HIPPA.

In one example, this system can be used to process blood directly from a specific location where a standard blood collection tube/reservoir (e.g., the sample reservoir 1530a) can be connected. Then the blood (containing CTCs) is driven to a dilution tube/reservoir (e.g., the dilution reservoir 1530c) where a dilution buffer such as PBS can be added to obtain the dilution needed (for example, 10× dilution for human blood). Diluted blood is then driven through the microfluidic chip/chip for enrichment of rare cells and collected into a recycle tube/reservoir (e.g., the recycle reservoir 1530b). Rare cells are washed from any contaminants by a wash buffer injected through the microfluidic chip by the automated system. The system can keep the overall flow rate constant within the microfluidic chip for stable trapping and retaining (or maintenance) of the CTCs into the reservoir chambers. The system can release the CTCs/target particles in their collection container by lowering flow to allow the micro vortices to collapse.

In another example, the blood effluent collected from the first processing cycle can be recirculated through the microfluidic chip by the automated system. The effluent is transferred to the dilution tube/reservoir from the recycle tube and the process described above is repeated. Such recycling of the diluted blood enables the user to recover more target cells/particles at each passage. In some embodiments and as shown in FIG. 33, the system may be operated in either a first mode for higher recovery (e.g., by recycling) or a second mode for higher purity (e.g., no recycling).

In another example, the user can decide to manually dilute the blood sample and directly connect this diluted blood sample to the dilution tube location (dilution reservoir 1530c). This can enable the user to recover more cancer cells, especially when the initial volume of blood is very small (for example for mice blood).]

The system may be configured to release cancer cells into various containers attached to the cartridge by an adapter. Cells are not affected by the processing, i.e., in suspension, available for multiple assays downstream. The container may be switched out between cycles.

Some other bodily fluids than blood can be processed to capture CTCs, such as pleural fluids, peritoneal fluids, urine samples, cephalo-rachidien liquid, saliva. Such liquids may not require to be diluted and the system can process them directly from the dilution tube. Different protocols can be provided to the user for different types of sample and/or different workflows.

The blood effluent is also accessible to the user for downstream assays. Among others, the effluent can be used for genomics assays (RNA, DNA such as ctDNA, cfDNA), proteomic assays, enrichment of white blood cells or platelets downstream for other assays such as but not limited to anticoagulation studies, immunology studies.

Collectively all of these elements allow fully automated unattended liquid biopsy sample processing and overcome all obstacles impeding product commercialization.

The system may include one or more of the following elements:
  a. Rigid micro-fluidic device/chip
  b. Assembly of the rigid micro-fluidic device/chip and cartridge/carrier [sometimes collectively referred to as a microfluidic cartridge assembly, or a variant thereof]
  c. Real-time monitoring and analysis of various pressure, liquid and air flow, optical and control signals which allows automatic adjustment of mechanical, electrical, electronic, electromechanical, optical systems and subsystems via embedded microcontrollers and personal computer
d. Embedded firmware and software applications to orchestrate execution of liquid biopsy sample processing, sample to cells, no sample preparation needed prior to start of run
e. Flexibility to add features and functionality due to modular system design; removable rigid micro-fluidic device(s), cartridge to house the micro-fluidic device(s) and cartridge assembly clamping mechanism that can accommodate additional ingress and egress of fluids, reagents, electrical/electronic and optical features, flexibility in the method of use to guarantee compatibility and optimal performance with various user needs: various samples, various downstream assays, various protocols. Features and functionality may be quickly added by changing the design and interfacing of the rigid micro-fluidic device, and/or cartridge assembly, system fluid pumping components and making adjustment to firmware and software elements.

The system may enable unattended fully automated liquid biopsy sample processing. The system may use real-time feedback control strategies and easy-to-use microfluidic single-use cartridge assemblies. The system may accommodate additional features and functionality by using removable cartridges having microfluidic chips that may be replaced with other cartridges for specific assays.

FIG. 16 illustrates an example setup for the system illustrated in FIGS. 24-25. FIG. 16 illustrates a top view of a microfluidic cartridge assembly as described for FIGS. 15, 17, and illustrates interconnections for the sample/BD reservoir, the recycle reservoir, and the dilution reservoir. FIG. 16 also illustrates a waste container, and a buffer container, such as, for example, a 1 liter polypropylene or polyethylene bottle. FIG. 16 also illustrates a first pump ("Pump 1 AIR") configured for regulating movement of a gas (e.g., air) through the system, and a second pump ("Buffer Fill Pump") configured for regulating movement of buffer from the buffer container to the buffer reservoir. The air pump ("Pump 1 AIR") and valving scheme is configured for regulating air and ultimately liquid through the system. Pump 1 includes a compressed air system with ballast tanks having sufficient air capacity needed to complete a run/cycle, and further include a safety relief valve and sensing systems to prevent over-pressurization. The Buffer Fill Pump is used to transfer buffer from the buffer container to a buffer reservoir from which buffer will then be introduced to the system via air pressure controlled from Pump 1. FIG. 16 also illustrates a configuration that incorporates two rigid microfluidic devices ("Device 1" and "Device 2"). FIG. 16 also illustrates valves V1-V20, which can be linear actuators configured for deflecting the gasket 1510b as necessary. The on cartridge valves are briefly described as follows:

V1—formed in the micro-channel, controls sample fluid flow within the micro-channel connecting the sample/BD reservoir to the dilution reservoir.
V2—formed in the micro-channel, controls high pressure air source within the micro-channel connecting "Pump 1" inlet port and the sample/BD.
V3—formed in the micro-channel, controls high pressure air source within the micro-channel connecting "Pump 1" inlet port and the "Recycle Reservoir".
V4—formed in the micro-channel, controls high pressure air source within the micro-channel connecting "Pump 1" inlet port and the "Dilution Reservoir".
V5—formed in the micro-channel, controls fluid flow within the micro-channel connecting "Recycle Reservoir" to "Dilution Reservoir".
V6—formed in the micro-channel, controls fluid flow into and out of "Dilution Reservoir".
V7—formed in the micro-channel, controls fluid flow within the micro-channel connecting the Buffer Reservoir and/or Dilution Reservoir to the inlet of "Device 1".
V8—formed in the micro-channel, controls fluid flow within the micro-channel connecting the Buffer Reservoir and/or Dilution Reservoir to the inlet of "Device 2".
V9—external valve used to vent air in the vent lines directly to the atmosphere
V10—unused spare actuator valve position.
V11—formed in the micro-channel, controls fluid flow within the micro-channel connecting outlet of "Device 1" and/or Device 2" to cartridge collection port.
V12—formed in the micro-channel, controls fluid flow within the micro-channel connecting outlet of "Device 1" and/or Device 2" to waste port.
V13—formed in the micro-channel, controls fluid flow within the micro-channel connecting outlet of "Device 1" and/or Device 2" to "Recycle Reservoir".
V14—unused spare actuator valve position.
V15—external normally closed (NC) 3-way solenoid valve connecting Buffer Reservoir to cartridge fluid inlet port.
V16—external normally closed (NC) 2-way solenoid valve connecting cartridge "Dilution Reservoir" to exhaust port and external atmospheric pressure.
V17—external normally closed (NC) 2-way solenoid valve connecting pressure transducer and cartridge high pressure air source, "Pump 1, inlet port.
V18—external normally closed (NC) 2-way solenoid valve connecting high pressure air source, "Pump 1", directly to external atmospheric pressure to release/vent high pressure air source.
V19—external normally closed (NC) 3-way solenoid valve connecting Buffer Reservoir fluid flow directly to waste reservoir.
V20—external normally closed (NC) 2-way solenoid valve connecting cartridge "Recycle Reservoir" to exhaust port and external atmospheric pressure.

Figure 30:
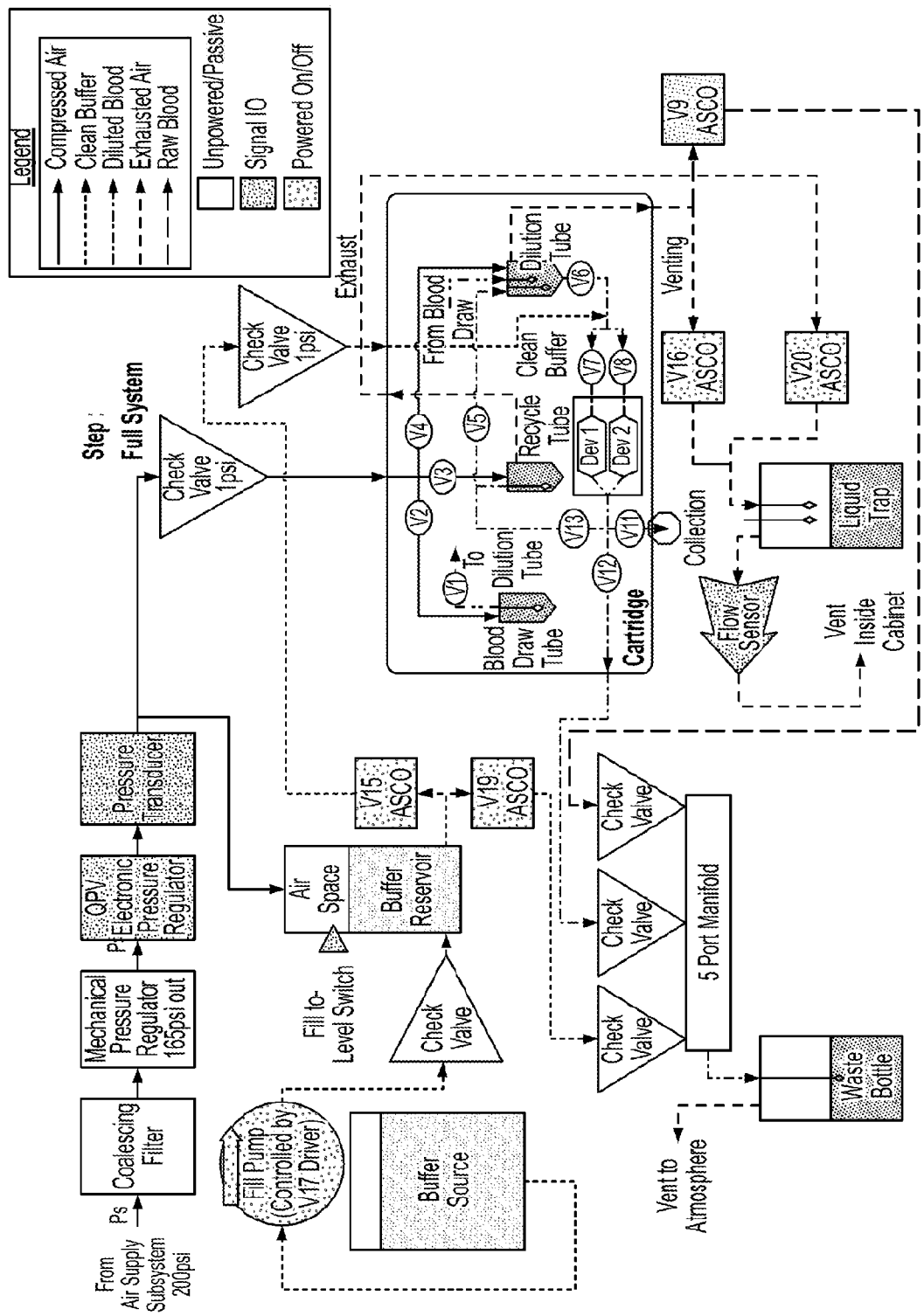
FIG. 30 is an example diagram illustrating flow control in the system of 27B.

FIGS. 29-30 illustrate example embodiments directed to flow control within the system illustrated in FIGS. 24-25, 27.

The processing systems described herein may include a computer storage product with a non-transitory computer-readable medium (also can be referred to as a non-transitory processor-readable medium) having instructions or computer code thereon for performing various computer-implemented operations. The computer-readable medium (or processor readable medium) is non-transitory in the sense that it does not include transitory propagating signals per se (e.g., a propagating electromagnetic wave carrying information on a transmission medium such as space or a cable). The media and computer code (also can be referred to as code or algorithm) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code disclosed herein.

One or more embodiments and/or methods described herein can be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) can be expressed in a variety of software languages (e.g., computer code), including C, C++, Java®, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments of the disclosure (e.g., methods and processes disclosed above) may be embodied in a computer program(s)/instructions executable and/or interpretable on a processor, which may be coupled to other devices (e.g., input devices, and output devices/display) which communicate via wireless or wired

EXAMPLES

The processes of the present disclosure are further illustrated by the following Examples. These Examples should not be viewed in a limiting sense.

Example 1—Enrichment of Rare Cancer Cells from Blood

The microfluidic chip 10 of FIG. 3 was applied to separating and concentrating cancer cells (diameter of 20 micrometers) from normal human blood cells (diameters range from 2 to 15 micrometers) to demonstrate utility for size-based enrichment and concentration in a high-throughput manner. Enriching and concentrating cancer cells from blood is particularly important for clinical diagnostics as circulating tumor cells (CTCs) can provide real-time information on patient status and monitoring of cancer therapies. Isolating viable CTCs from blood in a quick, effective and label-free approach remains a significant technical challenge—CTCs are rare events at rates as low as one cell per one billion blood cells. While current strategies focus on enumeration of CTCs for diagnostics, there is a critical need for gathering larger sample sizes of viable CTCs for research purposes. This requires processing large blood volumes with higher throughputs and enriching target cells without the attachment to modified substrates or magnetic beads, providing an advantage for individually selecting captured cells for further analysis or culture.

This chip 10 addresses the need for rare cell enrichment with a massively parallel device that processes liquid volumes in the mL/min range, enriches target cells through size and deformability-based separation, and releases captured cells into a smaller concentrated volume. To demonstrate rare cell enrichment, fluorescently-labeled breast cancer cells (MCF-7) spiked into diluted human blood was injected into a chip 10 similar to that illustrated in FIG. 3 at 4.4 mL/min rate. MCF7 breast cancer cells were cultured in media containing DMEM supplemented with 10% FBS, 1% bovine insulin, and 1% penicillin/streptomycin were trypsinized and resuspended before use. Blood was collected from healthy human volunteers by a trained physician and diluted in PBS to 5-20% for experiments.

At these high flow rates channel deformation was observed in the upstream vortex reservoirs, however trapping is not significantly impacted given that downstream vortex chambers operating closer to ambient pressure remain un-deformed. Higher operational flow rates are instead limited by bond strength.

Figures 4A, 4B:
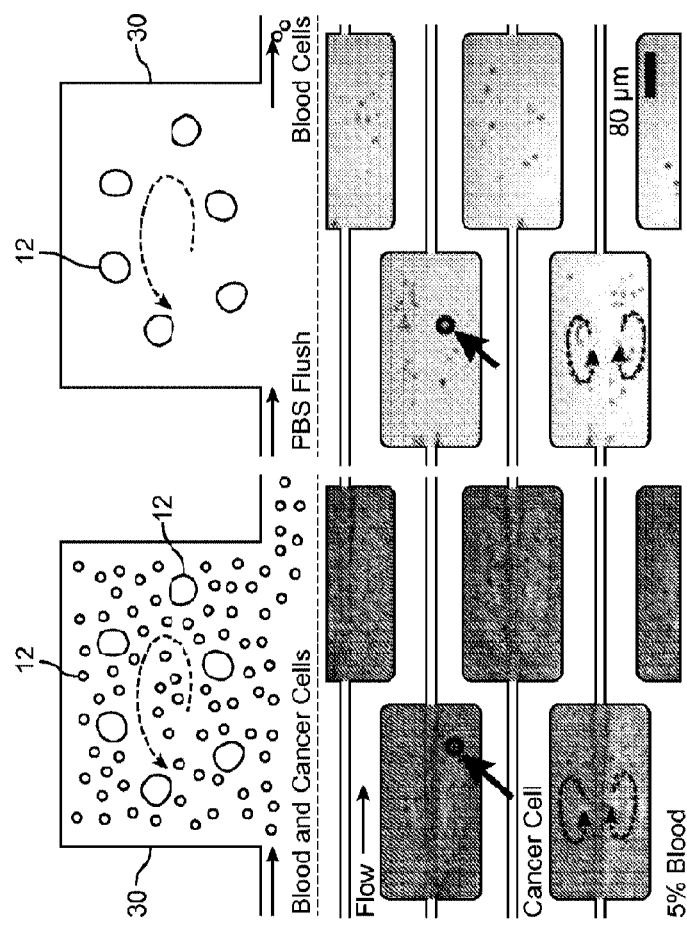
FIG. 4A schematically illustrates blood and cancer cells passing through a portion of the device having an expansion region that traps the larger cancer cells. A corresponding microscope image of a device containing several expansion regions is shown immediately below.
FIG. 4B schematically illustrates a phosphate buffered saline (PBS) flush through the device of FIG. 4A showing evacuation of the red blood cells (RBCs) while cancer cells are retained in the expansion regions. A corresponding microscope image of a device containing several expansion regions is shown immediately below.
Figures 4C, 4D:
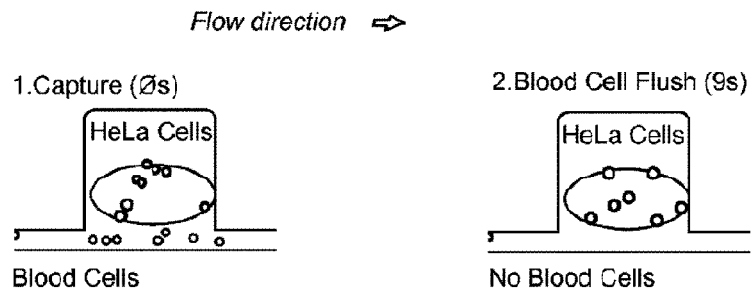
FIGS. 4C-4F illustrates a blood sample spiked with HeLa cells passing through the microfluidic chip of FIG. 3 at a Reynolds number (Rc) of 270.
Figures 4E, 4F:
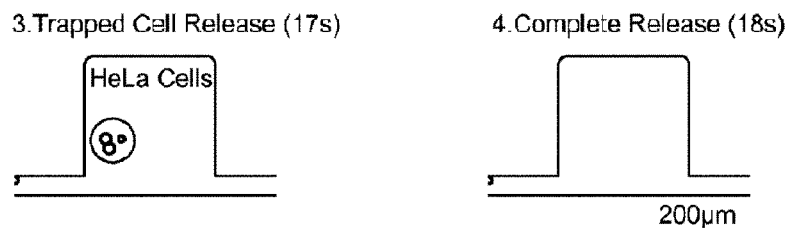

Spiked MCF-7 cells included single cells and 2-4 cell clusters, as clustered cells have been shown to be present at significant levels in clinical samples. Blood and cancer cells were observed to enter and orbit in the vortices during the injection step as illustrated in the schematic view of a single expansion region 30 in the upper panel of FIG. 4A. The lower panel of FIG. 4A illustrates a microscopic image showing a trapped cancer cell along with red blood cells contained in the expansion region 30. Red blood cells were observed to enter vortices even though particles of similar size did not migrate into vortices in experiments with dilute samples. Likely, the high cell concentration induces collisions and hydrodynamic disturbances between cells that lead to cross-stream migration and entrance into vortices.

Additionally, there is a maximum capacity of cells each expansion region 30 can maintain. After the vortex occupies the entire expansion region 30 a maximum of ~40 single MCF7 cells can be maintained over a range of higher flow rates. For most spiking experiments conditions were kept well below this maximum. Once the solution was completely processed, the vortex-trapped cells were "washed" with PBS without disrupting the vortices. This is illustrated in the upper panel of FIG. 4B. The lower panel of FIG. 4B illustrates a microscopic image showing the still trapped cancer cell after a PBS wash solution has been introduced to remove the smaller and denser RBCs. Interestingly, it was observed that blood cells that initially entered the vortex were not stably trapped and quickly exited from the traps and out of the system leaving only the larger stably trapped cancer cells orbiting. Red and white blood cells have both higher density and/or smaller size, and therefore cannot form stable orbits. Washed cells were released into one well of a 96-well-plate for characterization and enumeration.

The microfluidic chip 10 performs well when quantifying key metrics for target cell concentration, enrichment, and purity. 10 mL volume blood samples (n>6 samples) of 5% v/v blood (i.e., 0.5 mL whole blood or ~2.5 billion blood cells) spiked with ~500 cancer cells were concentrated to a final volume of less than 200 mL (20-fold volumetric concentration) with relatively little blood cell contamination in <3 min. This corresponds to an enrichment ratio (the ratio of target cancer cells to contaminant blood cells in the output divided by the same ratio in the input solution) of 3.4 million as seen in FIG. 5A. This high level of enrichment leads to high purity of the cancer cells in the 200 mL final volume: ~40% as seen in FIG. 5B (an average of 102±21 cancer cells, and 221±155 blood cells). Blood samples without spiked cancer cells (n=3) that were processed with the microfluidic chip 10 and samples were collected in the well and were found to have 772±283 red blood cells and 4±1 CD45+ white blood cells, which is similar to the amount of blood cell contaminants found in the microwells using spiked blood samples. The level of enrichment achieved is comparable to molecular affinity-based and filter-based approaches for target cell separation which have reported enrichments from 1 million to 10 million. The purity of the processed sample is high when compared to affinity-based approaches which report purities of spiked cancer cells of 9.2 to 14.0%. Reducing the dilution of blood in processed samples leads to increases in cell-processing throughput, but also results in reduced capture efficiency of spiked cells. As seen in FIG. 5C, 10 to 20% of the spiked cancer cells were recovered, with decreasing capture efficiency with increasing blood concentrations. Higher blood concentrations lead to higher fluid viscosities which modify the fluid vortex size and position, resulting in lower trapping efficiency.

This relatively low capture efficiency at higher blood concentrations suggests that in order for this technique to be useful in isolating ultra-rare cells occurring at 1-10 cells/mL, a large volume of blood must be processed (10 mL or more). However, the high throughput of the microfluidic chip 10 described herein (~5 mL/min of diluted blood for a 2 cm$^2$ chip) indicates that operation on large volumes in a reasonable time period (<30 min) is achievable.

Cells captured in the microfluidic chip 10 maintained high levels of viability. No significant changes were observed in cell viability (90.1% vs. 90.3% initial) after injecting cells through the device as determined by a fluorescent live/dead assay. Viable cells may be important for some sample preparation applications. Cells captured and released from the microfluidic chip 10 are available for standard molecular assays such as immunostaining. To this end, unlabeled spiked blood samples were enriched with the microfluidic chip 10. Cancer cells were then released and labeled in a microwell. Cancer cells stained positive for Cytokeratin-PE and DAPI and negative for CD45. This ability to enrich on one device but transfer cells in a small volume for further processing offers significant advantages for rare single cell analysis.

Figure 4G:
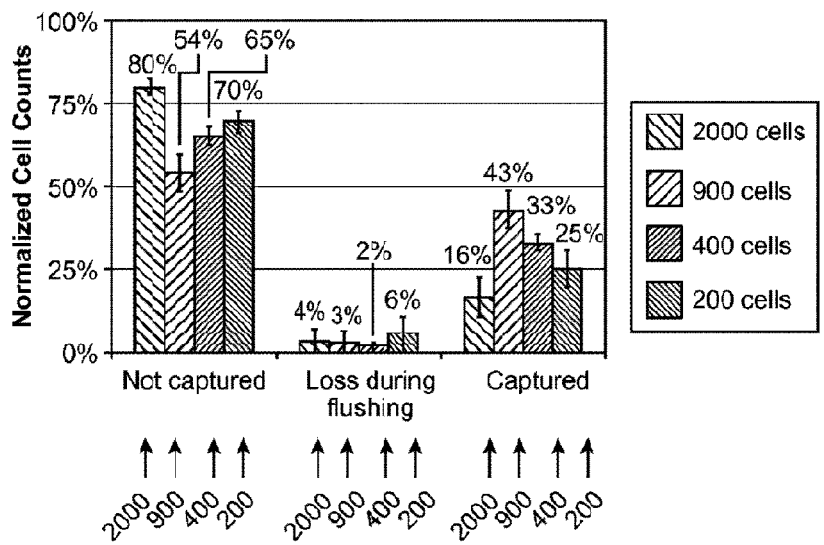
FIG. 4G illustrates a comparison of the capturing efficiency of the microfluidic chip as a function of cell concentration.

FIGS. 4C-4F illustrate the results of similar enrichment of a blood sample spiked with HeLa cells using the microfluidic chip 10 of FIG. 3 at a Reynolds number (Rc) of 270. The microfluidic chip 10 is flushed with PBS wash once the HeLa cells were captured in the expansion regions 30. The trapped HeLa cells were released from the expansion regions 30 by reducing the flow rate to $R_c=5$. FIG. 4G illustrates a comparison of the capturing efficiency of the microfluidic chip 10 as a function of cell concentration. The number of cells indicates the number of spiked HeLa cells processed through the microfluidic chip 10.

Example 2—Cell Labeling and Solution Exchange

The microfluidic chip 10 was also used to effectively label cells for specific molecular markers. In traditional centrifugation, cell samples are labeled for specific markers through a series of labeling and washing steps. This includes incubating the cells with labeling reagents in a centrifuge tube, concentrating the cells into a pellet with a benchtop centrifuge, removing the supernatant layer containing unbound labeling reagents through manual aspiration, and manually resuspending the cells in a new medium. These operations were performed within the microfluidic chip 10 by trapping the cells within fluid vortices and sequentially exposing trapped orbiting cells to labeling reagents, followed by a PBS wash solution. Labeled cells were then released within a small volume into a collection vial by reducing flow.

FIGS. 6A-6D illustrate, respectively, the trapping (FIG. 6A), first solution exchange (FIG. 6B), reaction (FIG. 6C), and second solution exchange (FIG. 6D). FIGS. 6E-6H illustrate, respectively, microscope images corresponding to FIGS. 6A-6D of actual MCF7 cells incubated with biotinylated EpCAM that were injected into the microfluidic chip 10. As seen in FIG. 6E, cells are trapped in the vortex, undergoing a constant rotating and orbiting motion. FIG. 6F illustrates the first solution exchange with streptavidin-coated microspheres. The streptavidin-coated microspheres enter the expansion region 30. FIG. 6G illustrates the continuous reaction of the streptavidin-coated microspheres with the MCF7 cells. FIG. 6H illustrates a solution exchange with a second solution (i.e., PBS wash). The PBS wash removes unbound microspheres (arrow A). After the wash is complete the cells are released from vortex traps by lowering the flow rate through the microfluidic chip 10 wherein the cells are collected into a 96-well-plate for characterization. Arrows B in FIG. 6H point to particles that are increasingly bound to the cell over 2 minutes.

The ability to hold cells stably in place within fluid vortices allows for multiple solution exchanges with labeling agents and wash solutions in a format that can be automated. Each addition of a new solution takes approximately 100 ms for complete exchange. For the same labeling reaction a traditional centrifuge-based process requires six (6) centrifugation steps that includes three (3) washing steps and requires >30 minutes of sample preparation time (this excludes the incubation time with labeling reagents). Each centrifugation and wash step can potentially result in a loss of a small proportion of cells and requires between 5-10 min.

Fast labeling is aided by cells that rotate and orbit in the fluid vortex such that they are exposed to a constantly refreshed milieu of molecular labels. In other words, strong convection of labeling reagents in the vortex leads to a very small depleted region of reagents near the cell surface and a strong gradient driving more reagents to the cell surface. This fast labeling was observed by examining the binding of streptavidin-coated microspheres to biotinylated anti-EpCAM antibodies on the cell surface (FIGS. 6A-6H). It was found that the cells in the micro fluidic chip 10 accumulated the same number of microbeads in 5 minutes that cells prepared with the standard protocol accumulated in 30 minutes. Further, after 30 minutes, cells labeled with the micro fluidic chip 10 on average had twice the number of microbeads bound per cell compared to standard methods.

Example 3—Sequential Operations: Rare Cell Enrichment Followed by Labeling

Figure 7:
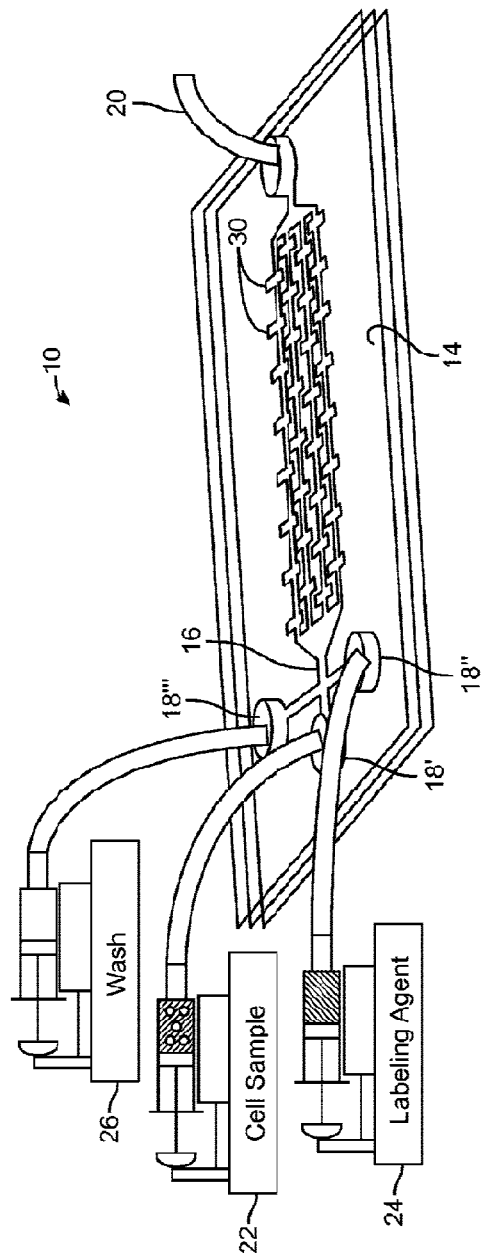
FIG. 7 illustrates a microfluidic chip according to another embodiment that includes three inlets coupled to three different solutions: cell sample, labeling agent, and wash.
Figure 8:
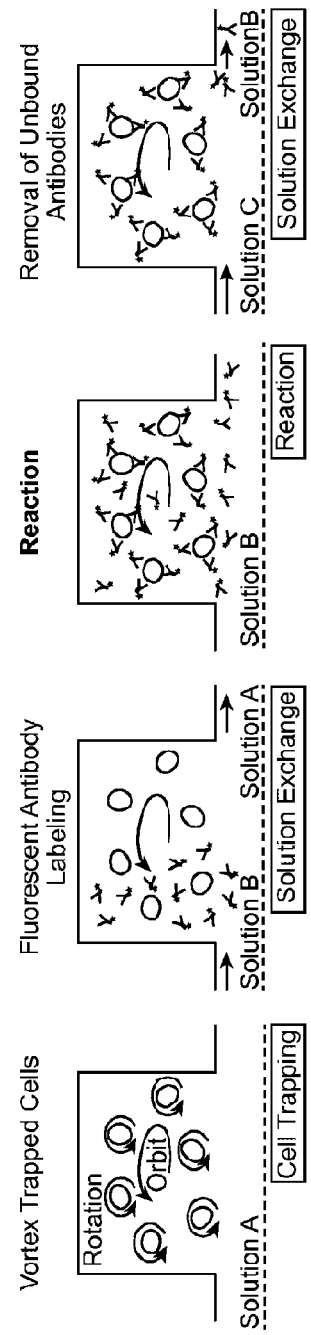
FIG. 8A-8D illustrates the sequential steps of trapping, fluorescent solution exchange, reaction, and wash conducted on the device of FIG. 7.
Figure 9:
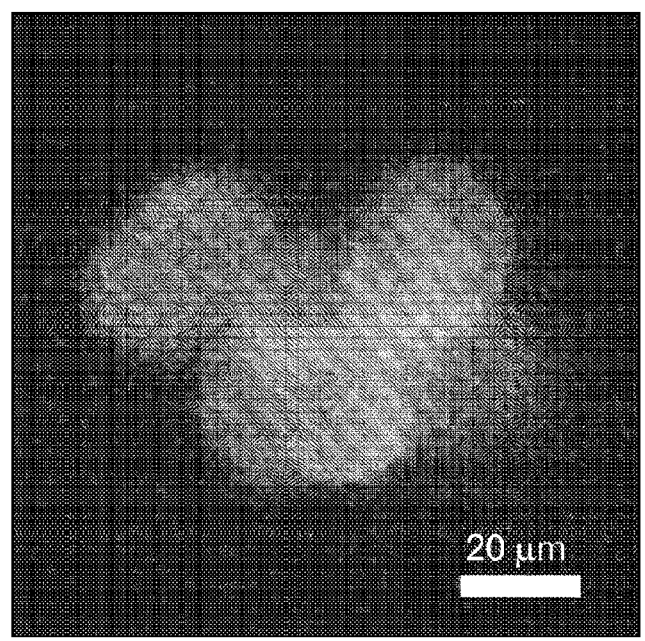
FIG. 9 illustrates a fluorescent image of a cluster of cells that was sequentially trapped inside the fluid vortex, fixed with paraformaldehyde, permeabilized, and labeled with anti-Cytokeratin-PE & DAPI.
Figure 10:
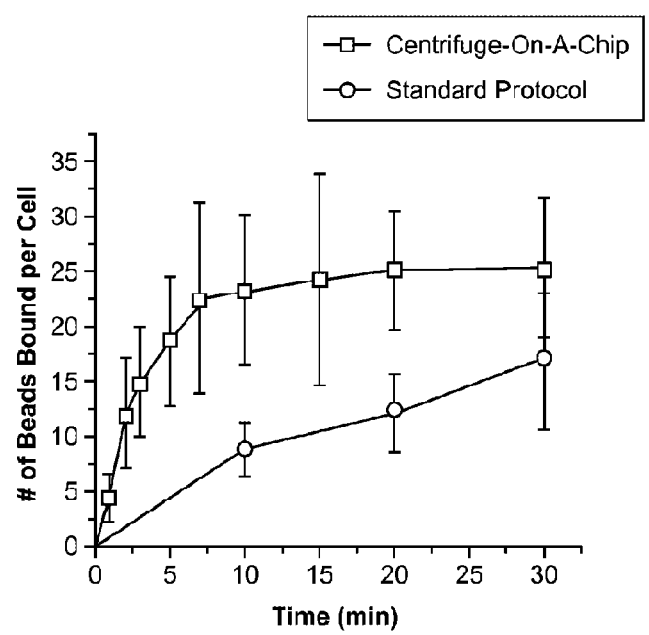
FIG. 10 illustrates a graph of the number of streptavidin-coated microbeads bound per cell (MCF7 cells covered with biotinylated anti-EpCAM) as a function of time for both the microfluidic chip and standard centrifugation.
Figure 11:
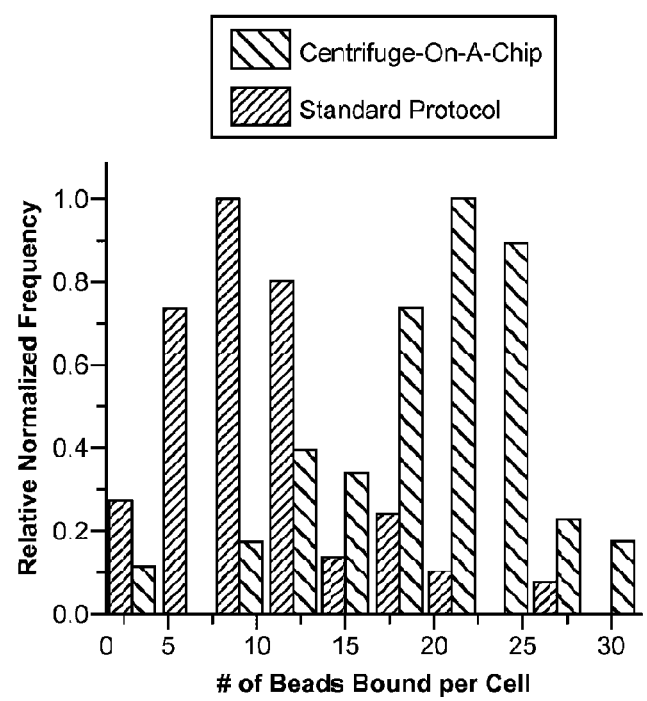
FIG. 11 illustrates a graph of the relative normalized frequency as a function of number of beads bound per cell for both the microfluidic chip and standard centrifugation.

Multiple sequential sample preparation steps enabled by a centrifuge (e.g., trapping fluorescent solution exchange, reaction, and wash) were successfully conducted using the micro fluidic chip 10 illustrated in FIG. 7. In this embodiment, the microfluidic chip 10 included three inlets 18', 18", and 18'''. One inlet 18' was coupled a syringe pump 22 that was used to deliver the cell sample. The second syringe pump 24 was used to deliver the fluorescent agent. The third syringe pump 26 is used to deliver wash (PBS). Size-based trapping of cancer cells from blood, sequential fluorescent labeling, and analysis of released cells were conducted in <1 hour. Diluted human blood (10 mL) spiked with cancer cells was injected into the microfluidic chip 10 for ~3 min to enrich the cancer cells. Trapped cells were sequentially prepared with a fixation agent (paraformaldehyde) and permeabilization agent and stained with fluorescent antibodies (anti-Cytokeratin-PE & DAPI) for 20 min. The sequence of trapping, first solution exchange, reaction, and second solution exchange is seen in FIGS. 8A-8D. Cells were then washed with PBS for <1 min, and collected into a 96-well-plate for characterization. Collected cells labeled positive for cytokeratin and DAPI, indicating the success of sequential sample preparation as illustrated in FIG. 9 which shows a fluorescent image of a cluster of cells that was sequentially trapped inside the fluid vortex, fixed with paraformaldehyde, permeabilized, and labeled with anti-Cytokeratin-PE & DAPI. As seen in FIG. 1 AO, MCF7 cells covered with biotinylated anti-EpCAM are coated with streptavidin conjugated microbeads in <5 minutes at the same level as a standard off-chip protocol after 30 minutes. FIG. 1A1 illustrates uniform labeling with microbeads over the cell population after 30 minutes. Further, the microfluidic chip 10 (centrifuge-on-chip) results in a larger number of beads bound per cell. The results above demonstrate a complete route to automation of all of the sample preparation processes required for cell analysis in a single simple platform.

The devices 10 and methods described herein are useful for inexpensive and rapid circulating tumor cell (CTC) analysis. CTC detection and enumeration is a valuable and promising diagnostic tool for monitoring breast cancer status and outcome. CTCs are tumor-derived cells that spread via the bloodstream and can reflect the aggressiveness of a tumor. CTCs are rare events at rates as low as one cell per one billion cells. CTC isolation thus presents a significant technological challenge. The devices 10 and methods described herein can exploit the cell size difference between CTCs and blood cells (CTCs are 2-4 times larger than RBCs) to isolate viable CTCs from whole blood in a label-free manner. Other potential applications of the devices 10 and methods include prenatal testing that involves the isolation of fetal cells from maternal blood cells. Fetal cells of interest can be isolated without labeling or external bulk machines.

While the microfluidic chip 10 has particular application for isolating CTCs, other applications include concentrating cells 12 obtained from a sample. For example, cells 12 of interest having a size that enables trapping within expansion regions 30 can be captured then released into a sample in concentrated form. For example, cells 12 contained in a biological source of fluid like urine, pleural fluid, and peritoneal washes can be run through the microfluidic chip 10 to concentrate cells 12 contained therein. In this regard, the microfluidic chip 10 is well suited for concentrating cells 12. For example, on a volumetric basis, the microfluidic chip 10 can concentrate cells 12 more than ten (10) or twenty (20) times the concentration of the cells 12 in the initial solution.

Figure 12:
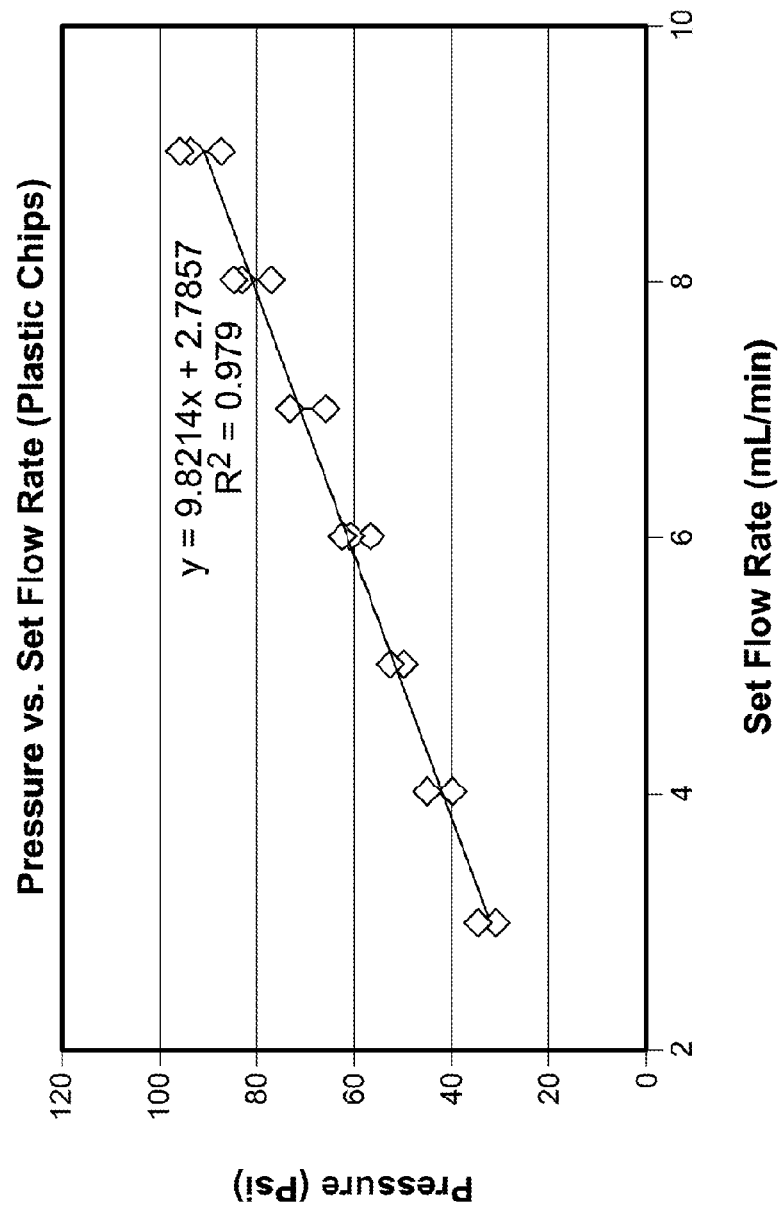
FIG. 12 shows an example graphical illustration of absence of deformability of a rigid microfluidic chip as a function of flow rate, according to some embodiments.

Example 4—Comparison of Efficiency and Performance of Deformable and Rigid Microfluidic Chips With reference to FIG. 12, in some embodiments, an example graphical illustration of the absence of deformability in a rigid microfluidic chip during operating conditions is shown. Rigid microfluidic chips, such as those made from rigid plastic materials, may be robust against increasing fluid flow rate and pressure, and have been shown to maintain their integrity even for pressures as high as about 170 psi (with water used as test fluid, for example). In such embodiments, integrity may refer to absence of non-uniform bonding, roughness, un-deformed fluidic features, etc. FIG. 12 shows a plot of pressure required to drive flow rate in the channels of a rigid plastic microfluidic chip versus the flow rate in the device (for N=3, where N denotes the number of times an experiment is replicated in the particular embodiment of FIG. 12. It should be noted that N can assume any natural number). The relationship is substantially linear (with $R^2 \sim 0.98$ in the shown particular embodiment), indicating the near complete absence of compliance or deformability in the rigid plastic device. Pressure ranging from about 30 psi to about 90 psi is seen to produce flow rate linearly ranging from about 3 mL/min to about 9 mL/min. The lack of deformation in the rigid microfluidic chips is shown from the linearity of FIG. 12.

For deformable devices, the fluidic resistance (which corresponds to the slope of a pressure vs. flow rate such as FIG. 12) may change as the flow rate or pressure increases (in some embodiments, the fluidic resistance for a rectangular cross-section may be expressed with the expression $12*\mu*L/(w*h^3(1-0.063*h/w))$, $h<w$, where w, h, L represent width, height and length, respectively). Further, the proportionality of the flow rate to pressure used to drive the flow rate may indicate the constancy and reproducibility of the fluidic resistance of the material for a given fluidic design. For example, unlike in the case of deformable microfluidic chips that fail at high pressure (e.g., 30-50 PSI), rigid material based microfluidic chips are stable against significant deformations and device failures (e.g., sealing failures, sensor failures, etc.) even at higher pressures. For example, TPE based microfluidic chips can be stable against pressure (e.g., from fluid flow) as high as about 150 PSI. In some embodiments, the device failure at pressures exceeding about 150 PSI may not be from structural failures such as leakages, but from sensor limits or failures. As another example, PUMA based microfluidic chips can be stable against pressure as high as about 120 PSI, as high as 110 PSI, as high as 105, etc. In some embodiments, the device failure at different pressures may come about because of different defects or failure modes. For example, PUMA based microfluidic chips may fail at pressures exceeding about 110 or 120 PSI due to sealing or connection failures (i.e., connection leakage), and at pressures exceeding about 105 PSI due to delamination. NOA based microfluidic chips, in some embodiments, may be stable against pressures as high as 70-80 PSI (e.g., failure mode being delamination), although optimizing the device may increase the failure pressure-threshold.

Figure 13A:
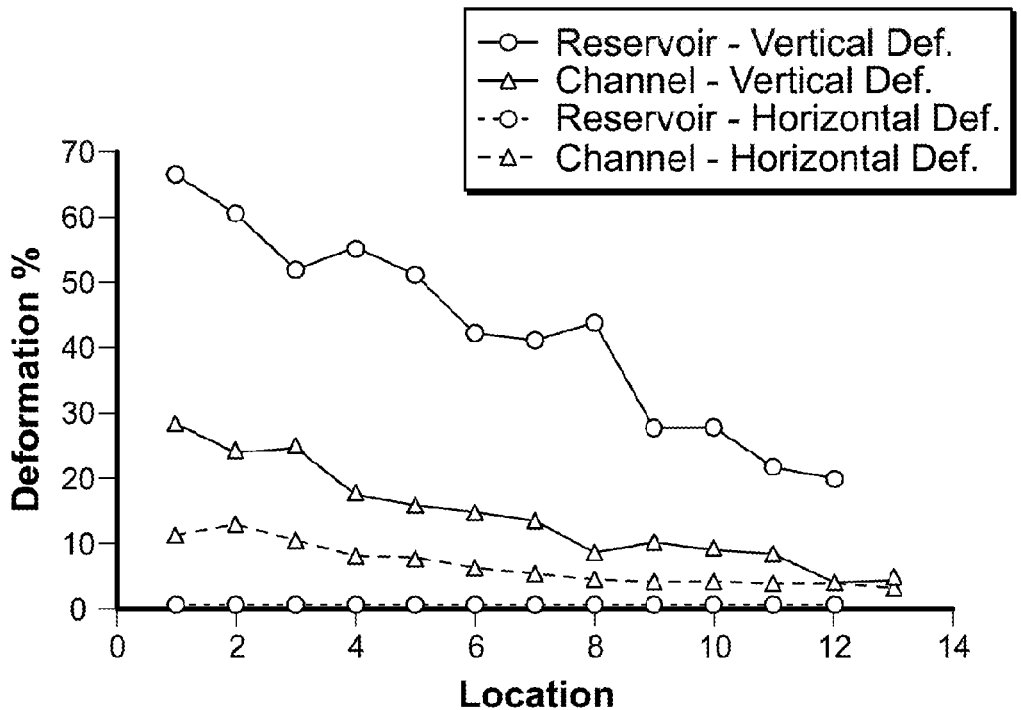
FIGS. 13A-B show example graphical illustrations of the deformability of a polydimethylsiloxane (PDMS) microfluidic chip under operating conditions, according to some embodiments.
Figure 13B:
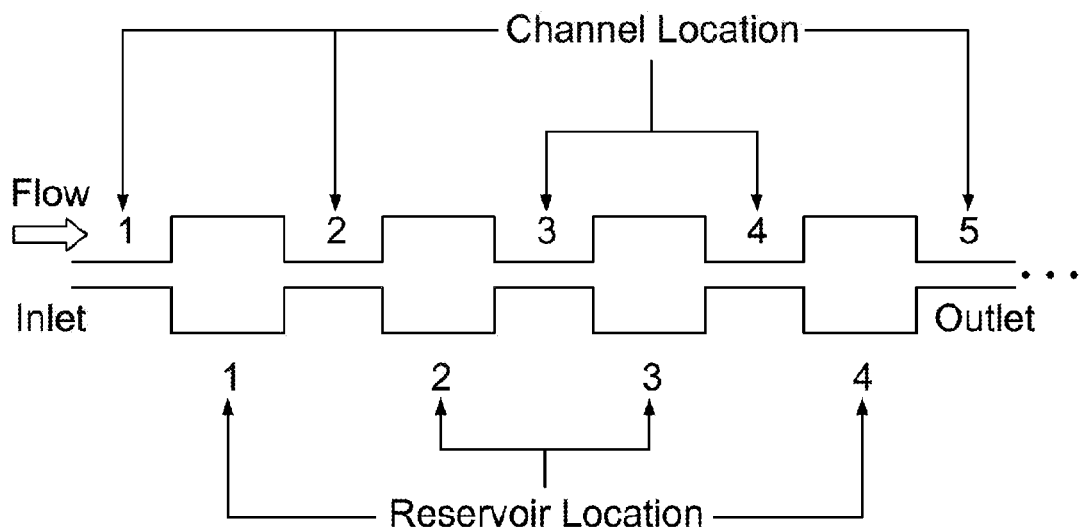

With reference to FIG. 13A, in some embodiments, an example graphical illustration of the deformability of a PDMS microfluidic channel under operating conditions is shown. The plots show measurements of channel deformation for fluid flow rate of about 8 mL/min at different locations along the microfluidic chips. For purposes of FIG. 13A, "Channel" refers to the channels traversing the microfluidic chip from inlet to outlet (entering and leaving the expansion regions while traversing). "Chamber" refers to the expansion regions, and x-axis values for FIG. 13A correspond to the channel and expansion region markers indicated in FIG. 13B. The locations of these regions along the microfluidic chip are indicated via an arbitrary value along the x-axis. FIG. 13A shows vertical deformation for both the channels and the expansion regions, i.e., deformation along the depth (z axis), and shows horizontal deformation, i.e., deformation along the width. FIG. 13A in particular illustrates a large depth (z-axis) deformation for the expansion regions of PDMS microfluidic chips (N=3) that are closest to the inlet of the microfluidic chip (e.g., about 70% deformation for the first expansion region, about 60% for the second, about 50% for the third, etc.). In some embodiments, the values for the deformations can be calculated by comparing the dimensions (e.g., along x or z axis) of the microfluidic chip before and after exposure to fluid flow. Some embodiments of the above-noted experimental confirmations may be obtained by injecting water supplemented with a fluorescent marker (e.g., fluorescein) into the microfluidic chip and using the fluorescent intensity profile as a way to visualize and quantify the deformation extent. Further, fluorescent beads may also be used to simulate cells, such as CTC or MCF7.

In some embodiments, similar experiments performed with rigid plastic chips showed little to no deformation. For example, for fluid pressure as high as about 100 psi or fluid flow rate as high as 10 mL/min, little to no deformation occurred to the fluidic channels of the rigid plastic microfluidic chip (FIG. 12). Although the above discussion refers to PDMS based and rigid plastic based microfluidic chips as particular examples, the embodiments of the discussion above directed to FIGS. 13A-13B equally apply to various kinds of deformable microfluidic chips (of which a PDMS based microfluidic chip is an example of) and rigid microfluidic chips (of which a rigid plastic based microfluidic chip is an example of).

In some embodiments, the capturing of most or all cells at the expansion regions closer to the inlets of rigid microfluidic chip may facilitate the miniaturization of the devices, since the runway distance and/or the number of expansion regions 30 can be decreased with little or no negative impact on performance of the microfluidic chip 10. In some embodiments, this may in turn facilitate a reduction in the fluidic resistance of the devices so as to improve capturing efficiency, device performance and accuracy of pressure control. This runway distance may be replaced by a curved channel in the form of a serpentine to mix a blood sample with a PBS buffer to dilute the blood before its entrance in the vortices. In general, the overall micro-fluidic device could be shortened (i.e., some of the expansion regions may be removed) to lower the pressure drop. In some embodiments, the straight channel upstream used previously to align the particles in a very deformed region (e.g., runway distance) could be removed and replaced with extra reservoirs chambers.

Figure 14A:
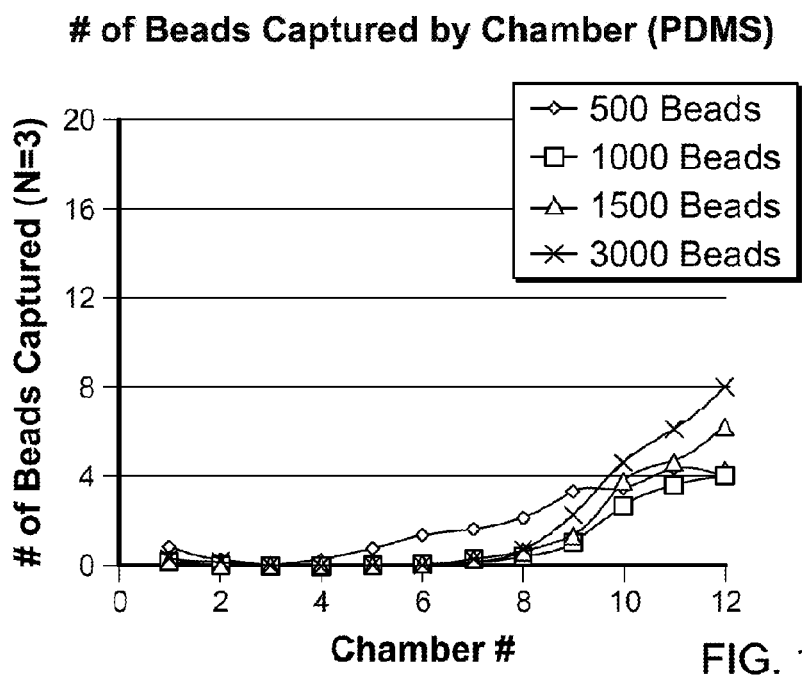
FIGS. 14A-C show other example graphical comparisons of cell or particle capture efficiency between PDMS and rigid plastic microfluidic chips as a function of particle or cell number and location of expansion regions, according to some embodiments.
Figure 14B:
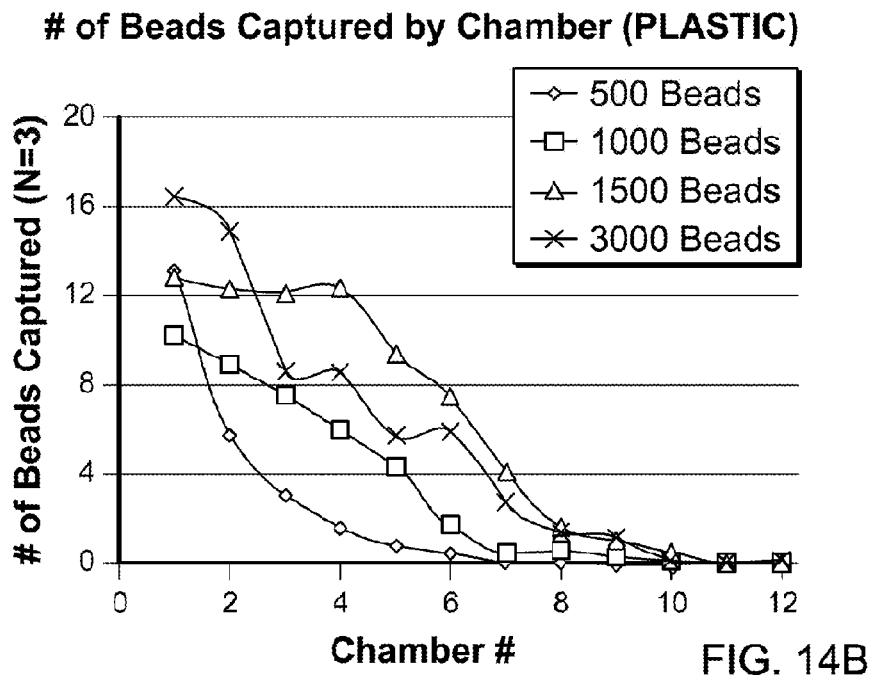
Figure 14C:
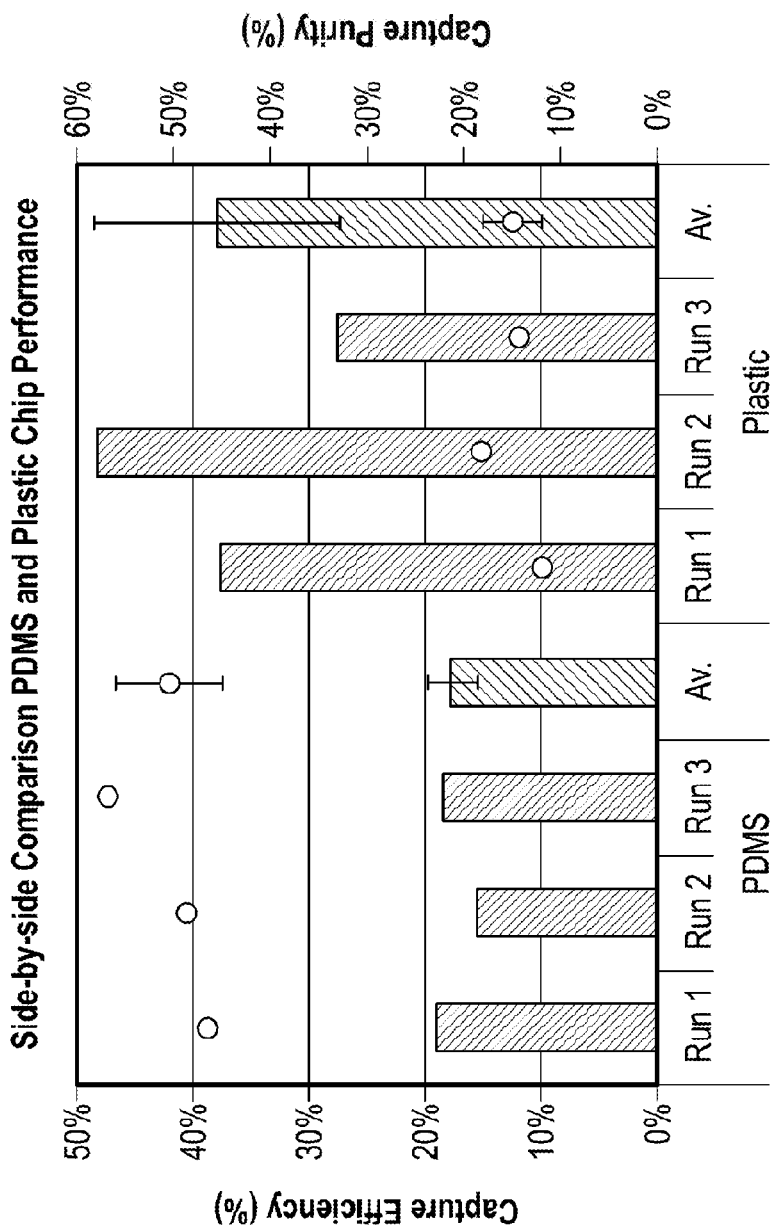

With reference to FIGS. 14A-C, in some embodiments, example graphical comparisons of cell or particle capture efficiency between PDMS and rigid plastic microfluidic chips as a function of particle or cell number and location of expansion regions are shown. FIGS. 14A and 14B compare embodiments of cell or particle (simulated using beads) capture frequency for PDMS and rigid plastic microfluidic chips, respectively, where it can be seen that the overall capture capacity of the rigid microfluidic chip is higher than that of the deformable one. For example, FIG. 14A shows PDMS devices are already saturated at about 1000 beads (used as a model for cancer cells or MCF7) injected into the device (e.g., similar overall capture capacity whether 1000 beads are injected or 1500) while rigid plastic ones may not saturate until about 3000 beads are injected (FIG. 14B), which corresponds to an increase of >3× capacity. The higher overall capture capacity of rigid microfluidic chips may follow from the results of FIG. 13 where in the case of PDMS devices, particles or cells are usually captured (if at all) by the expansion regions located towards the exit or outlets of the devices, while for rigid microfluidic chips, the particles or cells may be captured by the expansion regions near the inlet and then all along the channel length, leading to a higher overall capture capacity for a rigid microfluidic chip than a deformable microfluidic chip. FIG. 14C provides additional illustrations for the discussion presented above with respect to FIGS. 14A and 14B.

In some embodiments, for PDMS based microfluidic chips (FIG. 14A, FIG. 14C), the device or chip is shown to be saturated from 500 beads since few beads or particles can be captured in expansion regions that are closer to the inlet (e.g., up to about 8-9 expansion regions from the inlet (FIG. 14C). That is, FIG. 14C illustrates that as a result of deformation in the expansion regions closer to the inlet (up to 8 or 9 in the particular embodiment of FIG. 14C), few cells or particles may be captured in those expansion regions. For rigid plastic microfluidic chips (FIG. 14B, FIG. 14C), the device or chip can still capture efficiently as many as 1500 beads (3 times more than PDMS) and chip saturation may be observed at 3000 beads (FIG. 14B) since beads could be captured all along the chip when bead number increases (FIG. 14C).

FIG. 14C illustrates the differences between PDMS and rigid plastic microfluidic chips in vortex-trapping of cancer cells (MCF7 breast metastatic cancer cells) spiked in healthy blood. Two microfluidic chip types were tested simultaneously for efficiency (i.e. total percentage of cells captured)— 1) Tubing was manually inserted into a PDMS microfluidic chip for processing; 2) A plastic chip was manually processed with a test fixture (N=3 for each condition, all tested similarly on the same day). The flow rate was 8 ml/min for both PDMS and PLASTIC. The experiment was done in same day with same cells and same blood. 5 mL of 10× diluted blood (0.5 mL of blood+4.5 mL of PBS). 500 MCF7 cells was spiked in. 2 cycles of processing for both chip types. The plastic chips exhibited superior capture efficiency and purity.

Although the above discussion refers to PDMS based and rigid plastic based microfluidic chips as particular examples, the embodiments of the discussion above directed to FIGS. 14A-C equally apply to various kinds of deformable microfluidic chips (of which a PDMS based microfluidic chip is an example of) and rigid microfluidic chips (of which a rigid plastic based microfluidic chip is an example of).

Example 5—Isolation and Analysis of Tumor Cells from Blood Samples Across Different Devices A controlled number of cancer cells (MCF7, breast, around 500) is spiked into healthy blood (4 mL) and then processed through one system, using one microfluidic chip with two devices, device 1 and device 2, for two cycles. Cells from each device are collected in a container, then immunostained with markers specific for cancer cells and white blood cells to identify and enumerate them. This enables the user to quantify the capture efficiency and purity of a given experiment.

Figure 28A:
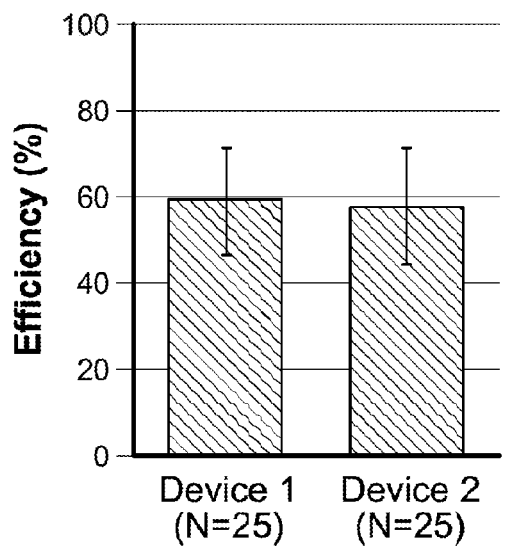
FIG. 28A illustrates capture efficiency of collection of tumor cells from a blood sample using the setup of FIG. 16 with two different devices, over two cycles.

As illustrated in FIG. 28A, the system is substantially unaffected by choice of device. There was no statistical difference in the efficiency of isolation, or the purity of the isolated tumor cells, between device 1 and device 2. The potential for recycling enables the user to collect additional tumor cells, for an increased capture efficiency but at the compromise of a lower capture purity.

Example 6—Isolation and Analysis of Tumor Cells from Blood Samples Across Different Cartridges A controlled number of cancer cells (MCF7, breast, around 500) is spiked into healthy blood (4 mL), then processed through one system, using one microfluidic chip for two cycles, but with four different cartridges. Each cartridge was fabricated the same way. Cells from runs with a different cartridge were collected in a container, then immunostained with markers specific for cancer cells and white blood cells to identify and enumerate them. This enabled the user to quantify the capture efficiency and purity of a given experiment.

Figure 28B:
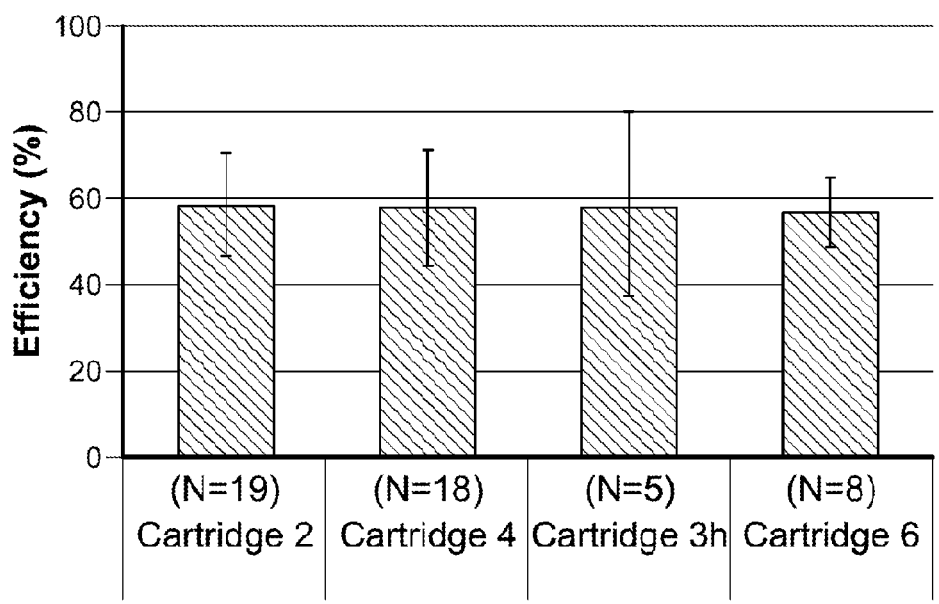
FIG. 28B illustrates capture efficiency of collection of tumor cells from a blood sample using the setup of FIG. 16 with four different machined cartridges, over two cycles.

As illustrated in FIG. 28B, the system is substantially unaffected by choice of cartridge. There was no statistical difference in the efficiency of isolation, or the purity of the isolated tumor cells, between cartridge 2, cartridge 4, cartridge 3h, and cartridge 6.

Example 7—Isolation and Analysis of Tumor Cells from Blood Samples Across Different Units/Systems A controlled number of cancer cells (MCF7, breast, around 500) is spiked into healthy blood (4 mL), then processed through one system, using one microfluidic chip for three cycles, but with five different systems. Cells from runs with a different system are collected in a container, then immunostained with markers specific for cancer cells and white blood cells to identify and enumerate them. This enables the user to quantify the capture efficiency and purity of a given experiment.

As illustrated in FIGS. 28C-28D, the system is substantially unaffected by choice of unit. There was no statistical difference in the efficiency of isolation, or the purity of the isolated tumor cells, between the units 1-5.

Example 8—Isolation of Tumor Cells with High Recovery or High Purity Modes

A controlled number of cancer cells (MCF7, breast, around 500) is spiked into healthy blood (4 mL), then processed through one system, using one microfluidic chip for up to three cycles (FIGS. 33A and 33C). Cells from each cycle are collected in a different container, then immunostained with markers specific for cancer cells and white blood cells to identify and enumerate them. This enables the user to quantify the capture efficiency and purity of a given cycle.

The blood effluent collected from the first processing cycle can be recirculated through the microfluidic chip by the automated system. The effluent is transferred to the dilution tube/reservoir from the recycle tube and the process described above is repeated. Such recycling of the diluted blood enables the user to recover more target cells/particles at each passage (from 51-63.3% recovery after cycle 1, to 68.7-80% recovery after 3 cycles), but at the compromise of the purity (92.5-160 WBCs/mL contamination after cycle 1, 762-1090 WBCs/mL contamination after 3 cycles). This illustrates that the system may be operated in either a first mode for higher recovery (e.g., by recycling) or a second mode for higher purity (e.g., no recycling).

In another example, around 50 cells were spiked in a volume of 4 mL of blood to better mimic real clinical cases where CTC numbers are expected to be in a range of 0-100 CTCs/7.5 mL of blood (FIGS. 33.B and 33.D). Similar trends were obtained between high recovery and high purity modes.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A microfluidic chip for isolating cells or particles from a fluid, the microfluidic chip comprising:
   a rigid substrate made of a material selected from poly (methyl methacrylate) (PMMA), cyclic olefin polymer (COP), cyclic olefin copolymer (COC), and ultra-violet curable resins;
   an inlet that extends through the substrate;
   a single outlet that extends through the substrate; and
   at least one microfluidic channel disposed in the substrate between the inlet and the single outlet and having a length, the at least one microfluidic channel being in fluid communication with the inlet and the single outlet, the at least one microfluidic channel comprising a plurality of expansion regions disposed along the length of the at least one microfluidic channel in which a vortex forms in response to fluid through the at least one microfluidic channel, the plurality of expansion regions being disposed between the inlet and the single outlet, the plurality of expansion regions comprising a first expansion region, the at least one microfluidic channel being free of a runway between the inlet and the first expansion region.

2. The microfluidic chip as set forth in claim 1 wherein the material is poly(methyl methacrylate).

3. The microfluidic chip as set forth in claim 1 wherein the rigid substrate has a Young's modulus of at least 50 MPa.

4. The microfluidic chip as set forth in claim 1 wherein the at least one microfluidic channel has a width of from 20 μm to 100 μm and a height from 20 μm to 200 μm, and at least one expansion region of the plurality of expansion regions has a width from 150 μm to 2000 μm and has a length from 200 μm to 2 mm.

5. The microfluidic chip as set forth in claim 1 wherein at least one expansion region of the plurality of expansion regions is square or rectangular and the at least one expansion region comprises a leading wall extending at least 45° with respect to an axis of flow.

6. A method for isolating cells comprising:
   providing the microfluidic chip of claim 1;
   flowing a solution containing a population of cells into the inlet, the solution being chosen from the group consisting of blood, pleural fluid, and urine and the cells having a diameter from about 8 micron to about 80 micron and being chosen from the group consisting of cancer cells and stem cells;
   capturing trapped cells in the at least one expansion region; and
   releasing the trapped cells from at least one expansion region of the plurality of expansion regions by reducing a flow rate of solution through the at least one microfluidic channel.

7. The method as set forth in claim 6 wherein the flow rate of the solution through the at least one microfluidic channel is from 500 μl/min to 20 ml/min.

8. The method as set forth in claim 6 wherein the flow rate of the solution through the at least one microfluidic channel is from 1 ml/min to 15 ml/min.

9. A microfluidic chip for isolating cells or particles from a fluid, the microfluidic chip comprising:
- a rigid substrate made of a material selected from poly (methyl methacrylate) (PMMA), cyclic olefin polymer (COP), cyclic olefin copolymer (COC), and ultra-violet curable resins;
- an inlet that extends through the substrate;
- a single outlet that extends through the substrate; and
- at least one microfluidic channel disposed in the substrate between the inlet and the single outlet and having a length, the at least one microfluidic channel being in fluid communication with the inlet and the single outlet, the at least one microfluidic channel comprising a plurality of expansion regions disposed along the length of the at least one microfluidic channel in which a vortex forms in response to fluid through the at least one microfluidic channel, the at least one microfluidic channel having a height of about 70 μm.

* * * * *